US012786035B2

(12) United States Patent
Shi et al.

(10) Patent No.: US 12,786,035 B2
(45) Date of Patent: Nov. 3, 2026

(54) MODULATION METHOD, DEMODULATION METHOD, AND RELATED APPARATUS

(71) Applicant: Huawei Technologies Co., Ltd., Shenzhen (CN)

(72) Inventors: Meng Shi, Shanghai (CN); Peng Zou, Shenzhen (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 18/754,905

(22) Filed: Jun. 26, 2024

(65) Prior Publication Data

US 2024/0356793 A1 Oct. 24, 2024

Related U.S. Application Data

(63) Continuation of application No. PCT/CN2022/137805, filed on Dec. 9, 2022.

(30) Foreign Application Priority Data

Dec. 27, 2021 (CN) ........................ 202111620131.6

(51) Int. Cl.
*H04L 27/14* (2006.01)
*H04L 1/00* (2006.01)
(Continued)

(52) U.S. Cl.
CPC ............ *H04L 27/34* (2013.01); *H04L 1/0003* (2013.01); *H04L 1/0061* (2013.01); *H04L 1/0071* (2013.01)

(58) Field of Classification Search
CPC ........ H04L 27/34; H04L 1/0061; H04L 27/14
See application file for complete search history.

(56) References Cited

U.S. PATENT DOCUMENTS

2016/0252484 A1* 9/2016 Rubinstein ......... G01N 30/8637 702/19
2018/0150728 A1* 5/2018 Vahdat .................. G06F 18/214
(Continued)

FOREIGN PATENT DOCUMENTS

CN 111049589 A 4/2020

OTHER PUBLICATIONS

3GPP TS06.77 (V8.1.1) (Apr. 2001) (Year: 1999).*
(Continued)

*Primary Examiner* — Faruk Hamza
*Assistant Examiner* — Abusayeed M Haque
(74) *Attorney, Agent, or Firm* — Slater Matsil, LLP

(57) ABSTRACT

Embodiments of this application disclose a modulation method, a demodulation method, and a related apparatus. A first communication apparatus can ensure, by performing technical solutions of this application, a shaping gain brought by using probabilistic constellation shaping modulation in a high-frequency scenario. The method in embodiments of this application includes: The first communication apparatus determines probability distributions of constellation points in a target probabilistic shaping constellation diagram based on a Maxwell-Boltzmann distribution parameter and a phase noise parameter. The first communication apparatus modulates a first original bit stream and a second original bit stream based on the probability distributions of the constellation points in the target probabilistic shaping constellation diagram, to obtain a first quadrature amplitude modulation QAM symbol stream.

20 Claims, 15 Drawing Sheets

(51) Int. Cl.
*H04L 27/26* (2006.01)
*H04L 27/34* (2006.01)

(56) References Cited

U.S. PATENT DOCUMENTS

2020/0186283 A1* 6/2020 Handte ................. H04L 1/0041
2021/0194596 A1* 6/2021 Kim ................... H04B 10/6932

OTHER PUBLICATIONS

F. R. Kschischang, "Optimal Nonuniform Signaling for Gaussian Channels," in IEEE Transactions on Information Theory, vol. 39, No. 3, pp. 913-929, May 1993, doi: 10.1109/18.256499.
P. Schulte et al., "Constant Composition Distribution Matching," in IEEE Transactions on Information Theory, vol. 62, No. 1, pp. 430-434, Jan. 2016, doi: 10.1109/TIT.2015.2499181.
G. Bocherer et al., "Bandwidth Efficient and Rate-Matched Low-Density Parity-Check Coded Modulation," in IEEE Transactions on Communications, vol. 63, No. 12, pp. 4651-4665, Dec. 2015, doi: 10.1109/TCOMM.2015.2494016.
Z. Qu et al., "Universal Hybrid Probabilistic-geometric Shaping Based on Two-dimensional Distribution Matchers," 2018 Optical Fiber Communications Conference and Exposition (OFC), San Diego, CA, USA, Mar. 11-15, 2018, pp. 1-3.
J. Cho et al., "Normalized Generalized Mutual Information as a Forward Error Correction Threshold for Probabilistically Shaped QAM," 2017 European Conference on Optical Communication (ECOC), Gothenburg, Sweden, Sep. 17-21, 2017, pp. 1-3, doi: 10.1109/ECOC.2017.8345872.
A. Alvarado, "Replacing the Soft-Decision FEC Limit Paradigm in the Design of Optical Communication Systems," in Journal of Lightwave Technology, vol. 33, No. 20, pp. 4338-4352, 15 Oct. 15, 2015, doi: 10.1109/JLT.2015.2450537.
T. Fehenberger et al., "On Probabilistic Shaping of Quadrature Amplitude Modulation for the Nonlinear Fiber Channel," Journal of Lightwave Technology, vol. 34, No. 21, pp. 5063-5073, Nov. 1, 2016, doi: 10.1109/JLT.2016.2594271.
D. Pilori, "Comparison of Probabilistically Shaped 64QAM With Lower Cardinality Uniform Constellations in Long-Haul Optical Systems," Journal of Lightwave Technology, vol. 36, No. 2, pp. 501-509, Jan. 15, 2018, doi: 10.1109/JLT.2017.2752842.
F. Buchali et al., "Experimental Demonstration of Capacity Increase and Rate-Adaptation by Probabilistically Shaped 64-QAM," 2015 European Conference on Optical Communication (ECOC), Valencia, Spain, Dec. 3, 2015, pp. 1-3, doi: 10.1109/ECOC.2015.7341688.
T. Fehenberger et al., "Sensitivity Gains by Mismatched Probabilistic Shaping for Optical Communication Systems," in IEEE Photonics Technology Letters, vol. 28, No. 7, pp. 786-789, Apr. 1, 2016, doi: 10.1109/LPT.2015.2514078.
D. Che, et al., "Achievable Rate Comparison Between Entropy and Bit Loading in a 100-Gb/s DM-DD DMT System," 2019 Optical Fiber Communications Conference and Exhibition (OFC), San Diego, CA, USA, Apr. 25, 2019, pp. 1-3.
Xie et al., "Achievable Information Rate Enhancement of Visible Light Communication Using Probabilistically Shaped OFDM Modulation," 2018 Optical Fiber Communications Conference and Exposition (OFC), San Diego, CA, USA, Jun. 14, 2018, pp. 1-3.
O. Iscan et al., "Probabilistic Shaping Using 5G New Radio Polar Codes," in IEEE Access, vol. 7, Feb. 7, 2019, pp. 22579-22587, doi: 10.1109/ACCESS.2019.2898103.
L. Schmalen, "Probabilistic Constellation Shaping: Challenges and Opportunities for Forward Error Correction," 2018 Optical Fiber Communications Conference and Exposition (OFC), San Diego, CA, USA, Jun. 14, 2018, pp. 1-3.
T. Wen, et al., "A New Journey of 6G Wireless Communication: Crossing the Internet of People and the Internet of Things, and Moving Towards the Intelligent Connection of Everything," Sep. 2019. total 29 pages.
Andrej Rode et al., "End-to-end Optimization of Constellation Shaping for Wiener Phase Noise Channels with a Differentiable Blind Phase Search", arxiv.org, Cornell University Library, 201 Olin Library Cornell University Ithaca, NY 14853, Dec. 7, 2022, XP091388447, total 9 pages.
Ognjen Jovanovic et al., "End-to-end Learning of a Constellation Shape Robust to Variations in SNR and Laser Linewidth", 2021 European Conference on Optical Communication (ECOC), IEEE, Sep. 13, 2021 (Sep. 13, 2021), pp. 1-4, XP034027404.
Dario Pilori et al., "Non-Linear Phase Noise Mitigation Over Systems Using Constellation Shaping", Journal of Lightwave Technology, IEEE, USA, vol. 37, No. 14, Jul. 15, 2019, pp. 3475-3482, XP011731624.
Sahar Z Poor et al., "A New Probabilistic Constellation Shaping Scheme for APSK Modulation", 2021 Iran Workshop on Communication and Information Theory (IWCIT), IEEE, May 19, 2021, pp. 1-4, XP033963273.

* cited by examiner

MODULATION METHOD, DEMODULATION METHOD, AND RELATED APPARATUS

CROSS-REFERENCE TO RELATED APPLICATIONS

This application is a continuation of International Application No. PCT/CN2022/137805, filed on Dec. 9, 2022, which claims priority to Chinese Patent Application No. 202111620131.6, filed on Dec. 27, 2021. The disclosures of the aforementioned applications are hereby incorporated by reference in their entireties.

TECHNICAL FIELD

This application relates to the field of communication technologies, and in particular, to a modulation method, a demodulation method, and a related apparatus.

BACKGROUND

In a 4th generation (4G) mobile communication system or a 5th generation (5G) mobile communication system, a probabilistic constellation shaping (PCS) modulation scheme is used to modulate bit streams, to reduce a signal-to-noise ratio based on a shaping gain.

Probabilistic constellation shaping achieves a shaping gain by modifying probability distributions of constellation points in a quadrature amplitude modulation (QAM) constellation diagram. A probability distribution of each constellation point is different, but a geometric position of constellation mapping remains unchanged. The shaping gain increases with a modulation order, and higher-order constellations have higher shaping gains, such that system performance and spectral efficiency are further improved. A probability distribution in a probabilistic shaping constellation diagram conforms with Maxwell-Boltzmann distribution. The probabilistic shaping constellation diagram intuitively shows that probability distributions of constellation points in each circle of the probabilistic shaping constellation diagram are the same, probability distributions of constellation points in an inner circle are large, and probability distributions of constellation points in an outer circle are small. The probability distributions of the constellation points in the probabilistic shaping constellation diagram have a shaping gain.

However, how to perform modulation through probabilistic constellation shaping to ensure shaping gains obtained in different scenarios is a problem worth considering, for example, how to perform modulation through probabilistic constellation shaping to ensure a shaping gain in a high-frequency scenario.

SUMMARY

This application provides a modulation method, a demodulation method, and a related apparatus, to ensure a shaping gain obtained by using a probabilistic constellation shaping technology under impact of phase noise.

A first aspect of this application provides a modulation method, including:

A first communication apparatus determines probability distributions of constellation points in a target probabilistic shaping constellation diagram based on a Maxwell-Boltzmann distribution parameter and a phase noise parameter. The first communication apparatus modulates a first original bit stream and a second original bit stream based on the probability distributions of the constellation points in the target probabilistic shaping constellation diagram, to obtain a first QAM symbol stream.

In the foregoing technical solution, the first communication apparatus generates the probability distributions of the constellation points in the target probabilistic shaping constellation diagram based on the Maxwell-Boltzmann distribution parameter and the phase noise parameter, and then modulates the first original bit stream and the second original bit stream based on the probability distributions of the constellation points in the target probabilistic shaping constellation diagram. This helps improve a capability of resisting phase noise, and ensures a shaping gain obtained by using a probabilistic constellation shaping technology under impact of the phase noise. For example, the first communication apparatus can ensure, by performing the technical solution of this application, a shaping gain brought by using probabilistic constellation shaping modulation in a high-frequency scenario.

In a possible implementation, the phase noise parameter includes a quantity of constellation points in each circle of the target probabilistic shaping constellation diagram and a phase noise scaling factor;

- the phase noise parameter includes the phase noise scaling factor and a first angle difference corresponding to each circle of the target probabilistic shaping constellation diagram, where the first angle difference corresponding to each circle is a smallest value of angle differences between angles respectively corresponding to every two adjacent constellation points in a plurality of constellation points in each circle; or
- the phase noise parameter includes a quantity of constellation points in each circle of the target probabilistic shaping constellation diagram, a first angle difference corresponding to each circle of the target probabilistic shaping constellation diagram, and the phase noise scaling factor.

In this implementation, a larger quantity of constellation points in each circle indicates greater impact on demodulation performance after the constellation points turn a circle due to the impact of the phase noise. Therefore, a quantity of constellation points in each circle of the target probabilistic shaping constellation diagram may represent an impact magnitude of the phase noise, and the phase noise scaling factor represents an impact degree of the phase noise. A smaller angle difference between angles corresponding to two adjacent constellation points in each circle indicates greater impact on the demodulation performance after the constellation points turn a circle due to the impact of the phase noise. Therefore, the first angle difference corresponding to each circle of the target probabilistic shaping constellation diagram represents an impact magnitude of the phase noise. The first communication apparatus may determine the probability distributions of the constellation points in the target probabilistic shaping constellation diagram based on the phase noise parameter shown in the foregoing implementation. This helps improve the capability of resisting the phase noise, and ensures the shaping gain obtained by using the probabilistic constellation shaping technology under the impact of the phase noise.

In another possible implementation, that the first communication apparatus modulates a first original bit stream and a second original bit stream based on the probability distributions of the constellation points in the target probabilistic shaping constellation diagram, to obtain a first QAM symbol stream includes:

The first communication apparatus determines, based on the probability distributions and signal amplitudes of the constellation points in the target probabilistic shaping constellation diagram, a symbol type quantity, a probability distribution corresponding to a first symbol of each symbol type, and a bit quantity corresponding to each first symbol, where the symbol type quantity and the probability distribution corresponding to the first symbol of each symbol type indicate probability distributions and signal amplitudes of quadrature signals of the constellation points in the target probabilistic shaping constellation diagram, and probability distributions and signal amplitudes of inphase signals of the constellation points; the bit quantity corresponding to each first symbol is a bit quantity required by each first symbol that is represented by using a bit; and first symbols of different symbol types correspond to different probability distributions and/or different signal amplitudes. The first communication apparatus generates a first symbol stream based on the symbol type quantity, the probability distribution corresponding to the first symbol of each symbol type, the bit quantity corresponding to each first symbol, and the first original bit stream. The first communication apparatus generates the first QAM symbol stream based on the first symbol stream and the second original bit stream.

In this implementation, the symbol type quantity and the probability distribution corresponding to the first symbol of each symbol type indicate the probability distributions and the signal amplitudes of the quadrature signals of the constellation points in the target probabilistic shaping constellation diagram and the probability distributions and the signal amplitudes of the inphase signals of the constellation points. In other words, in a process of determining the first symbol stream, the first communication apparatus processes a quadrature signal (an I-channel signal) and an inphase signal (a Q-channel signal) in a QAM symbol together. That is, the first communication apparatus generates the first symbol stream by using one CCDM, and generates the first QAM symbol stream based on the first symbol stream and the second original bit stream. There is no need to use two CCDMs to generate a symbol stream corresponding to the I-channel signal and a symbol stream corresponding to the Q-channel signal, and then combine the two symbol streams into the QAM symbol. This reduces system complexity. In addition, the I-channel signal and the Q-channel signal in the target probabilistic shaping constellation diagram may have a same probability distribution, or may have different probability distributions, to adapt to probability distributions of different symmetry, thereby improving applicability of the solution.

In another possible implementation, a first symbol in the first symbol stream is a complex-valued symbol in which a value of a real part and a value of an imaginary part are both greater than or equal to 0.

It can be learned from this implementation that signal amplitudes of signals corresponding to first symbols in the first symbol stream are all greater than or equal to 0. In other words, the first symbol stream is used to determine a value of a signal amplitude of a signal corresponding to the first symbol, but is not used to determine a sign bit of the signal corresponding to the first symbol.

In another possible implementation, the method further includes:

The first communication apparatus interleaves and separates, according to a first interleaving and separation rule, a plurality of first symbols included in the first symbol stream, to obtain an interleaved first symbol stream. That the first communication apparatus generates the first QAM symbol stream based on the first symbol stream and the second bit stream includes: The first communication apparatus generates the first QAM symbol stream based on the interleaved first symbol stream and the second bit stream.

In this implementation, the first communication apparatus interleaves, according to the first interleaving and separation rule, the first symbols included in the first symbol stream. This helps ensure a probability distribution of an I channel and a probability distribution of a Q channel in the target probabilistic shaping constellation diagram. In addition, a centralized error in the first symbol stream is avoided, and decoding error correction performance is not affected. The first communication apparatus may decentralize, through interleaving, first symbols in which errors occur in the interleaved first symbol stream, in other words, decentralize the first symbols in error in the first symbol stream. This improves robustness of decoding error correction.

In another possible implementation, that the first communication apparatus generates the first QAM symbol stream based on the first symbol stream and the second original bit stream includes:

The first communication apparatus maps the first symbol stream to a first bit stream according to a first mapping rule, where the first mapping rule is a mapping relationship between a first symbol and a bit, and a quantity of bits to which each first symbol is mapped is the bit quantity corresponding to each first symbol.

The first communication apparatus performs encoding based on the first bit stream and the second original bit stream to obtain a first check bit stream.

The first communication apparatus determines a second bit stream based on the first check bit stream and the second original bit stream. The first communication apparatus generates the first QAM symbol stream based on the first symbol stream and the second bit stream.

In this implementation, a specific implementation in which the first communication apparatus generates the first QAM symbol stream based on the first symbol stream and the second original bit stream is provided. This facilitates implementation of the solution. In addition, the first communication apparatus performs encoding based on the first bit stream and the second original bit stream to obtain the first check bit stream, and then determines the second bit stream based on the first check bit stream and the second original bit stream. The first communication apparatus generates the first QAM symbol stream based on the first symbol stream and the second bit stream. This helps a decoder perform decoding based on the first check bit stream, thereby improving decoding performance of the decoder.

In another possible implementation, each first symbol in the first symbol stream corresponds to one constellation point in the target probabilistic shaping constellation diagram; and each first symbol in the first symbol stream indicates a signal amplitude of the constellation point corresponding to the first symbol, and the second bit stream indicates a sign bit of a quadrature signal of the constellation point corresponding to each first symbol in the first symbol stream and a sign bit of an inphase signal of the constellation point.

In this implementation, a relationship between the first symbol in the first symbol stream and a constellation point in the target probabilistic shaping constellation diagram and a relationship between the second bit stream and the first symbol in the first symbol stream are shown. In this way, the first communication apparatus generates the first QAM symbol stream based on the first symbol stream and the second bit stream. That is, the first symbol in the first symbol stream is used as a signal amplitude of the constellation point, and a bit in the second bit stream determines a quadrant in which the constellation point corresponding to the first symbol falls.

In another possible implementation, each first symbol in the first symbol stream indicates the signal amplitude of the constellation point corresponding to the first symbol, a $(2i-1)^{th}$ bit in the second bit stream indicates a sign bit of a quadrature signal of a constellation point corresponding to an $i^{th}$ first symbol in the first symbol stream, a $2i^{th}$ bit in the second bit stream indicates a sign bit of an inphase signal of the constellation point corresponding to the $i^{th}$ first symbol in the first symbol stream, and i is an integer greater than or equal to 1.

In this implementation, a correspondence between the bit in the second bit stream and the first symbol is clearly shown, so that the first communication apparatus determines the quadrant in which the constellation point corresponding to the first symbol falls.

In another possible implementation, each first symbol in the first symbol stream corresponds to a quadrature signal or an inphase signal of one constellation point in the target probabilistic shaping constellation diagram; and each first symbol in the first symbol stream indicates a signal amplitude of the quadrature signal or the inphase signal corresponding to the first symbol, and the second bit stream indicates a sign bit of the quadrature signal or the inphase signal corresponding to each first symbol in the first symbol stream.

In this implementation, a relationship between the first symbol in the first symbol stream and a quadrature signal or an inphase signal of a constellation point in the target probabilistic shaping constellation diagram and a relationship between the second bit stream and the first symbol in the first symbol stream are shown. In this way, the first communication apparatus generates the first QAM symbol stream based on the first symbol stream and the second bit stream. That is, the first symbol in the first symbol stream is used as a signal amplitude of the quadrature signal or the inphase signal of the constellation point, and a bit in the second bit stream determines half axes (including a positive half axis and a negative half axis) on which the quadrature signal or the inphase signal of the constellation point corresponding to the first symbol falls.

In another possible implementation, an odd-numbered first symbol in the first symbol stream corresponds to a quadrature signal of a constellation point in the target probabilistic shaping constellation diagram, and an even-numbered first symbol in the first symbol stream corresponds to an inphase signal of a constellation point in the target probabilistic shaping constellation diagram; and the odd-numbered first symbol in the first symbol stream indicates a signal amplitude of the quadrature signal corresponding to the first symbol, and the even-numbered first symbol in the first symbol stream indicates a signal amplitude of the inphase signal corresponding to the first symbol; and an odd-numbered bit in the second bit stream indicates a sign bit of the quadrature signal corresponding to the odd-numbered first symbol, and an even-numbered bit in the second bit stream indicates a sign bit of the inphase signal corresponding to the even-numbered first symbol.

In this implementation, a correspondence between the bit in the second bit stream and the first symbol is clearly shown, so that the first communication apparatus determines the half axes on which the quadrature signal or the inphase signal of the constellation point corresponding to the first symbol falls.

In another possible implementation, the first bit stream and the second original bit stream are located in a first code block, a length of the first code block is greater than a code block length supported by the first communication apparatus, the first bit stream includes a plurality of first bits, and the second original bit stream includes a plurality of second bits.

That the first communication apparatus performs encoding based on the first bit stream and the second original bit stream to obtain a first check bit stream includes:

The first communication apparatus determines first transport block cyclic redundancy check (TB CRC) bits based on the first bit stream and the second original bit stream. The first communication apparatus determines the first code block as M code subblocks. The first communication apparatus separately encodes the M code subblocks to obtain code block cyclic redundancy check (code book cyclic redundancy check, CB CRC) bits corresponding to the M code subblocks. The first communication apparatus determines the first check bit stream based on the CB CRC bits and the first TB CRC bits that correspond to the M code subblocks, where the first check bit stream includes check bits corresponding to the M code subblocks, and a check bit corresponding to an $M^{th}$ code subblock in the M code subblocks includes a CB CRC bit and a first TB CRC bit that correspond to the $M^{th}$ code subblock; each of the M code subblocks includes a part of the plurality of first bits and a part of the plurality of second bits, and different code subblocks include different first bits and different second bits; M is equal to a rounded-up ratio of the length of the first code block to the code block length supported by the first communication apparatus; and a ratio of a first bit included in each of the M code subblocks to a first value is equal to a first ratio, the first value is equal to a sum of a quantity of second bits included in each code subblock and a quantity of check bits included in each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

In this implementation, the first communication apparatus segments the first code block, so that each of the code subblocks obtained through segmentation includes bit information required for forming a QAM symbol, and each code subblock may independently form the QAM symbol. This ensures performance of a probabilistic shaping constellation system in a multi-code-block scenario, and ensures that a receive device can correctly perform demodulation.

In another possible implementation, the method further includes:

The first communication apparatus obtains a channel state parameter. The first communication apparatus determines supported maximum spectral efficiency (SE) based on the channel state parameter. The first communication apparatus determines, based on the maximum frequency, a first coding rate, the phase noise scaling factor, a first modulation order corresponding to the target probabilistic shaping constellation diagram, and the Maxwell-Boltzmann distribution parameter.

That a first communication apparatus determines probability distributions of constellation points in a target probabilistic shaping constellation diagram based on a Maxwell-Boltzmann distribution parameter and a phase noise parameter includes:

The first communication apparatus determines the probability distributions of the constellation points in the target probabilistic shaping constellation diagram based on the Maxwell-Boltzmann distribution parameter, the phase noise parameter, and the first modulation order, where the phase noise parameter includes the phase noise scaling factor.

That the first communication apparatus generates a first symbol stream based on the symbol type quantity, the probability distribution corresponding to the first symbol of each symbol type, the bit quantity corresponding to each first symbol, and the first original bit stream includes:

The first communication apparatus generates the first symbol stream based on the first coding rate, the symbol type quantity, the probability distribution corresponding to the first symbol of each symbol type, the bit quantity corresponding to each first symbol, and the first original bit stream.

In this implementation, the first communication apparatus determines the supported maximum spectral efficiency based on the channel state parameter, so that the Maxwell-Boltzmann distribution parameter and the phase noise scaling factor can be further adjusted when the first coding rate and the first modulation order are changed. In this way, spectral efficiency can be adjusted more flexibly, and spectral efficiency at a finer granularity can be achieved. Then, the first communication apparatus determines the probability distributions of the constellation points in the target probabilistic shaping constellation diagram based on the first coding rate, the Maxwell-Boltzmann distribution parameter, the phase noise parameter, and the first modulation order. This increases a shaping gain brought by probabilistic constellation shaping modulation, and improves system modulation performance.

In another possible implementation, when a first coding rate used by the first communication apparatus and a first modulation order corresponding to the target probabilistic shaping constellation diagram remain unchanged, the method further includes:

The first communication apparatus obtains a channel state parameter. The first communication apparatus determines supported maximum spectral efficiency based on the channel state parameter. The first communication apparatus determines, based on the maximum spectral efficiency, the phase noise scaling factor and the Maxwell-Boltzmann distribution parameter corresponding to the target probabilistic shaping constellation diagram.

That a first communication apparatus determines probability distributions of constellation points in a target probabilistic shaping constellation diagram based on a Maxwell-Boltzmann distribution parameter and a phase noise parameter includes:

The first communication apparatus determines the probability distributions of the constellation points in the target probabilistic shaping constellation diagram based on the Maxwell-Boltzmann distribution parameter, the phase noise parameter, and the first modulation order, where the phase noise parameter includes the phase noise scaling factor.

That the first communication apparatus generates a first symbol stream based on the symbol type quantity, the probability distribution corresponding to the first symbol of each symbol type, the bit quantity corresponding to each first symbol, and the first original bit stream includes:

The first communication apparatus generates the first symbol stream based on the first coding rate, the symbol type quantity, the probability distribution corresponding to the first symbol of each symbol type, the bit quantity corresponding to each first symbol, and the first original bit stream.

In this implementation, the first communication apparatus determines the supported maximum spectral efficiency based on the channel state parameter, to adjust the Maxwell-Boltzmann distribution parameter and the phase noise scaling factor when the first coding rate and the first modulation order remain unchanged. This helps flexibly adjust spectral efficiency, and achieve spectral efficiency at a finer granularity. Then, the first communication apparatus determines the probability distributions of the constellation points in the target probabilistic shaping constellation diagram based on the first coding rate, the Maxwell-Boltzmann distribution parameter, the phase noise parameter, and the first modulation order. This increases a shaping gain brought by probabilistic constellation shaping modulation, and improves system modulation performance.

In another possible implementation, a first net transmission rate corresponding to a case in which the first communication apparatus performs modulation by using a uniform modulation scheme is equal to a product of a second modulation order corresponding to the uniform modulation scheme and a second coding rate corresponding to the uniform modulation scheme, and the method further includes:

The first communication apparatus sets the second modulation order to a first modulation order corresponding to the target probabilistic shaping constellation diagram.

The first communication apparatus sets the first net transmission rate to a net transmission rate corresponding to a case in which the first communication apparatus uses probabilistic constellation shaping modulation.

The first communication apparatus obtains, through calculation based on the first net transmission rate and the first modulation order, a first coding rate, the phase noise scaling factor, and the Maxwell-Boltzmann distribution parameter corresponding to the target probabilistic shaping constellation diagram.

That a first communication apparatus determines probability distributions of constellation points in a target probabilistic shaping constellation diagram based on a Maxwell-Boltzmann distribution parameter and a phase noise parameter includes:

The first communication apparatus determines the probability distributions of the constellation points in the target probabilistic shaping constellation diagram based on the Maxwell-Boltzmann distribution parameter, the phase noise parameter, and the first modulation order, where the phase noise parameter includes the phase noise scaling factor.

That the first communication apparatus generates a first symbol stream based on the symbol type quantity, the probability distribution corresponding to the first symbol of each symbol type, the bit quantity corresponding to each first symbol, and the first original bit stream includes:

The first communication apparatus generates the first symbol stream based on the first coding rate, the symbol type quantity, the probability distribution corresponding to the first symbol of each symbol type, the bit quantity corresponding to each first symbol, and the first original bit stream.

In this implementation, when the probabilistic constellation shaping modulation and uniform modulation have a same net transmission rate, the first communication apparatus may implement a lower signal-to-noise ratio (SNR) threshold by increasing the first coding rate, or achieve higher spectral efficiency under a same signal-to-noise ratio requirement. This increases a shaping gain brought by the probabilistic constellation shaping modulation, and improves system performance.

In another possible implementation, a first net transmission rate corresponding to a case in which the first communication apparatus performs modulation by using a uniform modulation scheme is equal to a product of a second modulation order corresponding to the uniform modulation scheme and a second coding rate corresponding to the uniform modulation scheme, and the method further includes:

The first communication apparatus sets the second coding rate to a first coding rate used when the first communication apparatus uses probabilistic constellation shaping modulation. The first communication apparatus sets a first modulation order corresponding to the target probabilistic shaping constellation diagram to the second modulation order plus a first preset value. The first communication apparatus sets the first net transmission rate to a net transmission rate corresponding to a case in which the first communication apparatus uses the probabilistic constellation shaping modulation. The first communication apparatus determines, based on the first net transmission rate and the first modulation order, the Maxwell-Boltzmann distribution parameter corresponding to the target probabilistic shaping constellation diagram.

That a first communication apparatus determines probability distributions of constellation points in a target probabilistic shaping constellation diagram based on a Maxwell-Boltzmann distribution parameter and a phase noise parameter includes:

The first communication apparatus determines the probability distributions of the constellation points in the target probabilistic shaping constellation diagram based on the Maxwell-Boltzmann distribution parameter, the phase noise parameter, and the first modulation order, where the phase noise parameter includes the phase noise scaling factor.

That the first communication apparatus generates a first symbol stream based on the symbol type quantity, the probability distribution corresponding to the first symbol of each symbol type, the bit quantity corresponding to each first symbol, and the first original bit stream includes:

The first communication apparatus generates the first symbol stream based on the first coding rate, the symbol type quantity, the probability distribution corresponding to the first symbol of each symbol type, the bit quantity corresponding to each first symbol, and the first original bit stream.

In this implementation, when the probabilistic constellation shaping modulation and uniform modulation have a same net transmission rate, the first communication apparatus may implement a lower signal-to-noise ratio threshold by increasing the first modulation order corresponding to the target probabilistic shaping constellation diagram or achieve higher spectral efficiency under a same signal-to-noise ratio requirement. This increases a shaping gain brought by the probabilistic constellation shaping modulation, and improves system performance.

In another possible implementation, the method further includes:

The first communication apparatus sends first indication information to a second communication apparatus, where the first indication information indicates the first coding rate, the phase noise scaling factor, the first modulation order corresponding to the target probabilistic shaping constellation diagram, and the Maxwell-Boltzmann distribution parameter; or the first indication information indicates a first modulation and coding scheme (MCS), the phase noise scaling factor, and the Maxwell-Boltzmann distribution parameter, where the first MCS indicates the first coding rate and the first modulation order.

In this implementation, the first communication apparatus may indicate these parameters to the second communication apparatus, to enable the second communication apparatus to perform the probabilistic constellation shaping modulation based on these parameters. The first communication apparatus may add indications of the Maxwell-Boltzmann distribution parameter and the phase noise scaling factor to an existing MCS indication; or the first coding rate, the first modulation order, the phase noise scaling factor, and the Maxwell-Boltzmann distribution parameter are directly indicated.

In another possible implementation, the method further includes:

The first communication apparatus sends second indication information to a second communication apparatus, where the second indication information indicates a second MCS and an order-increase equal-entropy scheme, or indicates a second MCS and an equal-order coding rate increase scheme, where the second MCS indicates the second modulation order and the second coding rate.

In this implementation, the first communication apparatus may send the second indication information to the second communication apparatus, to indicate the second MCS and a manner (for example, the order-increase equal-entropy scheme or the equal-order coding rate increase scheme) for determining the first coding rate, the first modulation order, the phase noise scaling factor, and the Maxwell-Boltzmann distribution parameter, so that the second communication apparatus determines the first coding rate, the first modulation order, the phase noise scaling factor, and the Maxwell-Boltzmann distribution parameter based on the second indication information.

In another possible implementation, if the Maxwell-Boltzmann distribution parameter is not equal to 0 and the phase noise scaling factor is equal to 0, the modulation includes the probabilistic constellation shaping modulation; or if neither the Maxwell-Boltzmann distribution parameter nor the phase noise scaling factor is equal to 0, the modulation includes phase-noise-based probabilistic constellation shaping modulation.

In this implementation, modulation schemes corresponding to different values of the Maxwell-Boltzmann distribution parameter and the phase noise scaling factor are shown. In other words, the technical solution of this application is compatible with a plurality of modulation schemes, for example, possible modulation schemes such as the probabilistic constellation shaping modulation and the phase-noise-based probabilistic constellation shaping modulation. Therefore, an application scenario of this application is expanded.

In another possible implementation, the method further includes:

The first communication apparatus obtains the channel state parameter, where if a value of the channel state parameter is greater than or equal to a first threshold, the modulation includes the probabilistic constellation shaping modulation or the phase-noise-based probabilistic constellation shaping modulation.

In this implementation, the first communication apparatus may enable the probabilistic constellation shaping modulation or the phase-noise-based probabilistic constellation shaping modulation based on the channel state parameter, to select an appropriate modulation scheme based on a channel state environment. This improves communication transmission performance.

A second aspect of this application provides a demodulation method, including:

A second communication apparatus obtains a second QAM symbol stream. The second communication apparatus determines probability distributions of constellation points in a target probabilistic shaping constellation diagram based on a Maxwell-Boltzmann distribution parameter and a phase noise parameter. The second communication apparatus demodulates the second QAM symbol stream based on the probability distributions of the constellation points in the target probabilistic shaping constellation diagram, to obtain a third original bit stream and a fourth original bit stream.

In the foregoing technical solution, the second communication apparatus determines the probability distributions of the constellation points in the target probabilistic shaping constellation diagram based on the Maxwell-Boltzmann distribution parameter and the phase noise parameter. The second communication apparatus demodulates the second QAM symbol stream based on the probability distributions of the constellation points in the target probabilistic shaping constellation diagram, to obtain the third original bit stream and the fourth original bit stream. This helps improve a capability of resisting phase noise, improve demodulation performance of the second communication apparatus, and ensure a shaping gain obtained by using a probabilistic constellation shaping technology under impact of the phase noise.

In a possible implementation, the phase noise parameter includes a quantity of constellation points in each circle of the target probabilistic shaping constellation diagram and a phase noise scaling factor;

- the phase noise parameter includes the phase noise scaling factor and a first angle difference corresponding to each circle of the target probabilistic shaping constellation diagram, where the first angle difference corresponding to each circle is a smallest value of angle differences between angles respectively corresponding to every two adjacent constellation points in a plurality of constellation points in each circle; or
- the phase noise parameter includes a quantity of constellation points in each circle of the target probabilistic shaping constellation diagram, the quantity of constellation points in each circle of the target probabilistic shaping constellation diagram, and a phase noise scaling factor.

In this implementation, a larger quantity of constellation points in each circle indicates greater impact on the demodulation performance after the constellation points turn a circle due to the impact of the phase noise. Therefore, a quantity of constellation points in each circle of the target probabilistic shaping constellation diagram may represent an impact magnitude of the phase noise, and the phase noise scaling factor represents an impact degree of the phase noise. A smaller angle difference between angles corresponding to two adjacent constellation points in each circle indicates greater impact on the demodulation performance after the constellation points turn a circle due to the impact of the phase noise. Therefore, the first angle difference corresponding to each circle of the target probabilistic shaping constellation diagram may represent an impact magnitude of the phase noise, and the phase noise scaling factor represents the impact degree of the phase noise. The second communication apparatus may determine the probability distributions of the constellation points in the target probabilistic shaping constellation diagram based on the phase noise parameter shown in the foregoing implementation. This helps improve the capability of resisting the phase noise, improves the demodulation performance of the second communication apparatus, and ensures the shaping gain obtained by using the probabilistic constellation shaping technology under the impact of the phase noise.

In another possible implementation, that the second communication apparatus demodulates the second QAM symbol stream based on the probability distributions of the constellation points in the target probabilistic shaping constellation diagram, to obtain a third original bit stream and a fourth original bit stream includes:

The second communication apparatus demodulates the second QAM symbol stream to obtain a third bit stream.

The second communication apparatus parses the third bit stream to obtain a system bit stream and a second check bit stream.

The second communication apparatus performs decoding based on the system bit stream and the second check bit stream to obtain a fourth bit stream and the fourth original bit stream.

The second communication apparatus determines, based on the probability distributions and signal amplitudes of the constellation points in the target probabilistic shaping constellation diagram, a symbol type quantity, a probability distribution corresponding to a second symbol of each symbol type, and a bit quantity corresponding to each second symbol, where the symbol type quantity and the probability distribution corresponding to the second symbol of each symbol type indicate probability distributions and signal amplitudes of quadrature signals of the constellation points in the target probabilistic shaping constellation diagram, and probability distributions and signal amplitudes of the constellation points; the bit quantity corresponding to each second symbol is a quantity of bits required for representing the second symbol by using the bit; and second symbols of different symbol types correspond to different probability distributions and/or different signal amplitudes.

The second communication apparatus maps the fourth bit stream to a second symbol stream according to a second mapping rule, where the second mapping rule is a mapping relationship between a bit and a second symbol, and the bit quantity corresponding to each second symbol in the second symbol stream is the bit quantity corresponding to each second symbol; the symbol type quantity of second symbols included in the second symbol stream and the probability distribution corresponding to the second symbol of each symbol type indicate the probability distributions and the signal amplitudes of the quadrature signals of the constellation points in the target probabilistic shaping constellation diagram, and the probability distributions and the signal amplitudes of the constellation points; and second symbols of different symbol types correspond to different probability distributions and/or different signal amplitudes.

The second communication apparatus parses the second symbol stream based on the symbol type quantity, the bit quantity corresponding to each second symbol, and the probability distribution corresponding to each symbol type, to obtain the third original bit stream.

In this implementation, the bit quantity corresponding to each second symbol in the second symbol stream is the bit quantity corresponding to each second symbol; the symbol type quantity of the second symbols included in the second symbol stream and the probability distribution corresponding to the second symbol of each symbol type indicate the probability distributions and the signal amplitudes of the quadrature signals of the constellation points in the target probabilistic shaping constellation diagram, and the probability distributions and the signal amplitudes of the constellation points; and symbols of different symbol types correspond to different probability distributions and/or different signal amplitudes. The second communication apparatus parses the second symbol stream based on the symbol type quantity, the bit quantity corresponding to each second symbol, and the probability distribution corresponding to each symbol type, to obtain a sixth bit stream. In other words, in a process of determining the second symbol stream, the second communication apparatus processes a quadrature signal (an I-channel signal) and an inphase signal (a Q-channel signal) in a QAM symbol together. That is, the second communication apparatus determines the second symbol stream by using one de-CCDM, and parses the second symbol stream based on the symbol type quantity, the bit quantity corresponding to each second symbol, and the probability distribution corresponding to each symbol type, to obtain the sixth bit stream. This reduces system complexity. In addition, the I-channel signal and the Q-channel signal in the target probabilistic shaping constellation diagram may have a same probability distribution, or may have different probability distributions, to adapt to probability distributions of different symmetry, thereby improving applicability of the solution.

In another possible implementation, the method further includes:

The second communication apparatus de-interleaves and separates, according to a first de-interleaving and separation rule, the plurality of second symbols included in the second symbol stream, to obtain a de-interleaved second symbol stream.

That the second communication apparatus parses the second symbol stream based on the symbol type quantity, the bit quantity corresponding to each second symbol, and the probability distribution corresponding to each symbol type, to obtain a sixth bit stream includes:

The second communication apparatus parses the de-interleaved second symbol stream based on the symbol type quantity, the bit quantity corresponding to each symbol, and the probability distribution corresponding to each symbol type, to obtain the sixth bit stream.

In this implementation, the second communication apparatus de-interleaves and separates, according to the first de-interleaving and separation rule, the plurality of second symbols included in the second symbol stream, to obtain the de-interleaved second symbol stream. Therefore, the second communication apparatus correctly parses the second symbol stream.

In another possible implementation, the second symbol in the second symbol stream is a complex-valued symbol in which a value of a real part and a value of an imaginary part are both greater than or equal to 0.

It can be learned from this implementation that signal amplitudes of signals corresponding to the second symbols in the second symbol stream are all greater than or equal to 0. In other words, the second symbol stream is used to determine a value of a signal amplitude of a signal corresponding to the second symbol, but is not used to determine a sign bit of the signal corresponding to the second symbol.

In another possible implementation, the system bit stream includes a plurality of third bits and a plurality of fourth bits, the system bit stream is located in a second code block, and a length of the second code block is greater than a code block length supported by the second communication apparatus; and the method further includes:

The second communication apparatus determines the second code block as M code subblocks, where each of the M code subblocks includes a part of the third bits and a part of the fourth bits, and different code subblocks include different third bits and different fourth bits.

The second communication apparatus determines the second check bit stream as M portions of check bits, where the M portions of check bits one-to-one correspond to the M code subblocks, and a check bit corresponding to an $M^{th}$ code subblock in the M code subblocks includes a first TB CRC bit; M is equal to a rounded-up ratio of the length of the second code block to the code block length supported by the second communication apparatus; and a ratio of a quantity of third bits in each of the M code subblocks to a second value is equal to a first ratio, the second value is equal to a sum of a quantity of fourth bits included in each code subblock and a quantity of check bits corresponding to each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

That the second communication apparatus performs decoding based on the system bit stream and the second check bit stream to obtain a fourth bit stream and the fourth original bit stream includes:

The second communication apparatus decodes each code subblock and a check bit corresponding to each code subblock, to obtain a fifth bit corresponding to each code subblock and a sixth bit corresponding to each code subblock.

The second communication apparatus determines the fifth bits corresponding to all the code subblocks as the fourth bit stream, and determines the sixth bits corresponding to all the code subblocks as the fourth original bit stream.

In this implementation, the second communication apparatus segments the second code block, splits the second check bit stream, and then decodes the M code subblocks and the check bit corresponding to each code subblock, to obtain the corresponding bit streams. This implements correct demodulation of the second communication apparatus, and ensures performance of a probabilistic shaping constellation system in a multi-code-block scenario.

In another possible implementation, the method further includes:

The second communication apparatus receives first indication information from a first communication apparatus, where the first indication information indicates a first coding rate, the phase noise scaling factor, a first modulation order corresponding to the target probabilistic shaping constellation diagram, and the Maxwell-Boltzmann distribution parameter; or the first indication information indicates a first MCS, the phase noise scaling factor, and the Maxwell-Boltzmann distribution parameter, where the first MCS indicates a first coding rate and a first modulation order.

That the second communication apparatus determines probability distributions of constellation points in a target probabilistic shaping constellation diagram based on a Maxwell-Boltzmann distribution parameter and a phase noise parameter includes:

The second communication apparatus determines the probability distributions of the constellation points in the target probabilistic shaping constellation diagram based on the first modulation order, the phase noise parameter, and the Maxwell-Boltzmann distribution parameter, where the phase noise parameter includes the phase noise scaling factor.

That the second communication apparatus parses the second symbol stream based on the symbol type quantity, the bit quantity corresponding to each second symbol, and the probability distribution corresponding to each symbol type, to obtain the third original bit stream includes:

The second communication apparatus parses the second symbol stream based on the first coding rate, the symbol type quantity, the bit quantity corresponding to each second symbol, and the probability distribution corresponding to each symbol type, to obtain the third original bit stream.

In this implementation, the second communication apparatus receives the first indication information from the first communication apparatus, and determines the probability distributions of the constellation points in the target probabilistic shaping constellation diagram based on the parameters indicated by the first indication information. This helps increase a shaping gain brought by probabilistic constellation shaping modulation, and improves system modulation performance.

In another possible implementation, the method further includes:

The second communication apparatus receives second indication information from a first communication apparatus, where the second indication information indicates a second MCS and an order-increase equal-entropy scheme, or indicates a second MCS and an equal-order coding rate increase scheme, and the second MCS indicates a second modulation order corresponding to a uniform modulation scheme and a second coding rate corresponding to the uniform modulation scheme.

In this implementation, the second indication information indicates the second modulation and coding scheme MCS and the order-increase equal-entropy scheme, or indicates the second MCS and the equal-order coding rate increase scheme. Therefore, the second communication apparatus determines the probability distributions of the constellation points in the target probabilistic shaping constellation diagram based on the second indication information.

In another possible implementation, if the second indication information indicates the equal-order coding rate increase scheme, the method further includes:

The second communication apparatus determines, by using the equal-order coding rate increase scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter.

That the second communication apparatus determines probability distributions of constellation points in a target probabilistic shaping constellation diagram based on a Maxwell-Boltzmann distribution parameter and a phase noise parameter includes:

The second communication apparatus determines the probability distributions of the constellation points in the target probabilistic shaping constellation diagram based on the first modulation order, the phase noise parameter, and the Maxwell-Boltzmann distribution parameter, where the phase noise parameter includes the phase noise scaling factor.

That the second communication apparatus parses the second symbol stream based on the symbol type quantity, the bit quantity corresponding to each second symbol, and the probability distribution corresponding to each symbol type, to obtain the third original bit stream includes:

The second communication apparatus parses the second symbol stream based on the first coding rate, the symbol type quantity, the bit quantity corresponding to each second symbol, and the probability distribution corresponding to each symbol type, to obtain the third original bit stream.

In this implementation, when the probabilistic constellation shaping modulation and uniform modulation have a same net transmission rate, the second communication apparatus may implement a lower signal-to-noise ratio threshold by increasing the first coding rate, or achieve higher spectral efficiency under a same signal-to-noise ratio requirement. This increases a shaping gain brought by the probabilistic constellation shaping modulation, and improves system performance.

In another possible implementation, a first net transmission rate corresponding to a case in which the first communication apparatus performs modulation by using the uniform modulation scheme is equal to a product of the second modulation order corresponding to the uniform modulation scheme and the second coding rate corresponding to the uniform modulation scheme.

That the second communication apparatus determines, by using the equal-order coding rate increase scheme, the phase noise scaling factor, a first coding rate used when the second communication apparatus uses probabilistic constellation shaping modulation, a first modulation order, and the Maxwell-Boltzmann distribution parameter includes:

The second communication apparatus sets the second modulation order to the first modulation order corresponding to the target probabilistic shaping constellation diagram.

The second communication apparatus sets the first net transmission rate to a net transmission rate corresponding to a case in which the first communication apparatus uses the probabilistic constellation shaping modulation.

The second communication apparatus obtains, through calculation based on the first net transmission rate and the first modulation order, the phase noise scaling factor, the first coding rate, and the Maxwell-Boltzmann distribution parameter corresponding to the target probabilistic shaping constellation diagram.

In this implementation, a specific process in which the first communication apparatus determines, by using the equal-order coding rate increase scheme, the phase noise scaling factor, the first coding rate used when the second communication apparatus uses the probabilistic constellation shaping modulation, the first modulation order, and the Maxwell-Boltzmann distribution parameter is provided. This facilitates implementation of the solution. The second communication apparatus implements a higher signal-to-noise ratio threshold or higher spectral efficiency by increasing the first coding rate.

In another possible implementation, if the second indication information indicates the order-increase equal-entropy scheme, the method further includes:

The second communication apparatus determines, by using the order-increase equal-entropy scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter.

That the second communication apparatus determines probability distributions of constellation points in a target probabilistic shaping constellation diagram based on a Maxwell-Boltzmann distribution parameter and a phase noise parameter includes:

The second communication apparatus determines the probability distributions of the constellation points in the target probabilistic shaping constellation diagram based on the first modulation order, the phase noise parameter, and the Maxwell-Boltzmann distribution parameter, where the phase noise parameter includes the phase noise scaling factor.

That the second communication apparatus parses the second symbol stream based on the symbol type quantity, the bit quantity corresponding to each second symbol, and the probability distribution corresponding to each symbol type, to obtain the third original bit stream includes:

The second communication apparatus parses the second symbol stream based on the first coding rate, the symbol type quantity, the bit quantity corresponding to each second symbol, and the probability distribution corresponding to each symbol type, to obtain the third original bit stream.

In this implementation, when the probabilistic constellation shaping modulation and uniform modulation have a same net transmission rate, the second communication apparatus may implement a lower demodulation threshold by increasing the first modulation order corresponding to the target probabilistic shaping constellation diagram or achieve higher spectral efficiency under a same signal-to-noise ratio requirement. This increases a shaping gain brought by the probabilistic constellation shaping modulation, and improves system performance.

In another possible implementation, a first net transmission rate corresponding to a case in which the first communication apparatus performs modulation by using the uniform modulation scheme is equal to a product of the second modulation order corresponding to the uniform modulation scheme and the second coding rate corresponding to the uniform modulation scheme.

That the second communication apparatus determines, by using the order-increase equal-entropy scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter includes:

The second communication apparatus sets the second coding rate to the first coding rate used when the first communication apparatus uses the probabilistic constellation shaping modulation. The second communication apparatus sets the first modulation order corresponding to the target probabilistic shaping constellation diagram to the second modulation order plus a first preset value. The second communication apparatus sets the first net transmission rate to a net transmission rate corresponding to a case in which the second communication apparatus uses the probabilistic constellation shaping modulation. The second communication apparatus determines, based on the first net transmission rate and the first modulation order, the phase noise scaling factor and the Maxwell-Boltzmann distribution parameter corresponding to the target probabilistic shaping constellation diagram.

In this implementation, a specific process in which the second communication apparatus determines, by using the order-increase equal-entropy scheme, the phase noise scaling factor, the first coding rate used when the second communication apparatus uses the probabilistic constellation shaping modulation, the first modulation order corresponding to the target probabilistic shaping constellation diagram, and the Maxwell-Boltzmann distribution parameter is provided. This facilitates implementation of the solution. The second communication apparatus achieves higher spectral efficiency by increasing the first modulation order.

A third aspect of this application provides a first communication apparatus, including:

a processing module, configured to: determine probability distributions of constellation points in a target probabilistic shaping constellation diagram based on a Maxwell-Boltzmann distribution parameter and a phase noise parameter; and modulate a first original bit stream and a second original bit stream based on the probability distributions of the constellation points in the target probabilistic shaping constellation diagram, to obtain a first QAM symbol stream.

In a possible implementation, the phase noise parameter includes a quantity of constellation points in each circle of the target probabilistic shaping constellation diagram and a phase noise scaling factor.

In another possible implementation, the phase noise parameter includes the phase noise scaling factor and a first angle difference corresponding to each circle of the target probabilistic shaping constellation diagram, where the first angle difference corresponding to each circle is a smallest value of angle differences between angles respectively corresponding to every two adjacent constellation points in a plurality of constellation points in each circle.

In another possible implementation, the processing module is specifically configured to:

determine, based on the probability distributions and signal amplitudes of the constellation points in the target probabilistic shaping constellation diagram, a symbol type quantity, a probability distribution corresponding to a first symbol of each symbol type, and a bit quantity corresponding to each first symbol, where the symbol type quantity and the probability distribution corresponding to the first symbol of each symbol type indicate probability distributions and signal amplitudes of quadrature signals of the constellation points in the target probabilistic shaping constellation diagram, and probability distributions and signal amplitudes of inphase signals of the constellation points; the bit quantity corresponding to each first symbol is a bit quantity required by each first symbol that is represented by using a bit; and first symbols of different symbol types correspond to different probability distributions and/or different signal amplitudes; and generate a first symbol stream based on the symbol type quantity, the probability distribution corresponding to the first symbol of each symbol type, the bit quantity corresponding to each first symbol, and the first original bit stream; and generate, for the first communication apparatus, the first QAM symbol stream based on the first symbol stream and the second original bit stream.

In another possible implementation, a first symbol in the first symbol stream is a complex-valued symbol in which a value of a real part and a value of an imaginary part are both greater than or equal to 0.

In another possible implementation, the processing module is further configured to:

interleave and separate, according to a first interleaving and separation rule, a plurality of first symbols included in the first symbol stream, to obtain an interleaved first symbol stream; and the processing module is specifically configured to:

generate the first QAM symbol stream based on the interleaved first symbol stream and the second bit stream.

In another possible implementation, the processing module is specifically configured to:

map the first symbol stream to a first bit stream according to a first mapping rule, where the first mapping rule is a mapping relationship between a first symbol and a bit, and a quantity of bits to which each first symbol is mapped is the bit quantity corresponding to each first symbol;

perform encoding based on the first bit stream and the second original bit stream to obtain a first check bit stream;

determine a second bit stream based on the first check bit stream and the second original bit stream; and generate the first QAM symbol stream based on the first symbol stream and the second bit stream.

In another possible implementation, each first symbol in the first symbol stream corresponds to one constellation point in the target probabilistic shaping constellation diagram; and each first symbol in the first symbol stream indicates a signal amplitude of the constellation point corresponding to the first symbol, and the second bit stream indicates a sign bit of a quadrature signal of the constellation point corresponding to each first symbol in the first symbol stream and a sign bit of an inphase signal of the constellation point.

In another possible implementation, each first symbol in the first symbol stream indicates the signal amplitude of the constellation point corresponding to the first symbol, a $(2i-1)^{th}$ bit in the second bit stream indicates a sign bit of a quadrature signal of a constellation point corresponding to an $i^{th}$ first symbol in the first symbol stream, a $2i^{th}$ bit in the second bit stream indicates a sign bit of an inphase signal of the constellation point corresponding to the $i^{th}$ first symbol in the first symbol stream, and i is an integer greater than or equal to 1.

In another possible implementation, each first symbol in the first symbol stream corresponds to a quadrature signal or an inphase signal of one constellation point in the target probabilistic shaping constellation diagram; and each first symbol in the first symbol stream indicates a signal amplitude of the quadrature signal or the inphase signal corresponding to the first symbol, and the second bit stream indicates a sign bit of the quadrature signal or the inphase signal corresponding to each first symbol in the first symbol stream.

In another possible implementation, an odd-numbered first symbol in the first symbol stream corresponds to a quadrature signal of a constellation point in the target probabilistic shaping constellation diagram, and an even-numbered first symbol in the first symbol stream corresponds to an inphase signal of a constellation point in the target probabilistic shaping constellation diagram; and the odd-numbered first symbol in the first symbol stream indicates a signal amplitude of the quadrature signal corresponding to the first symbol, and the even-numbered first symbol in the first symbol stream indicates a signal amplitude of the inphase signal corresponding to the first symbol; and an odd-numbered bit in the second bit stream indicates a sign bit of the quadrature signal corresponding to the odd-numbered first symbol, and an even-numbered bit in the second bit stream indicates a sign bit of the inphase signal corresponding to the even-numbered first symbol.

In another possible implementation, the first bit stream and the second original bit stream are located in a first code block, a length of the first code block is greater than a code block length supported by the first communication apparatus, the first bit stream includes a plurality of first bits, and the second original bit stream includes a plurality of second bits; and the processing module is specifically configured to:

determine first TB CRC bits based on the first bit stream and the second original bit stream;

determine the first code block as M code subblocks;

separately encode the M code subblocks to obtain CB CRC bits corresponding to the M code subblocks; and determine the first check bit stream based on the CB CRC bits and the first TB CRC bits that correspond to the M code subblocks, where the first check bit stream includes check bits corresponding to the M code subblocks, and a check bit corresponding to an $M^{th}$ code subblock in the M code subblocks includes a CB CRC bit and a first TB CRC bit that correspond to the $M^{th}$ code subblock; each of the M code subblocks includes a part of the plurality of first bits and a part of the plurality of second bits, and different code subblocks include different first bits and different second bits; M is equal to a rounded-up ratio of the length of the first code block to the code block length supported by the first communication apparatus; and a ratio of a first bit included in each of the M code subblocks to a first value is equal to a first ratio, the first value is equal to a sum of a quantity of second bits included in each code subblock and a quantity of check bits included in each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

In another possible implementation, the processing module is further configured to:

obtain a channel state parameter determine supported maximum spectral efficiency based on the channel state parameter; and determine, based on the maximum frequency, a first coding rate, the phase noise scaling factor, a first modulation order corresponding to the target probabilistic shaping constellation diagram, and the Maxwell-Boltzmann distribution parameter; and the processing module is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, when a first coding rate used by the first communication apparatus and a first modulation order corresponding to the target probabilistic shaping constellation diagram remain unchanged, the processing module is further configured to:

obtain a channel state parameter;

determine supported maximum spectral efficiency based on the channel state parameter; and determine, based on the maximum spectral efficiency, the phase noise scaling factor and the Maxwell-Boltzmann distribution parameter corresponding to the target probabilistic shaping constellation diagram; and the processing module is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, a first net transmission rate corresponding to a case in which the first communication apparatus performs modulation by using a uniform modulation scheme is equal to a product of a second modulation order corresponding to the uniform modulation scheme and a second coding rate corresponding to the uniform modulation scheme, and the processing module is further configured to:

set the second modulation order to a first modulation order corresponding to the target probabilistic shaping constellation diagram;

set the first net transmission rate to a net transmission rate corresponding to a case in which the first communication apparatus uses probabilistic constellation shaping modulation; and obtain, through calculation based on the first net transmission rate and the first modulation order, a first coding rate, the phase noise scaling factor, and the Maxwell-Boltzmann distribution parameter corresponding to the target probabilistic shaping constellation diagram; and the processing module is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, a first net transmission rate corresponding to a case in which the first communication apparatus performs modulation by using a uniform modulation scheme is equal to a product of a second modulation order corresponding to the uniform modulation scheme and a second coding rate corresponding to the uniform modulation scheme, and the processing module is further configured to:

set the second coding rate to a first coding rate used when the first communication apparatus uses probabilistic constellation shaping modulation;

set a first modulation order corresponding to the target probabilistic shaping constellation diagram to the second modulation order plus a first preset value;

set the first net transmission rate to a net transmission rate corresponding to a case in which the first communication apparatus uses the probabilistic constellation shaping modulation; and determine, based on the first net transmission rate and the first modulation order, the Maxwell-Boltzmann distribution parameter corresponding to the target probabilistic shaping constellation diagram; and the processing module is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, the first communication apparatus further includes a transceiver module, and the transceiver module is configured to:

send first indication information to a second communication apparatus, where the first indication information indicates the first coding rate, the phase noise scaling factor, the first modulation order corresponding to the target probabilistic shaping constellation diagram, and the Maxwell-Boltzmann distribution parameter; or the first indication information indicates a first modulation and coding scheme (MCS), the phase noise scaling factor, and the Maxwell-Boltzmann distribution parameter, where the first MCS indicates the first coding rate and the first modulation order.

In another possible implementation, the first communication apparatus further includes a transceiver module, and the transceiver module is configured to:

send first indication information to a second communication apparatus, where the first indication information indicates the first coding rate, the phase noise scaling factor, the first modulation order corresponding to the target probabilistic shaping constellation diagram, and the Maxwell-Boltzmann distribution parameter; or the first indication information indicates a first modulation and coding scheme (MCS), the phase noise scaling factor, and the Maxwell-Boltzmann distribution parameter, where the first MCS indicates the first coding rate and the first modulation order.

In another possible implementation, if the Maxwell-Boltzmann distribution parameter is not equal to 0 and the phase noise scaling factor is equal to 0, the modulation includes the probabilistic constellation shaping modulation; or if neither the Maxwell-Boltzmann distribution parameter nor the phase noise scaling factor is equal to 0, the modulation includes phase-noise-based probabilistic constellation shaping modulation.

In another possible implementation, the processing module is further configured to:

obtain the channel state parameter, where if a value of the channel state parameter is greater than or equal to a first threshold, the modulation includes the probabilistic constellation shaping modulation or the phase-noise-based probabilistic constellation shaping modulation.

A fourth aspect of this application provides a second communication apparatus, including:

a processing module, configured to: obtain a second QAM symbol stream; determine probability distributions of constellation points in a target probabilistic shaping constellation diagram based on a Maxwell-Boltzmann distribution parameter and a phase noise parameter; and demodulate the second QAM symbol stream based on the probability distributions of the constellation points in the target probabilistic shaping constellation diagram, to obtain a third original bit stream and a fourth original bit stream.

In a possible implementation, the phase noise parameter includes a quantity of constellation points in each circle of the target probabilistic shaping constellation diagram and a phase noise scaling factor.

In another possible implementation, the phase noise parameter includes the phase noise scaling factor and a first angle difference corresponding to each circle of the target probabilistic shaping constellation diagram, where the first angle difference corresponding to each circle is a smallest value of angle differences between angles respectively corresponding to every two adjacent constellation points in a plurality of constellation points in each circle.

In another possible implementation, the processing module is specifically configured to:

demodulate the second QAM symbol stream to obtain a third bit stream;

parse the third bit stream to obtain a system bit stream and a second check bit stream;

perform decoding based on the system bit stream and the second check bit stream to obtain a fourth bit stream and the fourth original bit stream;

determine, based on the probability distributions and signal amplitudes of the constellation points in the target probabilistic shaping constellation diagram, a symbol type quantity, a probability distribution corresponding to a second symbol of each symbol type, and a bit quantity corresponding to each second symbol, where the symbol type quantity and the probability distribution corresponding to the second symbol of each symbol type indicate probability distributions and signal amplitudes of quadrature signals of the constellation points in the target probabilistic shaping constellation diagram, and probability distributions and signal amplitudes of the constellation points; the bit quantity corresponding to each second symbol is a quantity of bits required for representing the second symbol by using the bit; and second symbols of different symbol types correspond to different probability distributions and/or different signal amplitudes;

map the fourth bit stream to a second symbol stream according to a second mapping rule, where the second mapping rule is a mapping relationship between a bit and a second symbol, and the bit quantity corresponding to each second symbol in the second symbol stream is the bit quantity corresponding to each second symbol; the symbol type quantity of second symbols included in the second symbol stream and the probability distribution corresponding to the second symbol of each symbol type indicate the probability distributions and the signal amplitudes of the quadrature signals of the constellation points in the target probabilistic shaping constellation diagram, and the probability distributions and the signal amplitudes of the constellation points; and second symbols of different symbol types correspond to different probability distributions and/or different signal amplitudes; and parse the second symbol stream based on the symbol type quantity, the bit quantity corresponding to each second symbol, and the probability distribution corresponding to each symbol type, to obtain the third original bit stream.

In another possible implementation, the processing module is further configured to:

de-interleave and separate, according to a first de-interleaving and separation rule, a plurality of second symbols included in the second symbol stream, to obtain a de-interleaved second symbol stream; and the processing module is specifically configured to:

parse the de-interleaved second symbol stream based on the symbol type quantity, the bit quantity corresponding to each symbol, and the probability distribution corresponding to each symbol type, to obtain a sixth bit stream.

In another possible implementation, the second symbol in the second symbol stream is a complex-valued symbol in which a value of a real part and a value of an imaginary part are both greater than or equal to 0.

In another possible implementation, the system bit stream includes a plurality of third bits and a plurality of fourth bits, the system bit stream is located in a second code block, and a length of the second code block is greater than a code block length supported by the second communication apparatus; and the processing module is further configured to:

determine the second code block as M code subblocks, where each of the M code subblocks includes a part of the third bits and a part of the fourth bits, and different code subblocks include different third bits and different fourth bits; and determine the second check bit stream as M portions of check bits, where the M portions of check bits one-to-one correspond to the M code subblocks, and a check bit corresponding to an $M^{th}$ code subblock in the M code subblocks includes a first TB CRC bit; M is equal to a rounded-up ratio of the length of the second code block to the code block length supported by the second communication apparatus; and a ratio of a quantity of third bits in each of the M code subblocks to a second value is equal to a first ratio, the second value is equal to a sum of a quantity of fourth bits included in each code subblock and a quantity of check bits corresponding to each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram; and the processing module is specifically configured to:

decode each code subblock and a check bit corresponding to each code subblock, to obtain a fifth bit corresponding to each code subblock and a sixth bit corresponding to each code subblock; and determine the fifth bits corresponding to all the code subblocks as the fourth bit stream, and determine the sixth bits corresponding to all the code subblocks as the fourth original bit stream.

In another possible implementation, the second communication apparatus further includes a transceiver module, and the transceiver module is configured to receive first indication information from a first communication apparatus, where the first indication information indicates a first coding rate, the phase noise scaling factor, a first modulation order corresponding to the target probabilistic shaping constellation diagram, and the Maxwell-Boltzmann distribution parameter; or the first indication information indicates a first MCS, the phase noise scaling factor, and the Maxwell-Boltzmann distribution parameter, where the first MCS indicates a first coding rate and a first modulation order; and the processing module is specifically configured to:

determine the probability distributions of the constellation points in the target probabilistic shaping constellation diagram based on the first modulation order, the phase noise parameter, and the Maxwell-Boltzmann distribution parameter, where the phase noise parameter includes the phase noise scaling factor; and parse the second symbol stream based on the first coding rate, the symbol type quantity, the bit quantity corresponding to each second symbol, and the probability distribution corresponding to each symbol type, to obtain the third original bit stream.

In another possible implementation, the second communication apparatus further includes a transceiver module, and the transceiver module is configured to receive second indication information from a first communication apparatus, where the second indication information indicates a second MCS and an order-increase equal-entropy scheme, or indicates a second MCS and an equal-order coding rate increase scheme, and the second MCS indicates a second modulation order corresponding to a uniform modulation scheme and a second coding rate corresponding to the uniform modulation scheme.

In another possible implementation, if the second indication information indicates the equal-order coding rate increase scheme, the processing module is further configured to:

determine, by using the equal-order coding rate increase scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter; and the processing module is specifically configured to:

determine the probability distributions of the constellation points in the target probabilistic shaping constellation diagram based on the first modulation order, the phase noise parameter, and the Maxwell-Boltzmann distribution parameter, where the phase noise parameter includes the phase noise scaling factor; and parse the second symbol stream based on the first coding rate, the symbol type quantity, the bit quantity corresponding to each second symbol, and the probability distribution corresponding to each symbol type, to obtain the third original bit stream.

In another possible implementation, a first net transmission rate corresponding to a case in which the first communication apparatus performs modulation by using the uniform modulation scheme is equal to a product of the second modulation order corresponding to the uniform modulation scheme and the second coding rate corresponding to the uniform modulation scheme; and the processing module is specifically configured to:

set the second modulation order to the first modulation order corresponding to the target probabilistic shaping constellation diagram;

set the first net transmission rate to a net transmission rate corresponding to a case in which the first communication apparatus uses the probabilistic constellation shaping modulation; and obtain, through calculation based on the first net transmission rate and the first modulation order, the phase noise scaling factor, the first coding rate, and the Maxwell-Boltzmann distribution parameter corresponding to the target probabilistic shaping constellation diagram.

In another possible implementation, if the second indication information indicates the order-increase equal-entropy scheme, the processing module is further configured to:

determine, by using the order-increase equal-entropy scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter; and the processing module is specifically configured to:

determine the probability distributions of the constellation points in the target probabilistic shaping constellation diagram based on the first modulation order, the phase noise parameter, and the Maxwell-Boltzmann distribution parameter, where the phase noise parameter includes the phase noise scaling factor; and parse the second symbol stream based on the first coding rate, the symbol type quantity, the bit quantity corresponding to each second symbol, and the probability distribution corresponding to each symbol type, to obtain the third original bit stream.

In another possible implementation, a first net transmission rate corresponding to a case in which the first communication apparatus performs modulation by using the uniform modulation scheme is equal to a product of the second modulation order corresponding to the uniform modulation scheme and the second coding rate corresponding to the uniform modulation scheme; and the processing module is specifically configured to:

set the second coding rate to the first coding rate used when the first communication apparatus uses the probabilistic constellation shaping modulation;

set the first modulation order corresponding to the target probabilistic shaping constellation diagram to the second modulation order plus a first preset value;

set the first net transmission rate to a net transmission rate corresponding to a case in which the second communication apparatus uses the probabilistic constellation shaping modulation; and determine, based on the first net transmission rate and the first modulation order, the phase noise scaling factor and the Maxwell-Boltzmann distribution parameter corresponding to the target probabilistic shaping constellation diagram.

A fifth aspect of this application provides a first communication apparatus, and the first communication apparatus includes a processor. The processor is configured to invoke a computer program or computer instructions in a memory, to enable the processor to implement any implementation of the first aspect.

Optionally, the first communication apparatus further includes the memory.

Optionally, the memory and the processor are integrated together.

Optionally, the communication apparatus further includes a transceiver, and the processor is configured to control the transceiver to receive/send a signal.

A sixth aspect of this application provides a second communication apparatus, and the second communication apparatus includes a processor. The processor is configured to invoke a computer program or computer instructions in a memory, to enable the processor to implement any implementation of the second aspect.

Optionally, the second communication apparatus further includes the memory.

Optionally, the memory and the processor are integrated together.

Optionally, the communication apparatus further includes a transceiver, and the processor is configured to control the transceiver to receive/send a signal.

A seventh aspect of this application provides a first communication apparatus. The first communication apparatus includes a processor, and the processor is configured to perform any implementation of the first aspect.

An eighth aspect of this application provides a second communication apparatus. The second communication apparatus includes a processor, and the processor is configured to perform any implementation of the second aspect.

A ninth aspect of embodiments of this application provides a first communication apparatus. The first communication apparatus includes a logic circuit, and the logic circuit is configured to perform a processing operation in any implementation of the first aspect. Optionally, the first communication apparatus further includes an input/output interface, and the input/output interface is configured to perform a receiving/sending operation in any implementation of the first aspect.

A tenth aspect of embodiments of this application provides a second communication apparatus. The second communication apparatus includes a logic circuit, and the logic circuit is configured to perform a processing operation in any implementation of the second aspect. Optionally, the second communication apparatus includes an input/output interface, and the input/output interface is configured to perform a receiving/sending operation in any implementation of the second aspect.

An eleventh aspect of embodiments of this application provides a computer program product including instructions. When the computer program product runs on a computer, the computer is enabled to perform any implementation of the first aspect and the second aspect.

A twelfth aspect of embodiments of this application provides a computer-readable storage medium, including computer instructions. When the computer instructions are run on a computer, the computer is enabled to perform any implementation of the first aspect and the second aspect.

A thirteenth aspect of embodiments of this application provides a chip apparatus, including a processor, configured to connect to a memory, and invoke a program stored in the memory, to enable the processor to perform any implementation of the first aspect and the second aspect.

A fourteenth aspect of embodiments of this application provides a communication system. The communication system includes the first communication apparatus in the first aspect and the second communication apparatus in the second aspect.

According to the foregoing technical solutions, it can be learned that embodiments of this application have the following advantages:

It can be learned from the foregoing technical solutions that the first communication apparatus determines the probability distributions of the constellation points in the target probabilistic shaping constellation diagram based on the Maxwell-Boltzmann distribution parameter and the phase noise parameter. The first communication apparatus modulates the first original bit stream and the second original bit stream based on the probability distributions of the constellation points in the target probabilistic shaping constellation diagram, to obtain the first QAM symbol stream. It can be learned from this that the first communication apparatus generates the probability distributions of the constellation points in the target probabilistic shaping constellation diagram based on the Maxwell-Boltzmann distribution parameter and the phase noise parameter, and then modulates the first original bit stream and the second original bit stream based on the probability distributions of the constellation points in the target probabilistic shaping constellation diagram. This helps improve the capability of resisting the phase noise, and ensures the shaping gain obtained by using the probabilistic constellation shaping technology under the impact of the phase noise. For example, the first communication apparatus can ensure, by performing the technical solutions of this application, the shaping gain brought by using the probabilistic constellation shaping modulation in the high-frequency scenario.

DESCRIPTION OF EMBODIMENTS

Figure 1A:
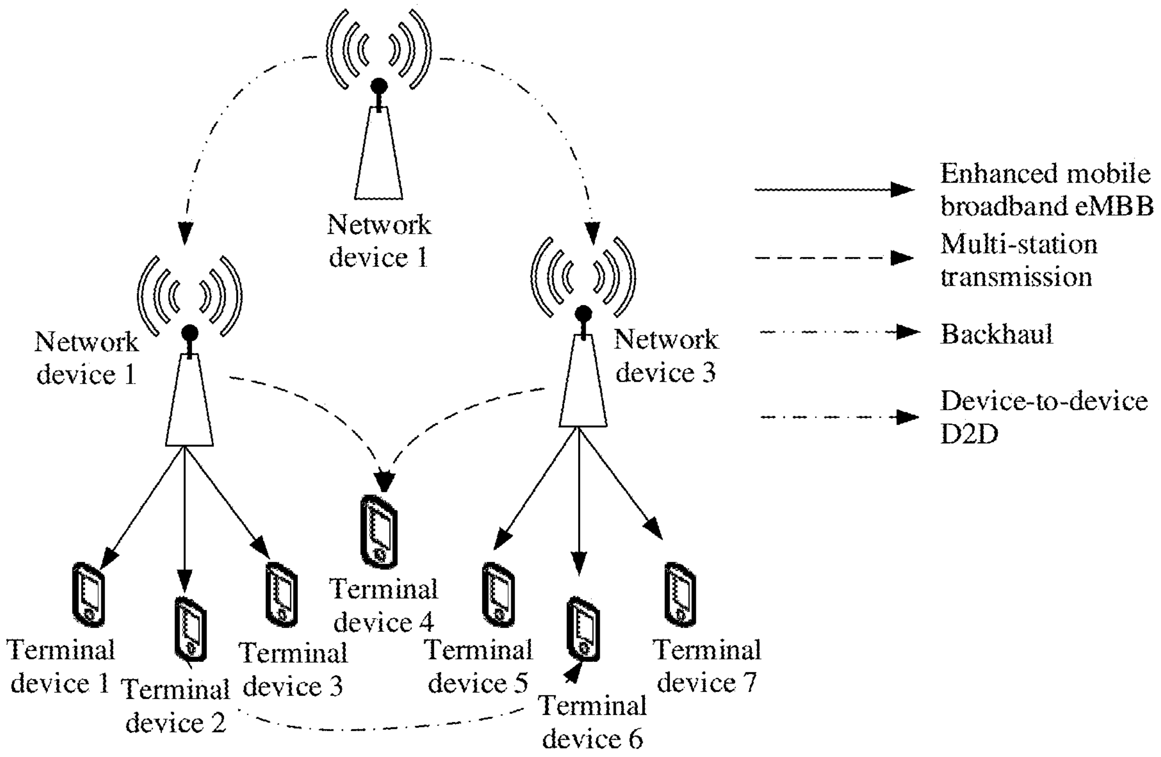
FIG. 1A is a diagram of a communication system according to an embodiment of this application.

Embodiments of this application provide a modulation method, a demodulation method, and a related apparatus, to ensure a shaping gain obtained by using a probabilistic constellation shaping technology under impact of phase noise.

In descriptions of this application, unless otherwise specified, "/" means "or". For example, A/B may mean A or B. A term "and/or" in this specification describes only an association relationship between associated objects and indicates that there may be three relationships. For example, A and/or B may indicate the following three cases: Only A exists, both A and B exist, and only B exists. In addition, "at least one" means one or more, and "a plurality of" means two or more. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c. a, b, and c may be singular or plural.

A communication system to which technical solutions of this application are applicable includes but is not limited to a long term evolution (LTE) system, a fifth generation (5G) mobile communication system, a mobile communication system (for example, a 6G mobile communication system) after a 5G network, a device-to-device (D2D) communication system, a vehicle-to-everything (V2X) communication system, a system integrating a plurality of communication systems, a new radio (NR) system, or a non-terrestrial network (NTN) system.

For ease of understanding the method provided in embodiments of this application, the following describes a system architecture of the method provided in embodiments of this application. It may be understood that the system architecture described in embodiments of this application is intended to describe the technical solutions in embodiments of this application more clearly, and does not constitute any limitation on the technical solutions provided in embodiments of this application.

A communication system to which this application is applicable includes a first communication apparatus and a second communication apparatus. The first communication apparatus may perform communication transmission with the second communication apparatus. Optionally, the first communication apparatus is a terminal device, and the second communication apparatus is a network device. Alternatively, the first communication apparatus is a network device, and the second communication apparatus is a terminal device.

The following describes a terminal device and a network device in this application.

The terminal device may be a wireless terminal device that can receive scheduling and indication information of the network device. The wireless terminal device may be a device that provides a user with voice and/or data connectivity, a handheld device with a wireless connection function, or another processing device connected to a wireless modem.

The terminal device, also referred to as user equipment (UE), a mobile station (MS), a mobile terminal (MT), or the like, is a device with a wireless communication function (providing voice/data connectivity for a user), for example, a handheld device or a vehicle-mounted device that has a wireless connection function. Currently, some examples of the terminal device are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, or a wireless terminal in a smart home.

The network device may be a device in a wireless network. For example, the network device may be a radio access network (RAN) node that connects the terminal device to the wireless network, and may also be referred to as an access network device.

The access network device is an apparatus that is deployed in a radio access network to provide a wireless communication function for the terminal device. The access network device is a base station, and the base station is a macro base station, a micro base station (also referred to as a small cell), a relay station, an access point (AP), a wearable device, a vehicle-mounted device, or the like in various forms. Alternatively, the base station may be a transmission reception point (TRP), a transmission measurement function (TMF), or the like. For example, the base station in embodiments of this application may be a base station in new radio (NR). The base station in 5G NR may also be referred to as a transmission reception point (TRP), a transmission point (TP), a next-generation NodeB (ngNB), or an evolved NodeB (eNB or eNodeB) in a long term evolution (LTE) system.

The following describes some possible scenarios to which the technical solutions of this application are applicable.

FIG. 1A is a diagram of a communication system according to an embodiment of this application. Refer to FIG. 1A. The communication system includes at least one network device and at least one terminal device.

As shown in FIG. 1A, a scenario to which this application is applicable includes but is not limited to scenarios having a high timing requirement or a high transmission rate requirement, such as multi-station transmission, backhaul, wireless to the x (WTTx), enhanced mobile broadband (eMBB), and D2D. The multi-station transmission means that a same terminal device simultaneously transmits a signal to a plurality of transmission points (the transmission points may be network devices shown in FIG. 1A).

The following describes some technical terms in the technical solutions of this application.

1. Quadrature amplitude modulation (quadrature amplitude modulation, QAM) signal: The quadrature amplitude modulation signal includes a quadrature signal and an inphase signal. The QAM signal may also be referred to as a QAM symbol, and one QAM symbol may be represented as a±bj, where a represents the quadrature signal, and may also be referred to as an I-channel signal; and b represents the inphase signal, and may also be referred to as a Q-channel signal.
2. Uniform modulation (uniform modulation, UM): In a constellation diagram obtained through uniform modulation, probability distributions of constellation points are the same and geometric positions of the constellation points are regular. For example, QAM modulation is the uniform modulation.
3. Non-uniform modulation (non-uniform modulation, NUM): The non-uniform modulation includes geometric constellation shaping (GCS) and probabilistic constellation shaping (PCS). In a constellation diagram obtained through non-uniform modulation, probability distributions of constellation points are different, geometric positions of constellation points are irregular or uneven, or probability distributions of constellation points are different and geometric positions of the constellation points are irregular or uneven.
4. Geometric constellation shaping: A shaping gain is obtained by modifying a geometric position of constellation mapping. Probability distributions of constellation points are even, and the probability distributions of the points are equal.
5. Probabilistic constellation shaping: A shaping gain is obtained by modifying probability distributions of constellation points. A probability distribution of each point is not limited to be passed, but a geometric position of constellation mapping remains unchanged.
6. Constellation points in each circle of a probabilistic shaping constellation diagram: Constellation points in each circle of the probabilistic shaping constellation diagram have equal distances to the origin of coordinates. The probabilistic shaping constellation diagram may also be referred to as a probabilistic-constellation-shaping-based constellation diagram. For ease of description, the probabilistic shaping constellation diagram is used for description below.

Currently, the non-uniform modulation is used to reduce a required signal-to-noise ratio based on a shaping gain. The shaping gain increases with a modulation order. Higher-order constellations have higher shaping gains, such that system performance and spectral efficiency are further improved. The non-uniform modulation includes the geometric constellation shaping and the probabilistic constellation shaping. The technical solutions of this application are mainly applicable to probabilistic constellation shaping modulation.

The following describes a probabilistic constellation shaping system and a system procedure.

According to the information theory proposed by Shannon, in an additive white Gaussian noise (AWGN) channel, an upper bound of a channel capacity may be expressed as:

$$C=\log_2(1+SNR), \tag{1}$$

where

C is the channel capacity, SNR is a signal-to-noise ratio of the channel, and $\log_2(1+SNR)$ means taking a log of (1+SNR) by using 2 as a base.

Compared with a conventional equal-probability QAM constellation diagram (in other words, probability distributions of constellation points in the constellation diagram are the same), Maxwell-Boltzmann distribution may bring a shaping gain of a maximum of 1.53 dB (decibel). A probability distribution expression of each constellation point may be written as:

$$P_{X1}(x_i)=\frac{1}{\sum_{x_j\in\chi}^{M} e^{-v|x_j|^2}}e^{-v|x_i|^2},\ x_i\in\chi, \tag{2}$$

where $\chi=\{x_1, x_2, \ldots, x_M\}$ represents a coordinate set of constellation points included in M-order QAM, and v is a Maxwell-Boltzmann distribution parameter. A larger Maxwell-Boltzmann distribution parameter indicates a higher shaping gain, namely, a larger difference between probabilities in inner and outer circles of the probabilistic shaping constellation diagram. In this case, a source entropy of the probabilistic shaping constellation diagram may be expressed as:

$$H(A)=\sum_{i=1}^{M}-P_X(x_i)\cdot\log_2(P_X(x_i)) \tag{3}$$

It can be learned that, the probability distributions of the constellation points in the probabilistic shaping constellation diagram conform with the Maxwell-Boltzmann distribution. The probabilistic shaping constellation diagram intuitively shows that probability distributions of constellation points in each circle of the probabilistic shaping constellation diagram are the same, probability distributions of constellation points in the inner circle are large, and probability distributions of constellation points in the outer circle are small. The probability distributions of the constellation points in the probabilistic shaping constellation diagram have the shaping gain. However, impact of phase noise is not considered in the probability distributions of the constellation points in the probabilistic shaping constellation diagram. For example, rich frequency band resources of a high-frequency scenario or a millimeter wave scenario (for example, a frequency band above 6th generation (6G), including 28 G, 60 G, 86 G, 95 G, or the like) are used by the industry to meet an increasing communication requirement. Significant features of a high frequency or a millimeter wave include a large bandwidth and highly integrated antenna arrays that are used to achieve a high throughput, as well as intermediate radio frequency distortion issues, for example, the phase noise and a center frequency offset. A higher frequency band indicates a higher power spectrum density of the phase noise, greater impact on a signal, and poorer system performance. In view of this, this application provides corresponding technical solutions. For details, refer to the following related descriptions of the embodiments shown in FIG. 2 and FIG. 8A and FIG. 8B, to ensure a shaping gain obtained by using a probabilistic shaping constellation technology under impact of phase noise.

Probabilistic constellation shaping includes probabilistic amplitude shaping (PAS) and probabilistic fold shaping (PFS). The following describes an implementation procedure of a PAS system with reference to FIG. 1B. The PAS system is mainly configured to perform probabilistic shaping on a probabilistic constellation shaping pulse amplitude modulation (probabilistic constellation shaping pulse amplitude modulation, PCS-PAM) signal. The PAS system may be used for an even-order QAM constellation diagram, for example, a 16-QAM constellation diagram or a 64-QAM constellation diagram. In this case, a QAM signal is split into an I PAM signal and a Q PAM signal, and PCS-QAM signals may be generated by separately using PAS systems. A process of generating a PAM signal obtained by performing probabilistic shaping on the I channel is similar to a process of generating a PAM signal obtained by performing probabilistic shaping on the Q channel.

Figure 1B:
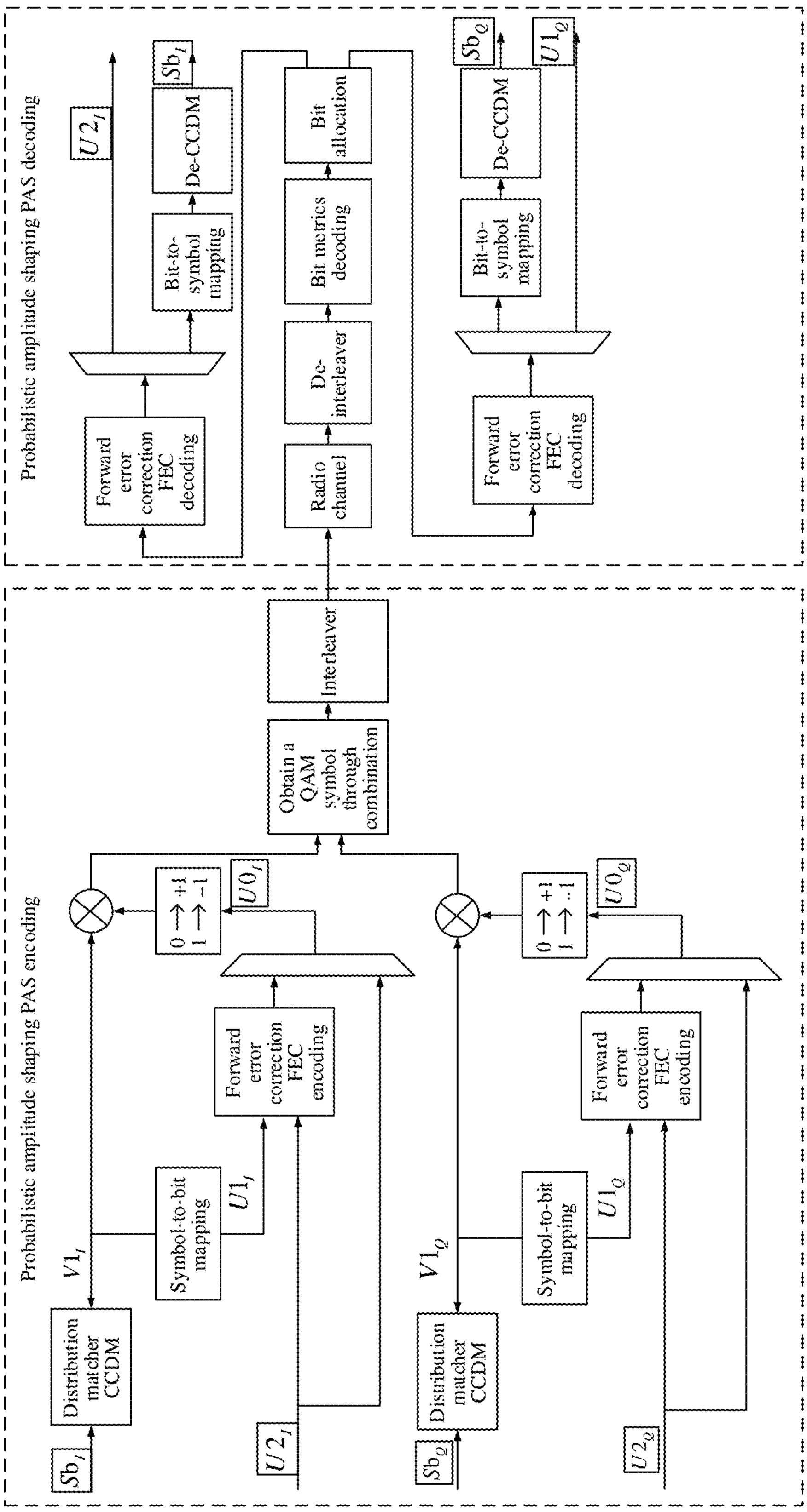
FIG. 1B is a schematic flowchart of a probabilistic amplitude shaping system according to an embodiment of this application.

For example, as shown in FIG. 1B, the process of generating the PAM signal obtained by performing probabilistic shaping on the I channel includes: An original bit stream $Sb_I$ is converted into a symbol stream $V1_I$ having corresponding probability distributions by using a CCDM. Then, the symbol stream $V1_I$ is mapped and converted into a bit stream $U1_I$. FEC encoding is performed on the bit stream $U2_I$ and the bit stream $U1_I$ to obtain a check bit stream. For example, a FEC encoder may select digital video broadcasting-satellite 2-low-density parity-check (digital video broadcast-satellite 2-low-density parity-check, DVB-S2-LDPC) code as an FEC code. A code length of the LDPC code is fixed at 64800, and a coding rate may be 1/4, 1/3, 2/5, 1/2, 3/5, 2/3, 3/4, 4/5, 5/6, 8/9, or 9/10. Because error correction bits of the LDPC code have a characteristic that an occurrence probability of "0" is basically the same as that of "1", the check bit stream and the bit stream $U2_I$ are combined into a corresponding bit stream, $U0_I$ and bits in the bit stream $U0_I$ are respectively used as sign bits of symbols in the symbol stream $V1_I$, to determine a quadrant in which a symbol output by the CCDM is located, so as to obtain the PAM signal obtained by performing probabilistic shaping on the I channel. The process of generating the PAM signal obtained by performing probabilistic shaping on the Q channel is similar. Therefore, the PAM signal obtained by performing probabilistic shaping on the I channel and the PAM signal obtained by performing probabilistic shaping on the Q channel may be obtained, and then the PAM signal obtained by performing probabilistic shaping on the I channel and the PAM signal obtained by performing probabilistic shaping on the Q channel are combined to obtain a QAM signal.

After the QAM signal passes through a channel, a receiver separately decodes the I-channel signal and the Q-channel signal. Processing performed by the receiver on each signal includes operations such as FEC decoding, bit-to-symbol mapping, and a de-CCDM. The receiver may calculate a bit error ratio (BER) based on bits obtained through decoding and original bits.

Probabilistic fold shaping is mainly used for an odd-order QAM symbol. A process of probabilistic fold shaping is similar to the process of generating the PAM signal obtained by performing probabilistic shaping by using the PAS system, but two sign bits need to be generated each time for mapping to four quadrants. In addition, a dimension of a symbol mapped by the CCDM is a quantity of constellation points in each quadrant.

It can be learned that, in the foregoing technical solution, in a process of generating the QAM symbol, the I-channel signal and the Q-channel signal of the QAM signal are separately processed, and one CCDM needs to be used for processing of the I-channel signal and one CCDM needs to be used for processing of the Q-channel signal. A demodulation device also needs two CCDMs to demodulate the PAM signal obtained by performing probabilistic shaping on the I channel and the PAM signal obtained by performing probabilistic shaping on the Q channel. Therefore, in terms of modulation, in the foregoing technical solution, in the process of generating the QAM symbol, the I-channel signal and the Q-channel signal of the QAM signal are separately processed, and one CCDM needs to be used for processing of the I-channel signal and one CCDM needs to be used for processing of the Q-channel signal, resulting in high system complexity. In terms of demodulation, one de-CCDM also needs to be used for demodulation of the I-channel signals and one de-CCDM also needs to be used for demodulation of the Q-channel signals, resulting in high system complexity. Then, currently, the probabilistic constellation shaping system can generate only a constellation in which an I branch and a Q branch have a same probability distribution, and cannot flexibly generate a constellation in which an I branch and a Q branch have different probability distributions. As a result, adaptability of an application scenario is limited, and flexibility is low. In view of this, this application provides corresponding technical solutions, to reduce system complexity and improve flexibility of an application scenario of the solutions. For details, refer to the following related descriptions of the embodiments shown in FIG. 2 and FIG. 8A and FIG. 8B.

The following describes a manner of calculating spectral efficiency of the probabilistic constellation shaping system.

It is assumed that a code length supported by the FEC encoder is $N_c$. In this case, variables in the probabilistic constellation shaping system need to satisfy the following relational expressions:

$$U2_I + U1_I = N_C \cdot R_C \tag{4}$$

$$U2_I + N_C \cdot (1 - R_C) = V1_I \tag{5}$$

$$U1_I = V1_I \cdot L, \tag{6}$$

where $R_C$ is an encoding rate of the encoder, L=log (P)−1, and P is a quantity of PAS signal levels.

With reference to the PAS system described above, it can be learned that, if the 64-QAM is used as an example, the two PAS systems need to be used, each PAS system needs to implement a probabilistically shaped symbol stream of PCS-PAM 8, $N_C$=64800, and P=8. It is assumed that the encoding rate $R_C$=0.9, and $V1_I$, =21600. In this case, L=$\log_2$ (P)−1=$\log_2$ (8)−1=2, and $U1_I$, =43200. Therefore, $U2_I$=$N_C \cdot R_C - U1_I$=15120. In addition, $U2_I + N_C(1-R_C) = V1_I$, $U1_I = R_{DM} \cdot V1_I$, and $R_{DM}$ is a coding rate used by the CCDM. In this case, spectral efficiency of the PAS system is:

$$R_{all} = (Sb_I + U2_I)/V1_I \tag{7}$$

When $U2_I$=0, $R_C$=(P−1)/P. In this case, a value of $R_C$ is a lower limit of a coding, rate of the PAS system.

The following describes measurement indicators of the probabilistic constellation shaping system.

Currently, generalized mutual information (GMI) and normalized generalized mutual information (NGMI) are used to measure maximum spectral efficiency and an error correction coding rate that can be achieved by bit error-free transmission implemented by the probabilistic constellation shaping system by using a soft-decision error correction code. An expression of the GMI is as follows:

$$GMI \approx \frac{1}{N}\sum_{k=0}^{N-1}[-\log_2(P_k)] - \frac{1}{N}\sum_{k=0}^{N-1}\sum_{i=1}^{M}\left[\log_2\left(1 + e^{(-1)^{b_{k,i}}\Lambda_{k,i}}\right)\right], \tag{8}$$

where N is a quantity of constellation points in the probabilistic shaping constellation diagram, M is a modulation order corresponding to the probabilistic shaping constellation diagram, $P_k$ is a probability distribution of a $k^{th}$ constellation point in the probabilistic shaping constellation diagram, $b_{k,i}$ represents an $i^{th}$ bit in bits representing a $k^{th}$ QAM symbol in a QAM symbol stream generated based on the probabilistic shaping constellation diagram, and $\Lambda_{k,i}$ is a bit log likelihood ratio (LLR), which may be expressed as:

$$\Lambda_{k,i} = \log\frac{\sum_{x\in\chi_1^i} q_{Y|X}(y_k|x)P_X(x)}{\sum_{x\in\chi_0^i} q_{Y|X}(y_k|x)P_X(x)}, \tag{9}$$

Where the subset $$\chi_0^i$$

includes a QAM symbol whose $i^{th}$ bit in bits representing the QAM symbol is 0 in $\chi$, the subset $$\chi_1^i$$

includes a QAM symbol whose $i^{th}$ bit in bits representing the QAM symbol is 1 in $\chi$, $\chi=\{\chi_1, \chi_2, \ldots, \chi_M\}$ represents a coordinate set of constellation points included in M-order QAM, namely, a coordinate set of the constellation points included in the probabilistic shaping constellation diagram, and $q_{Y|X}(y_k|\chi)$ is a probability density function of a channel. For an additive white Gaussian noise (AWGN) channel that uses bit-interleaved coded modulation (BICM) and whose noise variance is $\sigma^2$, $q_{Y|Cx}(y_k|\chi)$ may be expressed as:

$$q_{Y|X}(y_k|x) = \frac{1}{\sqrt{2\pi\sigma^2}}e^{\frac{|y_k-x|^2}{2\sigma^2}}, \tag{10}$$

where

NGMI may be used to measure a maximum coding rate of bit error-free transmission in an ideal state. NGMI of an M-QAM PCS system may be expressed as:

$$NGMI = 1 - \frac{H(A) - GMI}{\log_2 M} \tag{11}$$

NGMI of a QAM system using uniform distribution may be expressed as:

$$NGMI = \frac{GMI}{\log_2 M} \tag{12}$$

An achievable information rate (AIR) of the system without considering a coding scheme or the like may be expressed as:

$$AIR = GMI \cdot BW \tag{13}$$

However, the achievable information rate cannot be implemented in an actual PCS system, and is only a maximum achievable rate in an ideal state. Therefore, currently, a net transmission rate (NTR) is mostly used to measure an actual transmission rate of the system:

$$NTR = (H(A) - (1 - R_C)M) \cdot BW \tag{14}$$

Provided that NGMI>$R_C$ is met, bit error-free transmission with a net rate of the NTR in an ideal state can be implemented. However, due to factors such as the LDPC code and the channel that are actually used, bit error-free transmission cannot be implemented by directly using an error correction code whose coding rate is the same as that of the NGMI, and a margin needs to be reserved. This also indicates that, provided that a value of the NGMI is greater than a threshold shown in the following Table 1, a PAS or PFS system using LDPC as an error correction code can implement bit error-free transmission at the coding rate. Herein, a 6.25% redundant step code is used as an outer code to ensure bit error-free transmission.

Therefore, an actually obtained rate is slightly less than $R_C$.

TABLE 1

| Coding rate $R_C$ | NGMI threshold | Total coding rate |
|---|---|---|
| 1/4 | 0.30 | 0.24 |
| 1/3 | 0.37 | 0.31 |
| 2/5 | 0.44 | 0.38 |
| 1/2 | 0.54 | 0.47 |
| 3/5 | 0.64 | 0.56 |
| 2/3 | 0.71 | 0.63 |
| 3/4 | 0.78 | 0.71 |
| 4/5 | 0.83 | 0.75 |
| 5/6 | 0.86 | 0.78 |
| 8/9 | 0.91 | 0.84 |
| 9/10 | 0.92 | 0.85 |

In an NR system, LDPC coding is used for data links such as a physical downlink shared channel (PDSCH) and a physical uplink shared channel (PUSCH). A specific data channel coding process includes transport block (TB) cyclic redundancy check (CRC) addition, LDPC base graph (BG) selection, code block (CB) segmentation, code block-level CRC addition, LDPC coding, rate matching (RM), bit interleaving, code block concatenation, and the like. LDPC rate matching is independently performed for each code block, and rate matching is implemented through puncturing, repetition, or shortening based on parameters such as a coding rate, a system bit, and an actual physical resource length.

Outputs obtained through code block concatenation are coded code words (CWs). The code words are used for subsequent modulation and are mapped to QAM symbols of different orders based on configurations. After being processed by using procedures such as layer mapping, precoding, resource mapping, and orthogonal frequency division multiplexing (OFDM) or discrete Fourier transform-spread (DFT-S) symbol generation, the QAM symbols are finally sent through an antenna port, and reach a receiver through a channel.

In a new radio (NR) system, different MCS tables are configured for modulation and coding schemes (MCSs) for a physical downlink shared channel (PDSCH) and a physical uplink shared channel (PUSCH). For example, details are shown in the following Table 2. A network device ensures transmission efficiency and transmission quality of a service of a terminal device by using an MCS. When channel quality is good, a higher-order modulation scheme and a lower target coding rate are used. The network device or the terminal device selects a corresponding parameter based on a channel quality indicator (CQI), or an MCS indicated in downlink control information (DCI) or uplink control information (UCI). For example, as shown in Table 2, each order of MCS corresponds to one target coding rate. An MCS with a higher order indicates a higher target coding rate, higher transmission efficiency, and a higher throughput. As shown in the following Table 2, the MCS table includes parameters such as a modulation order, a target coding rate, and spectral efficiency.

In the following Table 2, different spectral efficiency is implemented by changing a modulation order and a target coding rate. An interval between modulation orders is reduced by changing the target coding rate, and spectral efficiency is closer. Configuration diversity of the target coding rate further increases LDPC coding complexity, and needs to be implemented by adjusting different redundant bits.

TABLE 2

| Modulation and coding scheme index (MCS index) | Modulation order $Q_m$ (Modulation Order) | Target coding rate R | Spectral efficiency (Spectral efficiency) |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | Reserved (reserved) | |
| 30 | 4 | Reserved (reserved) | |
| 31 | 6 | Reserved (reserved) | |

The technical solutions of this application are described below with reference to specific embodiments.

Figure 2:
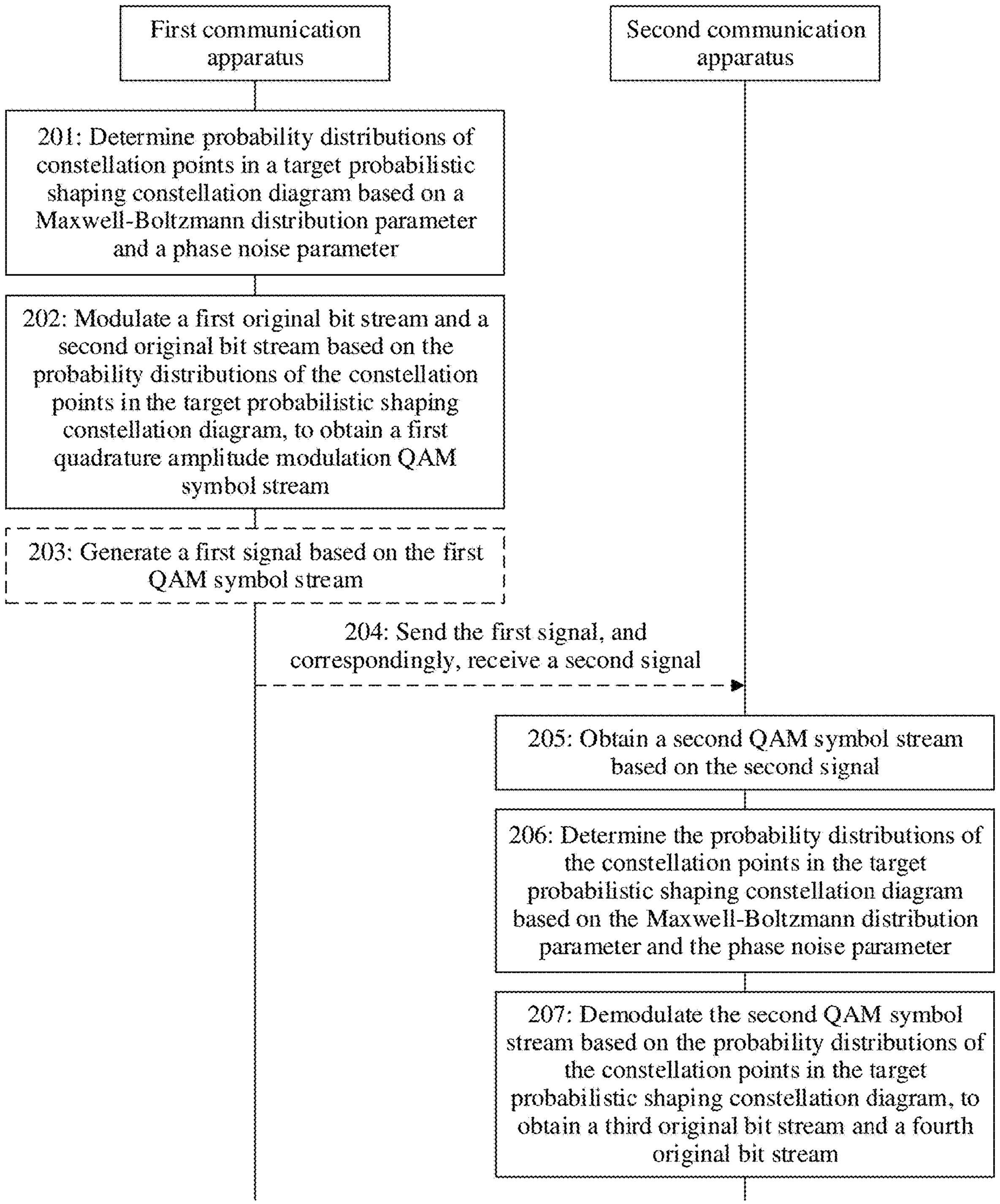
FIG. 2 is a diagram of an embodiment of a modulation method and a demodulation method according to an embodiment of this application.

FIG. 2 is a diagram of an embodiment of a modulation method according to an embodiment of this application. Refer to FIG. 2. The method includes the following steps.

201: A first communication apparatus determines probability distributions of constellation points in a target probabilistic shaping constellation diagram based on a Maxwell-Boltzmann distribution parameter and a phase noise parameter.

Optionally, the phase noise parameter includes a quantity of constellation points in each circle of the target probabilistic shaping constellation diagram and a phase noise scaling factor. Alternatively, the phase noise parameter includes the phase noise scaling factor and a first angle difference corresponding to each circle of the target probabilistic shaping constellation diagram. Alternatively, the phase noise parameter includes a quantity of constellation points in each circle of the target probabilistic shaping constellation diagram, a first angle difference corresponding to each circle of the target probabilistic shaping constellation diagram, and the phase noise scaling factor.

The phase noise scaling factor represents an impact degree of phase noise. The first angle difference corresponding to each circle is a smallest value of angle differences between angles respectively corresponding to every two adjacent constellation points in a plurality of constellation points in each circle. An angle corresponding to each constellation point is a ratio of a quadrature signal (I-channel signal) corresponding to the constellation point to an inphase signal (Q-channel signal) corresponding to the constellation point.

The quantity of constellation points in each circle of the target probabilistic shaping constellation diagram and/or the first angle difference corresponding to each circle of the target probabilistic shaping constellation diagram represent/represents an impact magnitude of the phase noise. The foregoing are merely several possible examples. In actual application, the impact magnitude of the phase noise may be represented in another manner. This is not specifically limited in this application.

Figure 3:
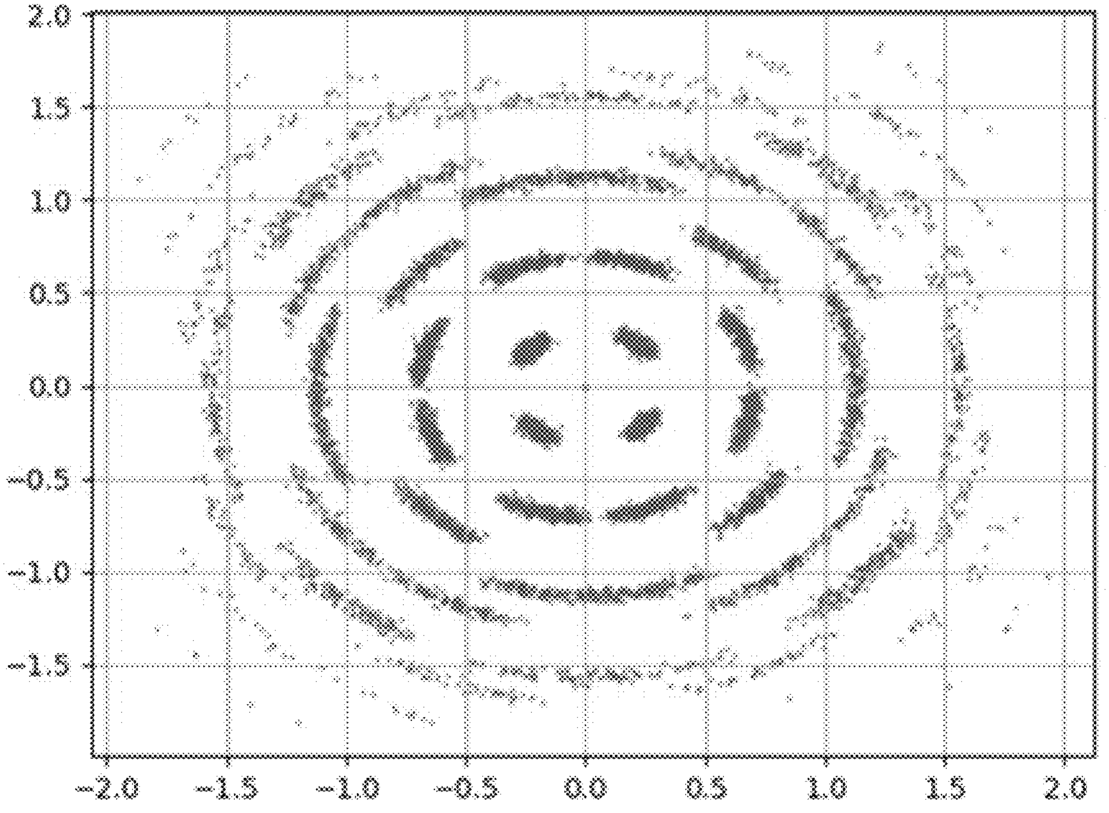
FIG. 3 is a diagram of a probabilistic shaping constellation diagram under impact of phase noise according to an embodiment of this application.

For example, as shown in FIG. 3, FIG. 3 is a 64-QAM constellation diagram under impact of phase noise. For a single-carrier signal, constellation points in each circle turn a circle due to the impact of the phase noise. It can be learned from FIG. 3 that probability distributions in circles of the 64-QAM constellation diagram are inconsistent, probability distributions of constellation points in an inner circle are large, and probability distributions of constellation points in an outer circle are small.

It can be learned from the related descriptions of the foregoing formula (2) that the probability distributions of the constellation points in the probabilistic shaping constellation diagram comply with a Maxwell-Boltzmann distribution rule. As shown in FIG. 3, probability distributions of constellation points in a second circle are greater than probability distributions of constellation points in a third circle. Therefore, when the phase noise is loud, the probability distributions, of the probabilistic shaping constellation diagram, obtained according to the foregoing formula (2) are unreasonable. In view of this, in this application, when the probability distributions of the constellation points in the target probabilistic shaping constellation diagram are determined, an impact factor caused by the phase noise is further considered. The first communication apparatus may determine the probability distributions of the constellation points in the target probabilistic shaping constellation diagram based on the Maxwell-Boltzmann distribution parameter and the phase noise parameter, to improve a capability of resisting the phase noise. Specifically, the probability distributions of the constellation points in the target probabilistic shaping constellation diagram may be expressed as:

$$P_X(x_i) = \frac{e^{-v|x_i|^2 - \alpha g(x_i)}}{\sum\limits_{x_j \in \chi}^{M} e^{-v|x_j|^2 - \alpha g(x_i)}},\ x_i \in \chi, \tag{15}$$

where $x_i$ represents coordinates of a constellation point of the target probabilistic shaping constellation diagram, and v is the Maxwell-Boltzmann distribution parameter. A larger Maxwell-Boltzmann distribution parameter indicates a higher shaping gain, namely, a larger difference between probability distributions in inner and outer circles. g(x) is a function in which the impact factor of the phase noise is considered, $\alpha$ is a scaling factor of g(x) and represents an impact degree of the phase noise, and $\chi=\{x_1, x_2, \ldots, x_M\}$ represents a coordinate set of the constellation points included in the target probabilistic shaping constellation diagram. For example, the coordinates $x_i$ of the constellation point$=a_i+b_i j$, where $a_i$ represents a quadrature signal of the constellation point, and $b_i$ represents an inphase signal of the constellation point.

Optionally, the g(x) function may have the following two possible solutions.

Solution 1: The g(x) function indicates the quantity of constellation points in each circle of the target probabilistic constellation diagram.

Division is performed based on circles of the target probabilistic constellation diagram. A larger quantity of constellation points in each circle indicates greater impact on demodulation performance after the constellation points turn a circle due to the impact of the phase noise. Therefore, for a circle with more constellation points, probability distributions should be correspondingly reduced.

For example, for the 64-QAM probabilistic shaping constellation diagram, $$g(x_i) = num(C_j),\ x_i \in C_j,\ num(C_j) = \{4, 5, 4, 8, 8, 12, 8, 8, 4\}.$$

Solution 2: The g(x) function indicates the first angle difference corresponding to each circle of the target probabilistic constellation diagram.

Division is performed based on circles of the target probabilistic constellation diagram. A smaller angle difference between angles corresponding to two adjacent constellation points in each circle indicates greater impact on demodulation performance after the constellation points turn a circle due to the impact of the phase noise. Therefore, for a circle with a smaller angle difference between the angles corresponding to the two adjacent constellation points, probability distributions should be correspondingly reduced.

For example, $g(x_i)=\min(\text{angle}(x_i), \text{angle}(x_m))$, $x_i \in C_j$, $x_m, \in C_j$, where $x_i$ and $x_m$ are two adjacent constellation points in a same circle of the target probabilistic constellation diagram, angle($x_i$) is an angle corresponding to the constellation point $x_i$, and angle($x_m$) is an angle corresponding to the constellation point $x_m$.

It can be learned from the foregoing solution 1 and solution 2 that, the g(x) function may indicate calculation of the quantity of constellation points in each circle, or may indicate calculation of the first angle difference corresponding to the constellation points in each circle. In addition, the g(x) function may alternatively be another function that can reflect information about the impact magnitude of the phase noise. In addition, g(x) may further indicate any one or a combination of the quantity of constellation points in each circle, the first angle difference corresponding to the constellation points in each circle, and the like.

Figure 4:
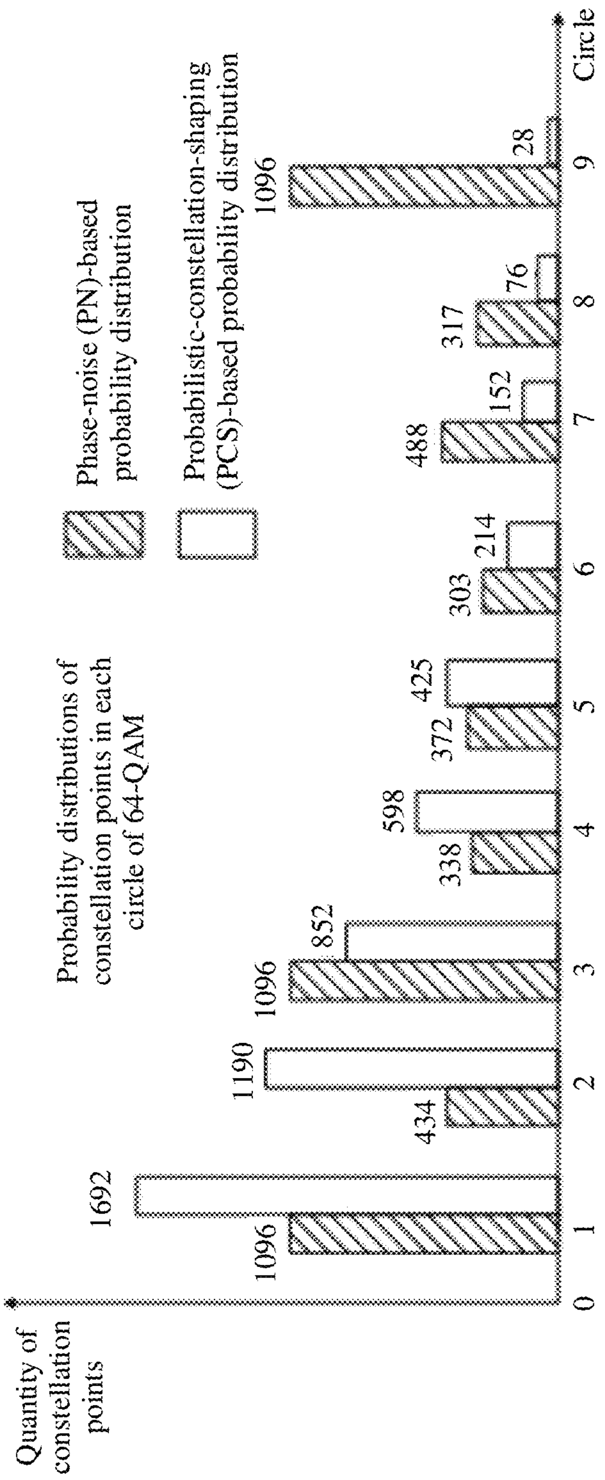
FIG. 4 is a diagram of probability distributions of constellation points in a probabilistic-constellation-shaping-based 64-QAM constellation diagram and probability distributions of constellation points in a phase-noise-based 64-QAM constellation diagram according to an embodiment of this application.

It can be learned from the foregoing analysis that the probability distributions of the target probabilistic constellation diagram do not conform with the Maxwell-Boltzmann distribution with considering the impact of the phase noise. FIG. 4 is a diagram of probability distributions in circles of a probabilistic-constellation-shaping-based 64-QAM constellation diagram and probability distributions of circles of a phase-noise (phase noise, PN)-based 64-QAM constellation diagram. In the probabilistic-constellation-shaping-based 64-QAM constellation diagram, the Maxwell-Boltzmann distribution parameter is not equal to 0, and the phase noise scaling factor is equal to 0. It can be learned from FIG. 4 that probability distributions in the probabilistic-constellation-shaping-based 64-QAM decrease progressively according to circle layers of the constellation points, probability distributions of constellation points in a first circle are the highest, and there are a largest quantity of constellation points. Probability distributions of constellation points in a second circle are correspondingly reduced. Probability distributions of constellation points in a ninth circle (an outermost circle) are the smallest, and there are a smallest quantity of constellation points. The phase-noise-based 64-QAM constellation diagram considers only the impact of the phase noise. The Maxwell-Boltzmann distribution parameter is equal to 0, and the phase noise scaling factor is greater than 0. It can be learned from FIG. 4 that probability distributions of constellation points in each circle of the phase-noise-based 64-QAM constellation diagram are related to impact of the phase noise on each circle. A quantity of constellation points in each circle is different from the probability distribution in the probabilistic-constellation-shaping-based 64-QAM constellation diagram. A second circle and a fourth circle to an eighth circle respectively correspond to small quantities of constellation points. A first circle, a third circle, and a ninth circle respectively correspond to large quantities of constellations.

In actual application, the first communication apparatus may adjust the phase noise parameter and the Maxwell-Boltzmann distribution based on the impact of the phase noise, and determine the probability distributions of the constellation points in the target probabilistic constellation diagram. Because the impact of the phase noise is considered, compared with a probabilistic-constellation-shaping-based constellation diagram, the target probabilistic constellation diagram increases probability distributions of constellation points in an outer circle. This helps improve the capability of resisting the phase noise. Further, increasing the probability distributions of the constellation points in the outer circle helps increase average power when peak power remains unchanged. Therefore, the technical solution of this application can implement a lower peak-to-average power ratio (PARA). The peak-to-average power ratio is equal to the peak power/the average power.

202: The first communication apparatus modulates a first original bit stream and a second original bit stream based on the probability distributions of the constellation points in the target probabilistic shaping constellation diagram, to obtain a first QAM symbol stream.

Specifically, a second communication apparatus modulates the first original bit stream and the second original bit stream based on the probability distributions and signal amplitudes of the constellation points in the target probabilistic shaping constellation diagram, to obtain the first QAM symbol stream.

Figure 5:
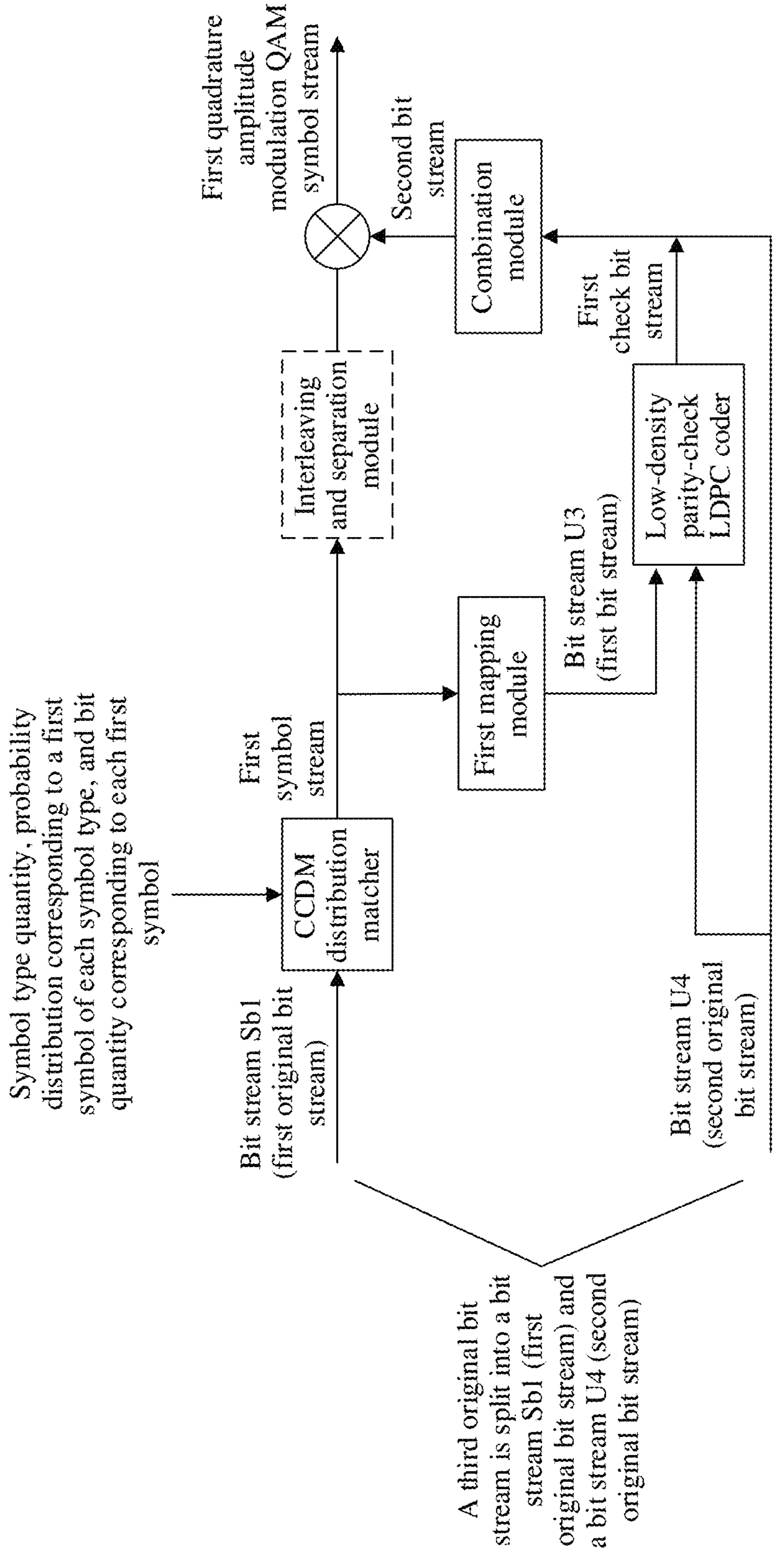
FIG. 5 is a schematic flowchart of a modulation method according to an embodiment of this application.

For example, as shown in FIG. 5, the first communication apparatus receives a third original bit stream, and determines or divides the third original bit stream into a bit stream Sb1 and a bit stream U4. In other words, the third original bit stream includes the bit stream Sb1 and the bit stream U4. The bit stream Sb1 is the first original bit stream in step 202. The bit stream U4 is the second original bit stream in step 202. Then, the first communication apparatus modulates the bit stream Sb1 and the bit stream U4 based on the probability distributions and the signal amplitudes of the constellation points in the target probabilistic shaping constellation diagram, to obtain the first QAM symbol stream.

It can be learned that if the Maxwell-Boltzmann distribution parameter is not equal to 0, and the phase noise scaling factor is equal to 0, the modulation includes the probabilistic constellation shaping modulation. In other words, the first communication apparatus directly modulates the first original bit stream and the second original bit stream through probabilistic constellation shaping without considering the impact of the phase noise. For example, in a low-frequency scenario, the impact of the phase noise is small, the first communication apparatus may not consider the phase noise, and the first communication apparatus modulates the first original bit stream and the second original bit stream through probabilistic constellation shaping.

If neither the Maxwell-Boltzmann distribution parameter nor the phase noise scaling factor is equal to 0, the modulation includes phase-noise-based probabilistic constellation shaping modulation. In other words, the first communication apparatus modulates the first original bit stream and the second original bit stream through phase-noise-based probabilistic constellation shaping with considering the impact of the phase noise. For example, in a high-frequency scenario, the impact of the phase noise is loud, and the first communication apparatus may modulate the first original bit stream and the second original bit stream through phase-noise-based probabilistic constellation shaping.

The following describes a possible implementation of step 202 with reference to step 202*a* to step 202*c*.

202*a*: The first communication apparatus determines, based on the probability distributions and the signal amplitudes of the constellation points in the target probabilistic shaping constellation diagram, a symbol type quantity, a probability distribution corresponding to a first symbol of each symbol type, and a bit quantity corresponding to each first symbol.

The symbol type quantity and the probability distribution corresponding to the first symbol of each symbol type indicate probability distributions and signal amplitudes of quadrature signals of the constellation points in the target probabilistic shaping constellation diagram and probability distributions and signal amplitudes of inphase signals of the constellation points. The bit quantity corresponding to each first symbol is a bit quantity required by each first symbol that is represented by using a bit, and first symbols of different symbol types correspond to different probability distributions and/or different signal amplitudes.

The following describes, with reference to two examples, how the first communication apparatus determines the symbol type quantity, the probability distribution corresponding to the first symbol of each symbol type, and the bit quantity corresponding to each first symbol.

Figure 6:
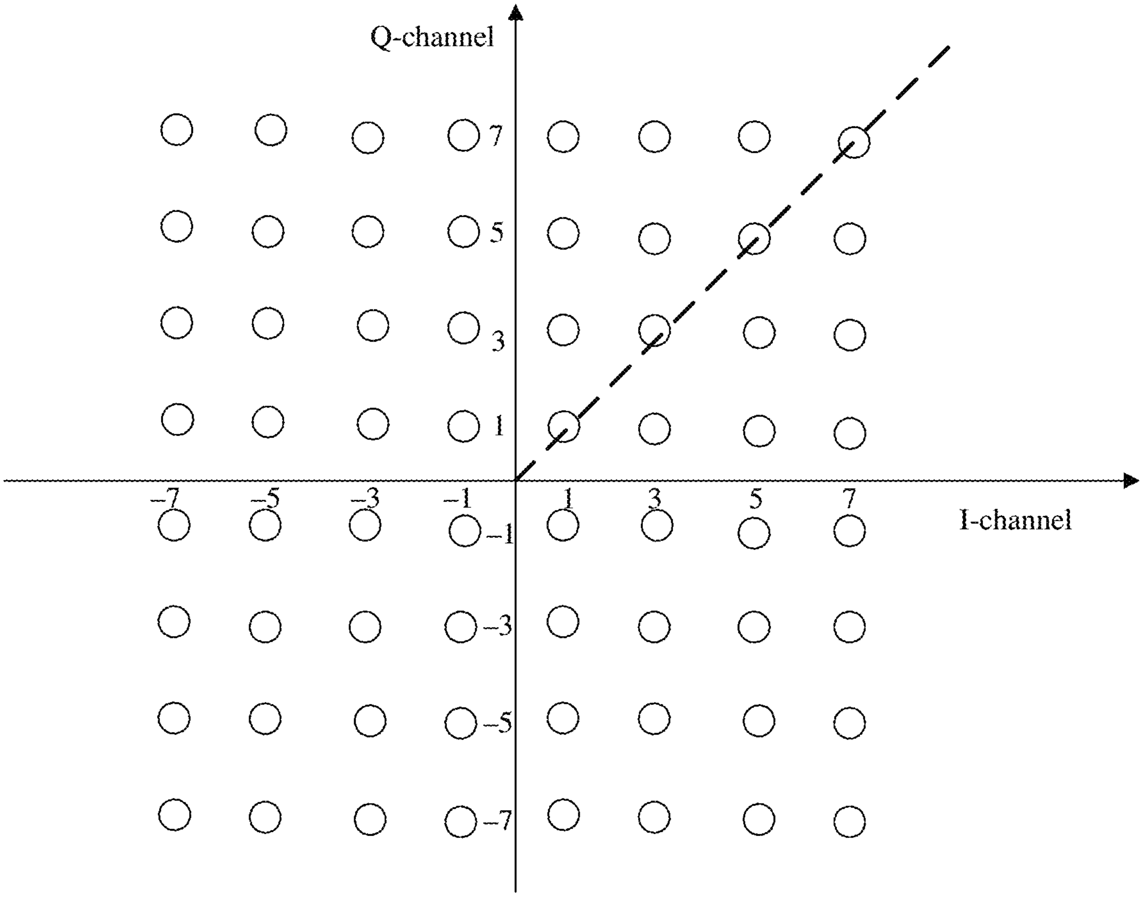
FIG. 6 is a diagram of a 64-QAM constellation diagram according to an embodiment of this application.

Example 1: As shown in FIG. 6, 64-QAM is used as an example. It indicates that a quantity of bits required by a 64-QAM constellation diagram is 6, and signal amplitudes of constellation points include 1, 3, 5, and 7. In this case, bits representing an I-channel signal are 3 bits, and one of the bits is a sign bit of the I-channel signal. Bits representing a Q-channel signal are also 3 bits, and one of the bits is a sign bit of the Q-channel signal. The first communication apparatus may determine the probability distributions of the constellation points in the target probabilistic shaping constellation diagram by using step 201.

If a finally required target probabilistic shaping constellation diagram is I/Q symmetric, only one channel of signal needs to be considered. It can be learned from the foregoing analysis that a symbol that does not carry a sign bit and that is required in each channel of signal needs to be represented by using 2 bits. Therefore, it can be learned that the symbol type quantity is 4, and the bit quantity corresponding to each first symbol is 2. Herein, an example in which the four symbol types are 1, 3, 5, and 7 respectively is used for description. The probability distribution corresponding to the first symbol of each symbol type is determined according to the foregoing formula (15). For example, when an information entropy H is 5.6, a value of the Maxwell-Boltzmann distribution parameter v is 0.0336, and the phase noise scaling factor α is 0, it may be determined, through calculation, that a probability distribution of a symbol "1" is 0.4149, a probability distribution of a symbol "3" is 0.3171, a probability distribution of a symbol "5" is 0.1852, and a probability distribution of a symbol "7" is 0.0827. It can be learned that a first symbol stream includes four symbol types: 1, 3, 5, and 7. A ratio of the symbol "1" to first symbols included in the first symbol stream is 0.4149, a ratio of the symbol "3" to the first symbols included in the first symbol stream is 0.3171, a ratio of the symbol "5" to the first symbols included in the first symbol stream is 0.1852, and a ratio of the symbol "7" to the first symbols included in the first symbol stream is 0.0827.

It should be noted that the four symbol types may alternatively be 0, 1, 2, and 3.0 indicates that a signal amplitude of a quadrature signal or an inphase signal of a constellation point corresponding to 0 is 1, 1 indicates that a signal amplitude of a quadrature signal or an inphase signal of a constellation point corresponding to 1 is 3, 2 indicates that a signal amplitude of a quadrature signal or an inphase signal of a constellation point corresponding to 2 is 5, and 3 indicates that a signal amplitude of a quadrature signal or an inphase signal of a constellation point corresponding to 3 is 7. This is not specifically limited in this application. That is, a value of a first symbol in the first symbol stream is a signal amplitude of a quadrature signal or an inphase signal of a constellation point corresponding to the symbol, or may indicate a signal amplitude of a quadrature signal or an inphase signal of a constellation point corresponding to the symbol. However, the value is not the signal amplitude of the quadrature signal or the inphase signal of the constellation point corresponding to the symbol. The following describes the technical solutions of this application by using an example in which the value of the first symbol in the first symbol stream is the signal amplitude of the quadrature signal or the inphase signal of the constellation point corresponding to the symbol.

Example 2: As shown in FIG. 6, 64-QAM is used as an example. It indicates that a quantity of bits required by a 64-QAM constellation diagram is 6, and signal amplitudes of constellation points include 1, 3, 5, and 7. The first communication apparatus may determine the probability distributions of the constellation points in the target probabilistic shaping constellation diagram by using step 201.

If a finally required target probabilistic shaping constellation diagram (namely, PCS 64-QAM) is not I/Q symmetric, but quadrant symmetric, and a symbol representing each quadrant needs 6 bits, where 2 bits are sign bits that are used to determine a quadrant in which the symbol falls. Therefore, in this case, a required symbol that does not carry a sign bit needs to be represented by using 4 bits. Therefore, it can be learned that the bit quantity corresponding to each first symbol is 4. If probability distributions of constellation points falling in a quadrant are different, the symbol type quantity is 16. The probability distribution corresponding to the first symbol of each symbol type is determined according to the foregoing formula (15). The first symbol stream includes 16 symbol types that are specifically: {1+1j, 1+3j, 1+5j, 1+7j, . . . , 7+1j, 7+3j, 7+5j, 7+7j}.

It should be noted that the 16 symbol types may alternatively be replaced with 0 to 15.0 represents the first symbol 1+1j, 1 represents the first symbol 1+3j, 2 represents the first symbol 1+5j, and the rest may be deduced by analogy. This is not specifically limited in this application. In other words, the first symbol in the first symbol stream may be a representation of the constellation point corresponding to the first symbol, or may indicate the constellation point corresponding to the first symbol. The following describes the technical solutions of this application by using an example in which the first symbol in the first symbol stream may be the representation of the constellation point corresponding to the first symbol.

Specifically, when a source entropy H=5.44, a value of the Maxwell-Boltzmann distribution parameter v is 0.04, and the phase noise scaling factor α is 0.1, a probability distribution of the symbol 1+1j is 0.0046, a probability distribution of the symbol 1+3j is 0.0105, a probability distribution of the symbol 1+5j is 0.0272, a probability distribution of the symbol 1+7j is 0.0208, a probability distribution of the symbol 3+1j is 0.105, a probability distribution of the symbol 3+3j is 0.0272, a probability distribution of the symbol 3+5j is 0.0719, a probability distribution of the symbol 3+7j is 0.0527, a probability distribution of the symbol 5+1j is 0.0272, a probability distribution of the symbol 5+3j is 0.0719, a probability distribution of the symbol 5+5j is 0.2112, a probability distribution of the symbol 5+7j is 0.1398, a probability distribution of the symbol 7+1j is 0.0208, a probability distribution of the symbol 7+3j is 0.0527, a probability distribution of the symbol 7+5j is 0.1398, and a probability distribution of the symbol 7+7j is 0.113.

It can be learned from the foregoing example 1 and example 2 that the technical solutions of this application are applicable to both a probabilistic shaping constellation diagram in which an I channel and a Q channel have a same probability distribution, and a probabilistic shaping constellation diagram in which an I channel and a Q channel have different probability distributions. Application scenarios are rich, applicability is wide, and flexibility is high.

202*b*: The first communication apparatus generates the first symbol stream based on the symbol type quantity, the probability distribution corresponding to the first symbol of each symbol type, the bit quantity corresponding to each first symbol, and the first original bit stream.

The first symbol stream includes a plurality of first symbols, and a proportion of the first symbol of each symbol type in the first symbol stream in the first symbols included in the first symbol stream is equal to the probability distribution corresponding to the first symbol of each symbol type. In other words, the first symbol included in the first symbol stream has a corresponding probability distribution. The symbol type quantity and the probability distribution corresponding to the first symbol of each symbol type indicate the probability distributions and the signal amplitudes of the quadrature signals of the constellation points in the target probabilistic shaping constellation diagram and the probability distributions and the signal amplitudes of the inphase signals of the constellation points. In other words, in a process of determining the first symbol stream, the first communication apparatus processes a quadrature signal (an I-channel signal) and an inphase signal (a Q-channel signal) in a QAM symbol together.

The first symbol in the first symbol stream is an integer in which a value of a real part and a value of an imaginary part are both greater than or equal to 0.

Specifically, the first communication apparatus receives the third original bit stream, where the third original bit stream includes the first original bit stream and the second original bit stream. In other words, the first communication apparatus receives the third original bit stream, and determines or divides the third original bit stream into the first original bit stream and the second original bit stream. Further, the first communication apparatus generates the first symbol stream based on the first original bit stream, the symbol type quantity, the probability distribution corresponding to the first symbol of each symbol type, and the bit quantity corresponding to each first symbol.

For example, as shown in FIG. 5, the first communication apparatus splits the third original bit stream into the bit stream Sb1 and the bit stream U4. The bit stream Sb1 is the first original bit stream in step 202, and the bit stream U4 is the second original bit stream in step 202. The first communication apparatus inputs the bit stream Sb1, the symbol type quantity, the probability distribution corresponding to the first symbol of each symbol type, and the bit quantity corresponding to each first symbol into a CCDM, and the CCDM outputs the first symbol stream.

In a possible implementation, each first symbol in the first symbol stream corresponds to a quadrature signal or an inphase signal of one constellation point in the target probabilistic shaping constellation diagram.

For example, it can be learned from the foregoing example 1 that the first symbol stream includes the four symbol types: 1, 3, 5, and 7. The first symbol in the first symbol stream may correspond to an I-channel signal of a constellation point or a Q-channel signal of a constellation point.

In another possible implementation, each first symbol in the first symbol stream corresponds to one constellation point in the target probabilistic shaping constellation diagram.

For example, it can be learned from the foregoing example 2 that the first symbol stream includes the 16 symbol types that are specifically: {1+1j, 1+3j, 1+5j, 1+7j, . . . , 7+1j, 7+3j, 7+5j, 7+7j}. The first symbol 1+1j corresponds to a constellation point whose horizontal coordinate value is 1 and whose vertical coordinate value is 1 in the target probabilistic shaping constellation diagram shown in FIG. 6. The first symbol 1+3j corresponds to a constellation point whose horizontal coordinate value is 1 and whose vertical coordinate value is 3 in the target probabilistic shaping constellation diagram shown in FIG. 6.

Optionally, first symbols of all symbol types in the first symbol stream correspond to different probability distributions and/or different signal amplitudes of quadrature signals or inphase signals.

For example, it can be learned from the foregoing example 1 that a signal amplitude corresponding to the symbol “1” is 1, a signal amplitude corresponding to the symbol “3” is 3, a signal amplitude corresponding to the symbol “5” is 5, and a signal amplitude corresponding to the symbol “7” is 7. First symbols of different symbol types correspond to different signal amplitudes. The probability distribution of the symbol “1” is 0.4149, the probability distribution of the symbol “3” is 0.3171, the probability distribution of the symbol “5” is 0.1852, and the probability distribution of the symbol “7” is 0.0827. First symbols of different symbol types correspond to different probability distributions.

For example, it can be learned from the foregoing example 2 that each first symbol in the first symbol stream corresponds to one constellation point, and probability distributions of first symbols of different symbol types are different. For example, a signal amplitude of a constellation point corresponding to 1+2j is $\sqrt{1^2+2^2}$, and a signal amplitude of a constellation point corresponding to 2+1j is $\sqrt{2^2+1^2}$. Therefore, it can be learned that a signal amplitude corresponding to 1+2j is the same as a signal amplitude corresponding to 2+1j, but a probability distribution corresponding to 1+2j is different from a probability distribution corresponding to 2+1j.

202*c*: The first communication apparatus generates the first QAM symbol stream based on the first symbol stream and the second original bit stream.

The first QAM symbol stream includes one or more QAM symbols, and the one or more QAM symbols constitute the target probabilistic shaping constellation diagram.

Optionally, the embodiment shown in FIG. 2 further includes step 202*d*, and step 202*d* may be performed before step 202*c*.

202*d*: The first communication apparatus interleaves and separates, according to a first interleaving and separation rule, the plurality of first symbols included in the first symbol stream, to obtain an interleaved first symbol stream.

Optionally, the first interleaving and separation rule includes that the first communication apparatus exchanges positions of the first symbols in the first symbol stream according to a preset sequence.

For example, in the foregoing example 1, the first symbol stream is {111111111111333333335555557777}, and the first communication apparatus processes the first symbol stream according to the first interleaving and separation rule, to obtain the interleaved first symbol stream {133157315711131353311551537117}. The target probabilistic shaping constellation diagram is I/Q symmetric. Therefore, an odd-numbered first symbol in the interleaved first symbol stream corresponds to a quadrature signal of a constellation point, and an even-numbered first symbol corresponds to an inphase signal of a constellation point. Alternatively, an even-numbered first symbol in the interleaved first symbol stream corresponds to a quadrature signal of a constellation point, and an odd-numbered first symbol corresponds to an inphase signal of a constellation point. Alternatively, a first symbol in the first half part of the interleaved first symbol stream corresponds to a quadrature signal of a constellation point, and a first symbol in the second half part corresponds to an inphase signal of a constellation point.

In this implementation, the first communication apparatus interleaves, according to the first interleaving and separation rule, the first symbols included in the first symbol stream. This helps ensure a probability distribution of an I channel and a probability distribution of a Q channel. For example, the first symbol stream is {111111111111333333335555557777}. If interleaving is not performed, first symbols with a same probability distribution are centralized together. This is not conducive to ensuring the probability distribution of the I channel and the probability distribution of the Q channel. In addition, a centralized error in the first symbol stream is avoided, and decoding error correction performance is not affected. The first communication apparatus may decentralize, through interleaving, first symbols in which errors occur in the interleaved first symbol stream, in other words, decentralize the first symbols in error in the first symbol stream. This improves robustness of decoding error correction.

Based on step 202*d*, optionally, step 202*c* specifically includes:

The first communication apparatus generates the first QAM symbol stream based on the interleaved first symbol stream and the second original bit stream.

Figure 8A:
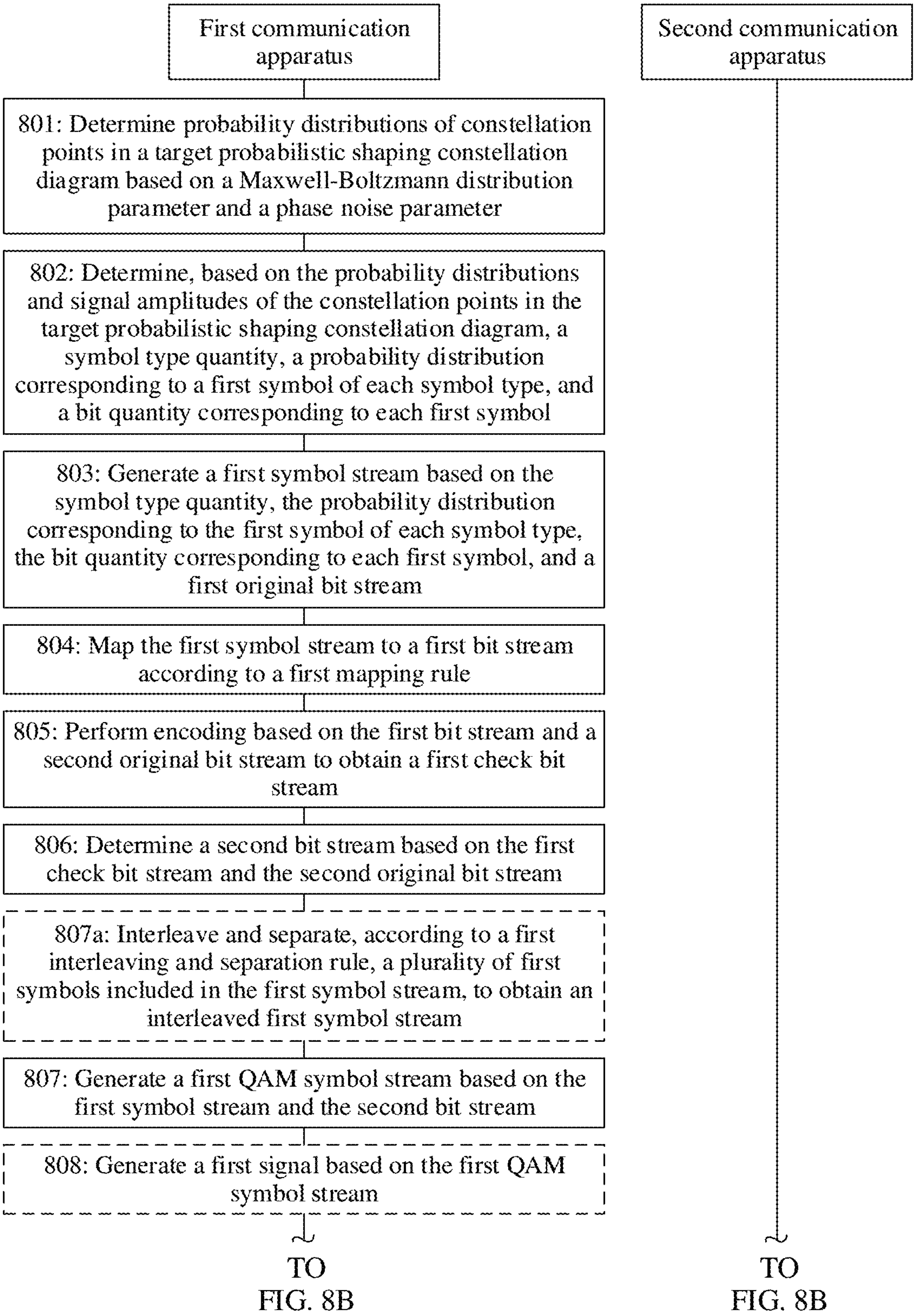
FIG. 8A and FIG. 8B are a diagram of another embodiment of a modulation method and a demodulation method according to an embodiment of this application.
Figure 8B:
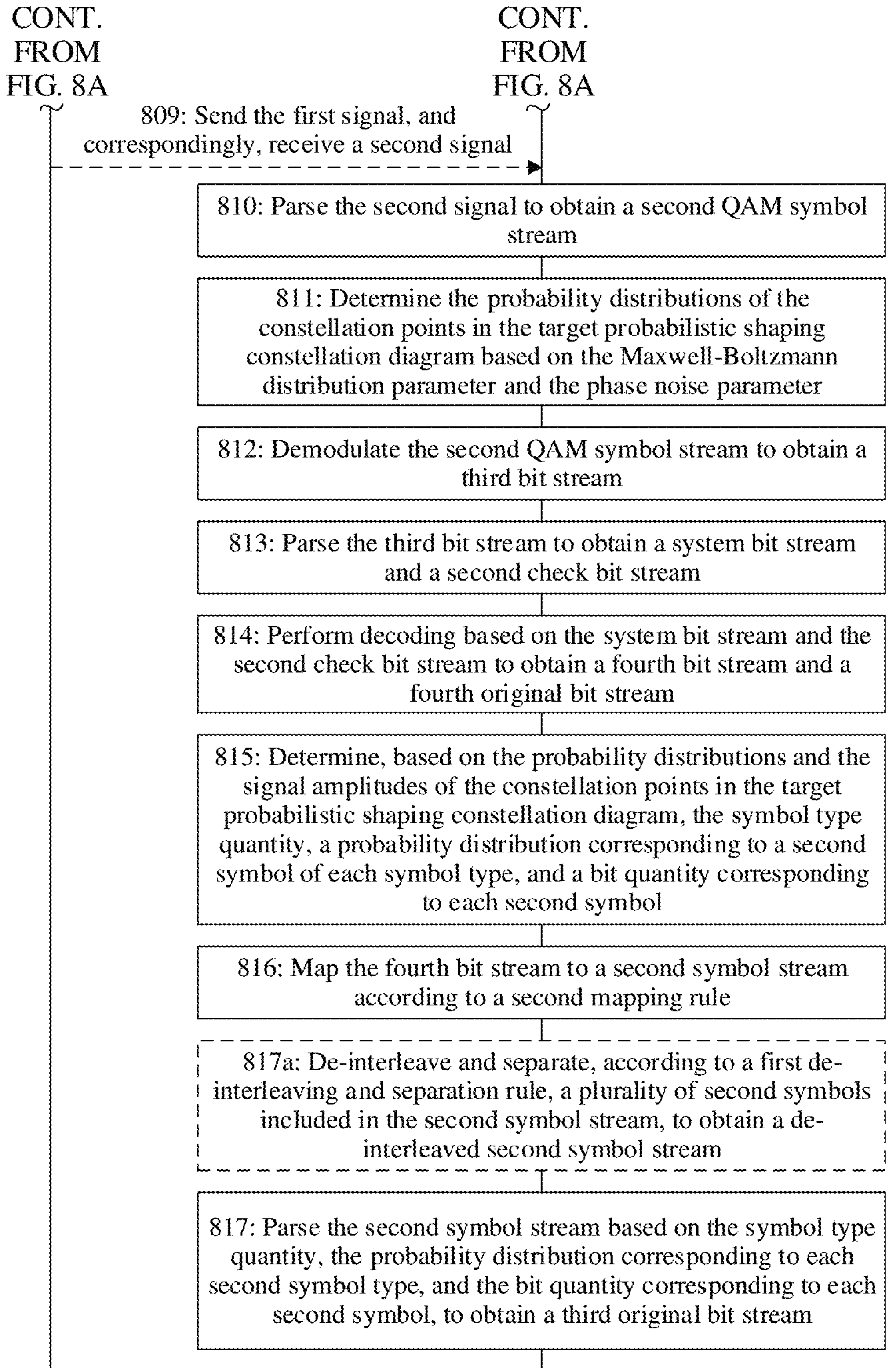

Optionally, for a specific process in which the first communication apparatus generates the first QAM symbol stream based on the interleaved first symbol stream and the second original bit stream, refer to the following detailed descriptions of the embodiment shown in FIG. 8A and FIG. 8B.

It can be learned that the symbol type quantity and the probability distribution corresponding to the first symbol of each symbol type indicate the probability distributions and the signal amplitudes of the quadrature signals of the constellation points in the target probabilistic shaping constellation diagram and the probability distributions and the signal amplitudes of the inphase signals of the constellation points. In other words, in the process of determining the first symbol stream, the first communication apparatus processes the quadrature signal (the I-channel signal) and the inphase signal (the Q-channel signal) in the QAM symbol together. That is, the first communication apparatus generates the first symbol stream by using one CCDM, and generates the first QAM symbol stream based on the first symbol stream and the second original bit stream. There is no need to use two CCDMs to generate a symbol stream corresponding to the I-channel signal and a symbol stream corresponding to the Q-channel signal, and then combine the two symbol streams into the QAM symbol. This reduces system complexity.

Optionally, the embodiment shown in FIG. 2 further includes step 203 and step 204, and step 203 and step 205 may be performed after step 202.

203: The first communication apparatus generates a first signal based on the first QAM symbol stream.

204: The first communication apparatus sends the first signal to the second communication apparatus. Correspondingly, the second communication apparatus receives a second signal from the first communication apparatus.

Specifically, the first communication apparatus performs layer mapping, precoding, resource mapping, OFDM or DETS symbol generation, and other procedure processing on the first QAM symbol stream to obtain the first signal. Then, the first communication apparatus sends the first signal on a channel through an antenna port. The first signal is affected by noise, the channel, and the like in a transmission process. Therefore, herein, a signal received by the second communication apparatus from the first communication apparatus is referred to as the second signal. The first signal is the same as or different from the second signal.

Optionally, the following describes some possible implementations in which the first communication apparatus uses the probabilistic constellation shaping modulation scheme or a phase-noise-based probabilistic constellation shaping modulation scheme.

1. The first communication apparatus may use the probabilistic constellation shaping modulation scheme or the phase-noise-based probabilistic constellation shaping modulation scheme by default.
2. The first communication apparatus obtains a channel state parameter; and when the channel state parameter is greater than a first threshold, the first communication apparatus uses the probabilistic constellation shaping modulation scheme or the phase-noise-based probabilistic constellation shaping modulation scheme.

The first threshold may be set depending on at least one of the following factors: an application scenario, a channel condition, values of a shaping gain under different channel conditions, and comparison of system overheads.

In a possible implementation, the channel state parameter is a channel quality indicator (CQI), a block error rate (BLER), or a throughput that is obtained by the first communication apparatus through measurement. The first communication apparatus is a terminal device.

In another possible implementation, the channel state parameter is a CQI, a BLER, or a throughput that is obtained by the second communication apparatus through measurement. The first communication apparatus is a network device, and the second communication apparatus is a terminal device.

3. The first communication apparatus is a terminal device, and the first communication apparatus receives a modulation scheme indication from the second communication apparatus. The modulation scheme indication indicates that the first communication apparatus uses the probabilistic constellation shaping modulation scheme or the phase-noise-based probabilistic constellation shaping modulation scheme. The second communication apparatus is a network device.

205: The second communication apparatus obtains a second QAM symbol stream based on the second signal.

The second QAM symbol stream includes one or more QAM symbols, and the one or more QAM symbols may constitute the target probabilistic shaping constellation diagram.

Figure 7:
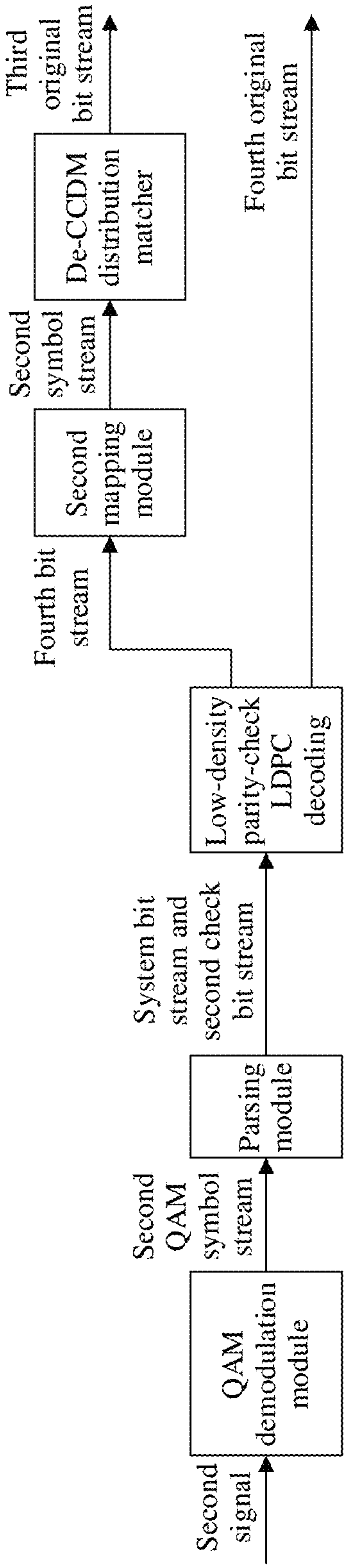
FIG. 7 is a schematic flowchart of a demodulation method according to an embodiment of this application.

For example, as shown in FIG. 7, a QAM demodulation module parses the second signal to obtain the second QAM symbol stream.

206: The second communication apparatus determines the probability distributions of the constellation points in the target probabilistic shaping constellation diagram based on the Maxwell-Boltzmann distribution parameter and the phase noise parameter.

Step 206 is similar to step 201. For details, refer to the related descriptions of step 201.

207: The second communication apparatus demodulates the second QAM symbol stream based on the probability distributions of the constellation points in the target probabilistic shaping constellation diagram, to obtain the third original bit stream and a fourth original bit stream.

For a detailed process of step 207, refer to related descriptions in the following embodiment shown in FIG. 8A and FIG. 8B.

In this embodiment of this application, the first communication apparatus determines the probability distributions of the constellation points in the target probabilistic shaping constellation diagram based on the Maxwell-Boltzmann distribution parameter and the phase noise parameter. The first communication apparatus modulates the first original bit stream and the second original bit stream based on the probability distributions of the constellation points in the target probabilistic shaping constellation diagram, to obtain the first QAM symbol stream. It can be learned from this that the first communication apparatus generates the probability distributions of the constellation points in the target probabilistic shaping constellation diagram based on the Maxwell-Boltzmann distribution parameter and the phase noise parameter, and then modulates the first original bit stream and the second original bit stream based on the probability distributions of the constellation points in the target probabilistic shaping constellation diagram. This helps improve the capability of resisting the phase noise, and ensures a shaping gain obtained by using a probabilistic constellation shaping technology under the impact of the phase noise. For example, in the high-frequency scenario, the first communication apparatus can ensure, by performing the technical solutions of this application, a shaping gain brought by using the probabilistic constellation shaping modulation in the high-frequency scenario.

FIG. 8A and FIG. 8B are a diagram of another embodiment of a modulation method and a demodulation method according to an embodiment of this application. Refer to FIG. 8A and FIG. 8B. The method includes the following steps.

801: A first communication apparatus determines probability distributions of constellation points in a target probabilistic shaping constellation diagram based on a Maxwell-Boltzmann distribution parameter and phase noise.

Step 801 is similar to step 201 in the embodiment shown in FIG. 2. For details, refer to the related descriptions of step 201 in the embodiment shown in FIG. 2.

802: The first communication apparatus determines, based on the probability distributions and signal amplitudes of the constellation points in the target probabilistic shaping constellation diagram, a symbol type quantity, a probability distribution corresponding to a first symbol of each symbol type, and a bit quantity corresponding to each first symbol.

Step 802 is similar to step 202*a* in the embodiment shown in FIG. 2. For details, refer to the related descriptions of step 202*a* in the embodiment shown in FIG. 2. Details are not described herein again.

803: The first communication apparatus generates a first symbol stream based on the symbol type quantity, the probability distribution corresponding to the first symbol of each symbol type, the bit quantity corresponding to each first symbol, and a first original bit stream.

Step 803 is similar to step 202*b* in the embodiment shown in FIG. 2. For details, refer to the related descriptions of step 202*b* in the embodiment shown in FIG. 2. Details are not described herein again.

804: The first communication apparatus maps the first symbol stream to a first bit stream according to a first mapping rule.

The first mapping rule is a mapping relationship between a first symbol and a bit, and a quantity of bits to which each first symbol is mapped is the bit quantity corresponding to each first symbol.

For example, with reference to the foregoing example 1, the first symbol stream includes the four symbol types: 1, 3, 5, and 7. The first mapping rule may be represented as the following Table 3:

TABLE 3

| First symbol | Bits |
|---|---|
| 1 | 10 |
| 3 | 11 |
| 5 | 01 |
| 7 | 00 |

It can be learned from Table 3 that 1 is mapped to the bits 10, 3 is mapped to the bits 11, 5 is mapped to the bits 01, and 7 is mapped to the bits 00. It can be learned that the first communication apparatus maps the first symbol stream to the first bit stream according to the foregoing Table 1.

For example, with reference to the foregoing example 2, the first symbol stream includes the 16 symbol types: 1+1j, 1+3j, 1+5j, 1+7j, . . . , 7+1j, 7+3j, 7+5j, and 7+7j. The first mapping rule may be represented as the following Table 4:

TABLE 4

| First symbol | Bits |
|---|---|
| 1 + 1j | 0000 |
| 1 + 3j | 0001 |
| 1 + 5j | 0010 |
| 1 + 7j | 0011 |
| 3 + 1j | 0100 |
| 3 + 3j | 0101 |
| 3 + 5j | 0110 |
| 3 + 7j | 0111 |
| 5 + 1j | 1000 |
| 5 + 3j | 1001 |
| 5 + 5j | 1010 |
| 5 + 7j | 1011 |
| 7 + 1j | 1100 |
| 7 + 3j | 1101 |
| 7 + 5j | 1110 |
| 7 + 7j | 1111 |

It can be learned that the first communication apparatus maps the first symbol stream to the first bit stream according to the first mapping rule shown in the foregoing Table 4.

For example, with reference to the foregoing example 2, the first symbol stream includes the 16 symbol types: 1+1j, 1+3j, 1+5j, 1+7j, . . . , 7+1j, 7+3j, 7+5j, and 7+7j. The first mapping rule may be represented as the following Table 5:

TABLE 5

| First symbol | Bits |
|---|---|
| 1 + 7j | 0000 |
| 1 + 5j | 0001 |
| 1 + 1j | 0010 |
| 1 + 3j | 0011 |
| 3 + 7j | 0100 |
| 3 + 5j | 0101 |
| 3 + 1j | 0110 |
| 3 + 3j | 0111 |
| 7 + 7j | 1000 |
| 7 + 5j | 1001 |
| 7 + 1j | 1010 |
| 7 + 3j | 1011 |
| 5 + 7j | 1100 |
| 5 + 5j | 1101 |
| 5 + 1j | 1110 |
| 5 + 3j | 1111 |

It can be learned that the first communication apparatus maps the first symbol stream to the first bit stream according to the first mapping rule shown in the foregoing Table 5.

It should be noted that the first mapping rule may be preconfigured, or may be defined in a communication protocol. This is not specifically limited in this application.

For example, as shown in FIG. 5, the CCDM of the first communication apparatus outputs the first symbol stream, and a first mapping module maps the first symbol stream to a bit stream U3, and outputs the bit stream U3, where the bit stream U3 is the first bit stream in step 804.

805: The first communication apparatus performs encoding based on the first bit stream and a second original bit stream to obtain a first check bit stream.

For example, as shown in FIG. 5, the bit stream U3 and the bit stream U4 are input to an LDPC encoder as system bits, and the LDPC encoder outputs the first check bit stream after encoding. The bit stream U3 is the first bit stream in step 804, and the bit stream U4 is the second original bit stream.

806: The first communication apparatus determines a second bit stream based on the first check bit stream and the second original bit stream.

Optionally, the first communication apparatus combines the second original bit stream with the first check bit stream, to obtain the second bit stream. In other words, the second bit stream includes the first check bit stream and the second original bit stream. For example, as shown in FIG. 5, a combination module combines the first check bit stream with the second original bit stream, to obtain the second bit stream.

807: The first communication apparatus generates first QAM symbol stream based on the first symbol stream and the second bit stream.

The first QAM symbol stream includes one or more QAM symbols, and the one or more QAM symbols constitute the target probabilistic shaping constellation diagram.

Specifically, that the first communication apparatus generates the QAM symbol in the first QAM symbol stream includes: The first communication apparatus uses a first symbol in the first symbol stream as a signal amplitude corresponding to the first symbol; and the first communication apparatus uses a bit in the second bit stream as a sign bit of a signal of a first symbol corresponding to the bit.

Optionally, the embodiment shown in FIG. 8A and FIG. 8B further includes step 807*a*, and step 807*a* may be performed before step 807.

807*a*: The first communication apparatus interleaves and separates, according to a first interleaving and separation rule, a plurality of first symbols included in the first symbol stream, to obtain an interleaved first symbol stream.

Step 807*a* is similar to step 202*d* in the embodiment shown in FIG. 2. For details, refer to the related descriptions of step 202*d* in the embodiment shown in FIG. 2. Details are not described herein again.

Based on step 807*a*, optionally, step 807 specifically includes:

The first communication apparatus generates the first QAM symbol stream based on the interleaved first symbol stream and the second bit stream.

Optionally, each first symbol in the interleaved first symbol stream corresponds to a quadrature signal or an inphase signal of one constellation point in the target probabilistic shaping constellation diagram. Each first symbol in the interleaved first symbol stream indicates a signal amplitude of a quadrature signal or an inphase signal corresponding to the first symbol. The second bit stream indicates a symbol bit of the quadrature signal or the inphase signal corresponding to each first symbol in the first symbol stream.

In a possible implementation, an odd-numbered first symbol in the interleaved first symbol stream corresponds to a quadrature signal of a constellation point in the target probabilistic shaping constellation diagram, and an even-numbered first symbol in the interleaved first symbol stream corresponds to an inphase signal of a constellation point in the target probabilistic shaping constellation diagram. Alternatively, an even-numbered first symbol in the interleaved first symbol stream corresponds to a quadrature signal of a constellation point in the target probabilistic shaping constellation diagram, and an odd-numbered first symbol in the interleaved first symbol stream corresponds to an inphase signal of a constellation point in the target probabilistic shaping constellation diagram. Alternatively, a first symbol in the first half part of the interleaved first symbol stream corresponds to a quadrature signal of a constellation point in the target probabilistic shaping constellation diagram, and a first symbol in the second half part of the interleaved first symbol stream corresponds to an inphase signal of a constellation point in the target probabilistic shaping constellation diagram.

The following provides descriptions by using an example in which an odd-numbered first symbol in the interleaved first symbol stream corresponds to a quadrature signal of a constellation point in the target probabilistic shaping constellation diagram, and an even-numbered first symbol in the interleaved first symbol stream corresponds to an inphase signal of a constellation point in the target probabilistic shaping constellation diagram.

Optionally, the odd-numbered first symbol in the interleaved first symbol stream indicates a signal amplitude of the quadrature signal corresponding to the first symbol, and the even-numbered first symbol in the interleaved first symbol stream indicates a signal amplitude of the inphase signal corresponding to the first symbol. An odd-numbered bit in the second bit stream indicates a sign bit of the quadrature signal corresponding to the odd-numbered first symbol, and an even-numbered bit in the second bit stream indicates a sign bit of the inphase signal corresponding to the even-numbered first symbol.

For example, with reference to the foregoing example 1, the interleaved first symbol stream is {13315731571113135331155153 7117}, the odd-numbered first symbol in the interleaved first symbol stream indicates the signal amplitude of the quadrature signal corresponding to the first symbol, and the even-numbered first symbol in the interleaved first symbol stream indicates the signal amplitude of the inphase signal corresponding to the first symbol. The second bit stream is {01010001111000110011000110 1011}, the odd-numbered bit in the second bit stream indicates the sign bit of the quadrature signal corresponding to the odd-numbered first symbol, and the even-numbered bit in the second bit stream indicates the sign bit of the inphase signal corresponding to the even-numbered first symbol. In the second bit stream, "1" represents "−", and "o" represents "+". Therefore, the first communication apparatus may determine, based on the interleaved first symbol stream and the second bit stream, that the first symbol stream is {1−3j, 3−j, 5+7j, 3−j, −5−7j, −1+j, 1+3j, −1−3j, 5+3j, −3−j, 1+5j, 5−j, −5+3j, −7+j, −1−7j}.

In another possible implementation, each first symbol in the first symbol stream corresponds to one constellation point in the target probabilistic shaping constellation diagram. Each first symbol in the first symbol stream indicates a signal amplitude of the constellation point corresponding to the first symbol. The second bit stream indicates a sign bit of a quadrature signal of the constellation point corresponding to the first symbol in the first symbol stream and a sign bit of an inphase signal of the constellation point. For example, each second symbol in a second symbol stream indicates a signal amplitude of a constellation point corresponding to the second symbol. A $(2i-1)^{th}$ bit in a fifth bit stream indicates a sign bit of a quadrature signal of a constellation point corresponding to an $i^{th}$ second symbol in the second symbol stream, and a $2i^{th}$ bit in the fifth bit stream indicates a sign bit of an inphase signal of the constellation point corresponding to the $i^{th}$ second symbol in the second symbol stream, where i is an integer greater than or equal to 1.

For example, the first symbol stream is {1+1j, 1+5j, 1+7j, 7+7j}, and the second bit stream is {00110100}. In the second bit stream, "1" represents "−", and "0" represents "+". Therefore, it can be learned that the first communication apparatus may determine, based on the interleaved first symbol stream and the second bit stream, that the first symbol stream is {1+1j, −1−5j, 1−7j, 7+7j}.

Optionally, the embodiment shown in FIG. 8A and FIG. 8B further includes step 808 and step 809. Step 808 and step 809 may be performed after step 807.

808: The first communication apparatus generates a first signal based on the first QAM symbol stream.

809: The first communication apparatus sends the first signal to a second communication apparatus. Correspondingly, the second communication apparatus receives a second signal from the first communication apparatus.

The first signal is the same as or different from the second signal.

Specifically, the first communication apparatus performs layer mapping, precoding, resource mapping, OFDM or DETS symbol generation, and other procedure processing on the first QAM symbol stream to obtain the first signal. Then, the first communication apparatus sends the first signal on a channel through an antenna port. The first signal is affected by noise, the channel, and the like in a transmission process. Therefore, herein, a signal received by the second communication apparatus from the first communication apparatus is referred to as the second signal, and the first signal is the same as or different from the second signal.

810: The second communication apparatus parses the second signal to obtain a second QAM symbol stream.

The second QAM symbol stream includes one or more QAM symbols, and the one or more QAM symbols may constitute the target probabilistic shaping constellation diagram.

For example, as shown in FIG. 7, a QAM demodulation module parses the second signal to obtain the second QAM symbol stream.

811: The second communication apparatus determines the probability distributions of the constellation points in the target probabilistic shaping constellation diagram based on the Maxwell-Boltzmann distribution parameter and the phase noise parameter.

Step 811 is similar to step 206 in the embodiment shown in FIG. 2. For details, refer to the related descriptions of step 206 in the embodiment shown in FIG. 2. Details are not described herein again.

812: The second communication apparatus demodulates the second QAM symbol stream to obtain a third bit stream.

For example, the second QAM symbol stream is {1−3j, 3−j, 5+7j, 3−j, −5−7j, −1+j, 1+3j, −1−3j, 5+3j, −3−j, 1+5j, 5−j, −5+3j, −7+j, −1−7j}. Because a modulation order is 64-QAM, each QAM symbol needs to be represented by using 6 bits, where 3 bits are used to represent a quadrature signal of a constellation point, and the other 3 bits are used to represent an inphase signal of the constellation point. The sign bit "+" corresponds to the bit 1, and the sign bit "−" corresponds to the bit 0.1 is mapped to the bit 10, 3 is mapped to the bit 11, 5 is mapped to the bit 01, and 7 is mapped to the bit 00. Therefore, the third bit stream is {110011111010101100111010001000010110110111010011101111011010110101101010001111000110010000}.

813: The second communication apparatus parses the third bit stream to obtain a system bit stream and a second check bit stream.

For example, as shown in FIG. 7, a parsing module demodulates the second QAM symbol stream to obtain the third bit stream. The third bit stream includes the system bit stream and the second check bit stream. The second communication apparatus determines or divides the third bit stream into the system bit stream and the second check bit stream.

Specifically, it can be learned from step 806 that the first communication apparatus combines the second original bit stream with the first check bit stream to obtain the second bit stream. Therefore, the second communication apparatus may determine positions of check bits in the third bit stream, and the second communication apparatus may separate the check bits from the third bit stream, to obtain the second check bit stream and remaining bits. Herein, the remaining bits are referred to as the system bit stream.

814: The second communication apparatus performs decoding based on the system bit stream and the second check bit stream to obtain a fourth bit stream and a fourth original bit stream.

For example, as shown in FIG. 7, the system bit stream and the second check bit stream are input to an LDPC decoder, and the LDPC decoder performs decoding based on the system bit stream and the second check bit stream to obtain the fourth bit stream and the fourth original bit stream.

815: The second communication apparatus determines, based on the probability distributions and the signal amplitudes of the constellation points in the target probabilistic shaping constellation diagram, the symbol type quantity, a probability distribution corresponding to a second symbol of each symbol type, and a bit quantity corresponding to each second symbol.

Step 815 is similar to step 202*a* in the embodiment shown in FIG. 2. For details, refer to the related descriptions of step 202*a* in the embodiment shown in FIG. 2.

816: The second communication apparatus maps the fourth bit stream to the second symbol stream according to a second mapping rule.

The second mapping rule is a mapping relationship between a bit and a second symbol, and the bit quantity corresponding to each second symbol in the second symbol stream is a quantity of bits required for representing each second symbol by using the bit.

The symbol type quantity of second symbols included in the second symbol stream and the probability distribution corresponding to the second symbol of each symbol type indicate probability distributions and signal amplitudes of quadrature signals of the constellation points in the target probabilistic shaping constellation diagram, and probability distributions and signal amplitudes of the constellation points. In other words, in a process of determining the second symbol stream, the second communication apparatus processes a quadrature signal (an I-channel signal) and an inphase signal (Q-channel signal) in a QAM symbol together. Second symbols of different symbol types correspond to different probability distributions and/or different signal amplitudes.

For a process of determining the bit quantity corresponding to each second symbol, the probability distribution corresponding to the second symbol of each symbol type, and the symbol type quantity of the second symbols included in the second symbol stream, refer to the following related descriptions.

For example, the second mapping rule may be represented as the following Table 6:

TABLE 6

| Bits | Second symbol |
|---|---|
| 10 | 1 |
| 11 | 3 |
| 01 | 5 |
| 00 | 7 |

It can be learned from the foregoing Table 6 that the bit "10" is mapped to the second symbol "1", the bit "11" is mapped to the second symbol "3", the bit "01" is mapped to the second symbol "5", and the bit "00" is mapped to the second symbol “7”. The second communication apparatus maps the fourth bit stream to the second symbol stream with reference to Table 4.

For example, the second mapping rule may be represented as the following Table 7:

TABLE 7

| Bits | Second symbol |
|---|---|
| 0000 | 1 + 1j |
| 0001 | 1 + 3j |
| 0010 | 1 + 5j |
| 0011 | 1 + 7j |
| 0100 | 3 + 1j |
| 0101 | 3 + 3j |
| 0110 | 3 + 5j |
| 0111 | 3 + 7j |
| 1000 | 5 + 1j |
| 1001 | 5 + 3j |
| 1010 | 5 + 5j |
| 1011 | 5 + 7j |
| 1100 | 7 + 1j |
| 1101 | 7 + 3j |
| 1110 | 7 + 5j |
| 1111 | 7 + 7j |

The second communication apparatus may map the fourth bit stream to the second symbol stream with reference to the foregoing Table 7.

For example, the second mapping rule may be represented as the following Table 8:

TABLE 8

| Bits | Second symbol |
|---|---|
| 0000 | 1 + 7j |
| 0001 | 1 + 5j |
| 0010 | 1 + 1j |
| 0011 | 1 + 3j |
| 0100 | 3 + 7j |
| 0101 | 3 + 5j |
| 0110 | 3 + 1j |
| 0111 | 3 + 3j |
| 1000 | 7 + 7j |
| 1001 | 7 + 5j |
| 1010 | 7 + 1j |
| 1011 | 7 + 3j |
| 1100 | 5 + 7j |
| 1101 | 5 + 5j |
| 1110 | 5 + 1j |
| 1111 | 5 + 3j |

The second communication apparatus may map the fourth bit stream to the second symbol stream with reference to the foregoing Table 8.

For example, as shown in FIG. 7, a second mapping module maps the fourth bit stream to the second symbol stream according to the second mapping rule.

817: The second communication apparatus parses the second symbol stream based on the symbol type quantity, the probability distribution corresponding to each symbol type, and the bit quantity corresponding to each second symbol, to obtain a third original bit stream.

For example, as shown in FIG. 7, the second communication apparatus inputs the second symbol stream, the symbol type quantity, the bit quantity corresponding to each second symbol, and the probability distribution corresponding to each symbol type into a de-CCDM, and the de-CCDM outputs a sixth bit stream.

Optionally, the embodiment shown in FIG. 8A and FIG. 8B further includes step 817*a*, and step 817*a* may be performed before step 817.

817*a*: The second communication apparatus de-interleaves and separates, according to a first de-interleaving and separation rule, a plurality of second symbols included in the second symbol stream, to obtain a de-interleaved second symbol stream.

The first de-interleaving and separation rule corresponds to the first interleaving and separation rule in step 202*d* in the embodiment shown in FIG. 2. For example, the first interleaving and separation rule includes that the first communication apparatus separately interpolates the first ⅓ of the first symbols in the first symbol stream into the remaining ⅔ of the first symbols. In this case, the first de-interleaving and separation rule includes that the second communication apparatus selects ⅓ of the second symbols, and places the ⅓ of the second symbols before the remaining second symbols.

Based on step 817*a*, optionally, step 817 specifically includes:

The second communication apparatus parses the de-interleaved second symbol stream based on the symbol type quantity, the probability distribution corresponding to each symbol type, and the bit quantity corresponding to each second symbol, to obtain the third original bit stream.

In the embodiment shown in FIG. 8A and FIG. 8B, the first communication apparatus generates the probability distributions of the constellation points in the target probabilistic shaping constellation diagram based on the Maxwell-Boltzmann distribution parameter and the phase noise parameter, and then modulates the first original bit stream and the second original bit stream based on the probability distributions of the constellation points in the target probabilistic shaping constellation diagram. This helps improve a capability of resisting phase noise, and ensures a shaping gain obtained by using a probabilistic constellation shaping technology under impact of the phase noise. For example, in a high-frequency scenario, the first communication apparatus can ensure, by performing the technical solutions of this application, a shaping gain brought by using probabilistic constellation shaping modulation in the high-frequency scenario. The first communication apparatus modulates the first original bit stream and the second original bit stream into the first symbol stream by using the modulation method provided in this application, and then generates the first signal based on the first symbol stream. The first communication apparatus sends the first signal to the second communication apparatus. Correspondingly, the second communication apparatus receives the second signal from the first communication apparatus. The second communication apparatus parses the second signal to obtain the second QAM symbol stream, and demodulates the second QAM symbol stream into the fifth bit stream and the sixth bit stream by using the demodulation method provided in this application. It can be learned from the related descriptions in FIG. 8A and FIG. 8B that the first communication apparatus needs a CCDM to implement a modulation process, and the second communication apparatus needs a de-CCDM to implement a demodulation process. This reduces system complexity. In addition, an I channel and a Q channel in the target probabilistic shaping constellation diagram may have a same probability distribution, or may have different probability distributions, to adapt to probability distributions of different symmetry, thereby improving applicability of the solution.

In this application, optionally, in step 805 in the embodiment shown in FIG. 8A and FIG. 8B, the first bit stream and the second original bit stream are located in a first code block, and a length of the first code block is greater than a code block length supported by the first communication apparatus. The first bit stream includes a plurality of first bits, and the second original bit stream includes a plurality of second bits.

For this case, step 805 specifically includes step 8005*a* to step 8005*d*.

Step 8005*a*: The first communication apparatus determines first TB CRC bits based on the first bit stream and the second original bit stream.

Figure 9:
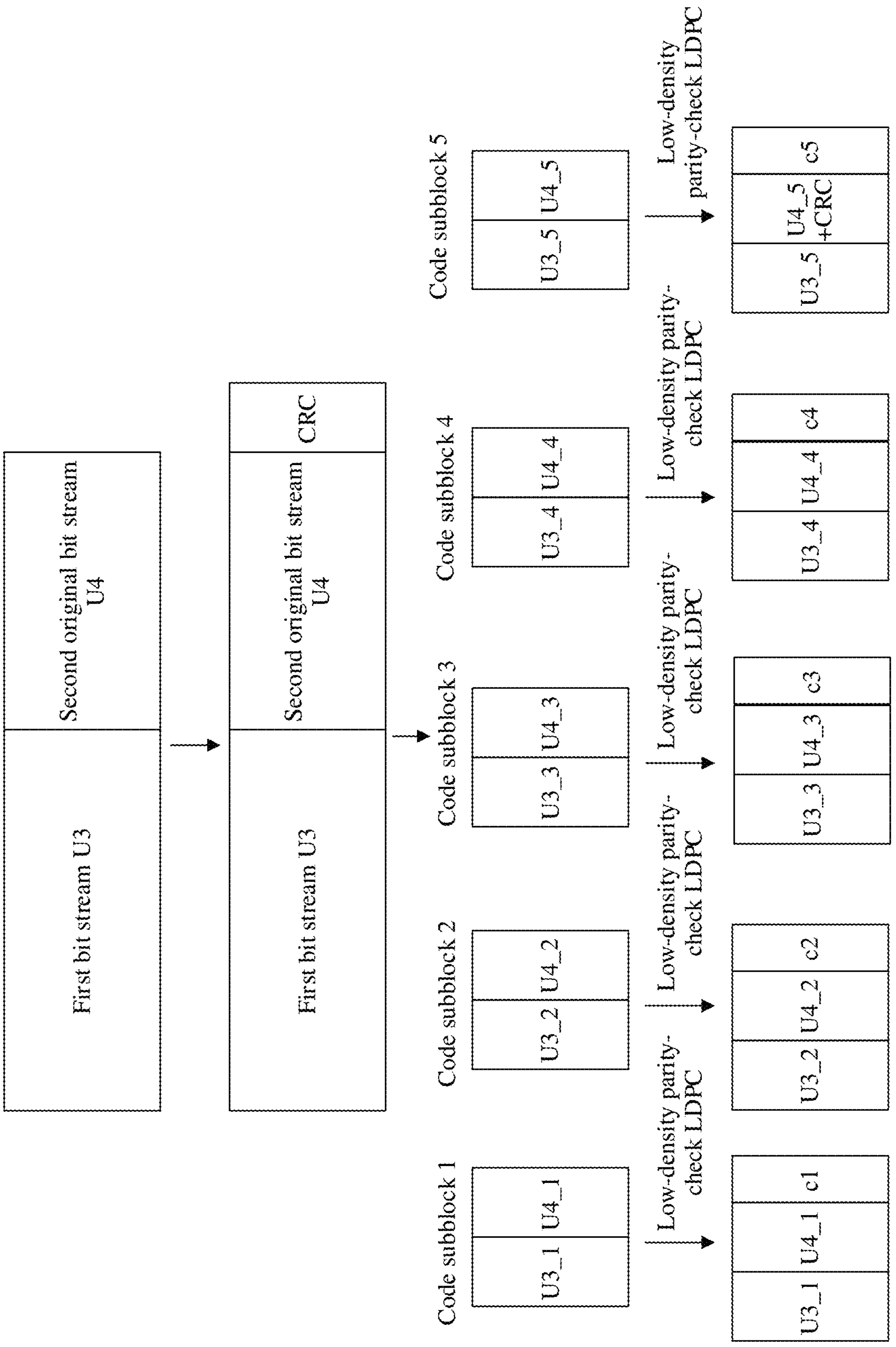
FIG. 9 is a diagram of a low-density parity-check (LDPC) coding process according to an embodiment of this application.

For example, as shown in FIG. 9, the first communication apparatus determines required first TB CRC bits based on a first bit stream U3 and a second original bit stream U4.

Step 8005*b*: The first communication apparatus determines the first code block as M code subblocks.

Each of the M code subblocks includes a part of the plurality of first bits and a part of the plurality of second bits, and different code subblocks include different first bits and different second bits.

M is equal to a rounded-up ratio of the length of the first code block to the code block length supported by the first communication apparatus, and M is an integer greater than or equal to 2.

Optionally, the first bit stream includes M portions of first bits, and the M portions of first bits are determined according to a bit sequence of the first bit stream. The second original bit stream includes M portions of second bits, and the M portions of second bits are determined according to a bit sequence of the second original bit stream. The M portions of first bits one-to-one match the M portions of second bits. Each of the M code subblocks includes one portion of first bit and one first portion of second bit, and the first bit included in each code subblock matches the second bit included in the code subblock.

Optionally, that the first communication apparatus determines the first code block as M code subblocks includes:

The first communication apparatus splits the first bit stream into the M portions of first bits according to the bit sequence of the first bit stream; the first communication apparatus splits the second original bit stream into the M portions of second bits according to a preset sequence; and the first communication apparatus one-to-one matches the M portions of first bits with the M portions of second bits, to obtain the M code subblocks, where each of the M code subblocks includes one portion of first bit and one portion of second bit.

For example, as shown in FIG. 9, the first communication apparatus splits the first bit stream U3 into U3_1, U3_2, U3_3, U3_4, and U3_5 according to a bit sequence of the first bit stream U3. The first communication apparatus splits the second original bit stream U4 into U4_1, U4_2, U4_3, U4_4, and U4_5 according to a bit sequence of the second original bit stream. Then, the first communication apparatus combines U3_1 and U4_1 into a code subblock 1, combines U3_2 and U4_2 into a code subblock 2, combines U3_3 and U4_3 into a code subblock 3, combines U3_4 and U4_4 into a code subblock 4, and combines U3_5 and U4_5 into a code subblock 5.

Step 8005*c*: The first communication apparatus separately encodes the M code subblocks to obtain CB CRC bits corresponding to the M code subblocks.

For example, as shown in FIG. 9, the first communication apparatus separately inputs the M code subblocks into the LDPC encoder, and the LDPC encoder outputs a CB CRC bit corresponding to each code subblock. Specifically, as shown in FIG. 9, the LDPC encoder outputs c1 corresponding to the code subblock 1, c2 corresponding to the code subblock 2, c3 corresponding to the code subblock 3, c4 corresponding to the code subblock 4, and c5 corresponding to the code subblock 5.

Step 8005*d*: The first communication apparatus determines the first check bit stream based on the CB CRC bits and the first TB CRC bits that correspond to the M code subblocks.

The first check bit stream includes check bits corresponding to the M code subblocks. Check bits corresponding to the first M−1 code subblocks in the M code subblocks include CB CRC bits corresponding to the first M−1 code subblocks. A check bit corresponding to an $M^{th}$ code subblock in the M code subblocks includes a CB CRC bit and a first TB CRC bit that correspond to the $M^{th}$ code subblock.

For example, the code subblock 1 includes U3_1 and U4_1, and a check bit corresponding to the code subblock 1 is c1. The code subblock 2 includes U3_2 and U4_2, and a check bit corresponding to the code subblock 2 is c2. The code subblock 3 includes U3_3 and U4_3, and a check bit corresponding to the code subblock 3 is c3. The code subblock 4 includes U3_4 and U4_4, and a check bit corresponding to the code subblock 4 is c4. The code subblock 5 includes U3_5 and U4_5, and a check bit corresponding to the code subblock 5 includes c5 and CRC.

A ratio of a quantity of first bits included in each of the M code subblocks to a first value is equal to a first ratio. The first value is equal to a sum of a quantity of second bits included in each code subblock and a quantity of check bits included in each code subblock. The first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

For example, in a 64-QAM target probabilistic shaping constellation diagram shown in FIG. 6, a quantity of bits required for representing a signal amplitude corresponding to each constellation point is 4 bits, and a quantity of bits required for representing a sign bit of a signal corresponding to each constellation point is 2 bits. Therefore, it can be learned that the first ratio is equal to 2. As shown in FIG. 9, a first bit included in the code subblock 1 is U3_1, a second bit included in the code subblock 1 is U4_1, and the check bit corresponding to the code subblock 1 is c1. Therefore, it can be learned that U3_1/(U4_1+c1)=2. A first bit included in the code subblock 2 is U3_2, a second bit included in the code subblock 2 is U4_2, and the check bit corresponding to the code subblock 2 is c2. Therefore, it can be learned that U3_2/(U4_2+c2)=2. A first bit included in the code subblock 3 is U3_3, a second bit included in the code subblock 3 is U4_3, and the check bit corresponding to the code subblock 3 is c3. Therefore, it can be learned that U3_3/(U4_3+c3)=2. A first bit included in the code subblock 4 is U3_4, a second bit included in the code subblock 4 is U4_4, and the check bit corresponding to the code subblock 4 is c4. Therefore, it can be learned that U3_4/(U4_4+c4)=2. A second bit included in the code subblock 5 is U3_5, a second bit included in the code subblock 5 is U4_5, and the check bit corresponding to the code subblock 5 is c5 and the CRC. Therefore, it can be learned that U3_5/(U4_5+c5+CRC)=2.

Correspondingly, optionally, in step 814 in the embodiment shown in FIG. 8A and FIG. 8B, the system bit stream includes a plurality of third bits and a plurality of fourth bits, the system bit stream is located in a second code block, and a length of the second code block is greater than a code block length supported by the second communication apparatus.

Based on this case, the embodiment shown in FIG. 8A and FIG. 8B further includes step 813*a* and step 813*b*. Step 813*a* and step 813*b* may be performed after step 813 and before step 814.

813*a*: The second communication apparatus determines the second code block as M code subblocks.

Each of the M code subblocks includes a part of the third bits and a part of the fourth bits, and different code subblocks include different third bits and different fourth bits.

The third bits and the fourth bits included in each of the M code subblocks are determined according to a bit sequence of the system bit stream.

Specifically, the second communication apparatus splits the system bit stream according to the bit sequence of the system bit stream, to obtain the M code subblocks, where each code subblock includes the part of third bits and the part of fourth bits.

Step 813*a* is similar to step 8005*b*. For details, refer to the foregoing descriptions.

813*b*: The second communication apparatus determines the second check bit stream as M portions of check bits.

The M portions of check bits are determined according to a bit sequence of the second check bit stream. The M portions of check bits one-to-one correspond to the M code subblocks. A check bit corresponding to an $M^{th}$ code subblock in the M code subblocks includes a first TB CRC bit.

Specifically, the second communication apparatus splits the second check bit stream into the M portions of check bits according to the bit sequence of the second check bit stream.

M is equal to a rounded-up ratio of the length of the second code block to the code block length supported by the second communication apparatus.

A ratio of a quantity of third bits in each of the M code subblocks to a second value is equal to a first ratio, and the second value is equal to a sum of a quantity of fourth bits included in each code subblock and a quantity of check bits corresponding to each code subblock. The first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

Based on step 813*a* and step 813*b*, optionally, step 814 specifically includes step 814*a* and step 814*b*.

814*a*: The second communication apparatus decodes each code subblock and a check bit corresponding to each code subblock, to obtain a fifth bit corresponding to each code subblock and a sixth bit corresponding to each code subblock.

The second communication apparatus determines the M code subblocks, where each of the M code subblocks includes the fifth bit and the sixth bit. In other words, the second communication apparatus determines the M code subblocks, and determines, based on check bits respectively corresponding to the M code subblocks and the M code subblocks, the fifth bit corresponding to each of the M code subblocks and the sixth bit corresponding to each of the M code subblocks.

For example, as shown in FIG. 9, if there is no bit error, the second communication apparatus determines that fifth bits corresponding to the obtained M code subblocks are U3_1, U3_2, U3_3, U3_4, and U3_5, and sixth bits corresponding to the M code subblocks are U4_1, U4_2, U4_3, U4_4, and U4_5.

814*b*: The second communication apparatus determines the fifth bits corresponding to all the code subblocks as the fourth bit stream, and determines the sixth bits corresponding to all the code subblocks as a fifth bit stream.

The second communication apparatus determines the fourth bit stream and the fifth bit stream. The fourth bit stream includes the fifth bit corresponding to each code subblock, and the fifth bit stream includes the sixth bit of each code subblock.

Optionally, step 814*b* specifically includes:

The second communication apparatus combines the fifth bits corresponding to the M code subblocks into the fourth bit stream according to a sequence of the M code subblocks; and the second communication apparatus combines the sixth bits corresponding to the M code subblocks into the fifth bit stream according to the sequence of the M code subblocks.

For example, if there is no bit error, the second communication apparatus combines U3_1, U3_2, U3_3, U3_4, and U3_5 according to the sequence of the M code subblocks to obtain the first bit stream U3, and the second communication apparatus combines U4_1, U4_2, U4_3, U4_4, and U4_5 according to the sequence of the M code subblocks to obtain the second original bit stream U4.

It can be learned that the first communication apparatus segments the first code block, so that each of the code subblocks obtained through segmentation includes bit information required for forming a QAM symbol, and each code subblock may independently form the QAM symbol. Therefore, performance of a probabilistic constellation shaping system in a multi-code-block scenario is ensured, and it is ensured that the second communication apparatus can correctly perform demodulation.

In this application, optionally, the first communication apparatus is a network device, and the second communication apparatus is a terminal device. With reference to embodiments shown in FIG. 10 and FIG. 11, the following describes a process in which the first communication apparatus determines the probability distributions and the signal amplitudes that correspond to the constellation points in the target probabilistic shaping constellation diagram, and a process in which the first communication apparatus indicates, to the second communication apparatus, some parameters used for the probabilistic constellation shaping modulation.

Figure 10:
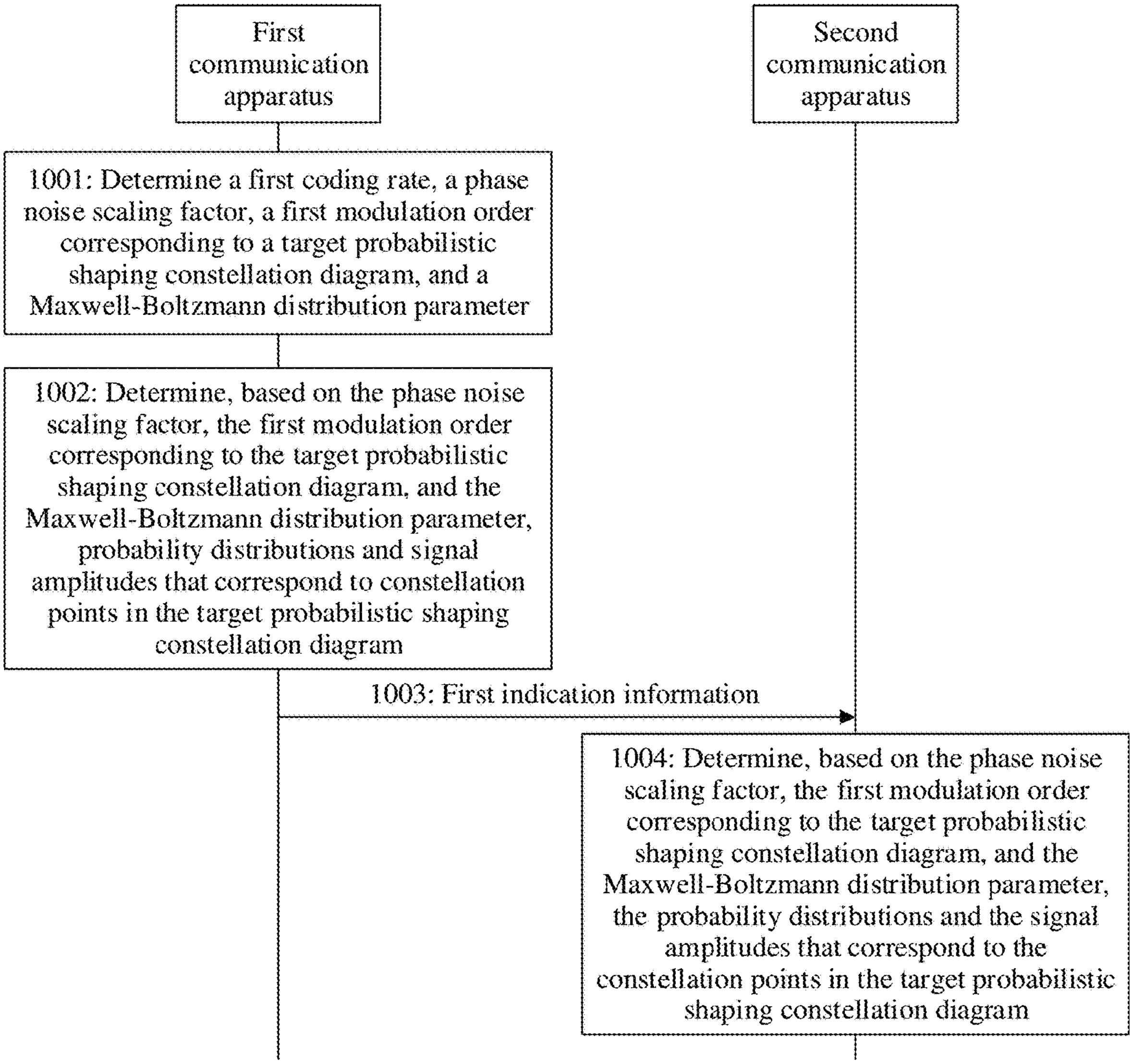
FIG. 10 is a diagram of another embodiment of a modulation method and a demodulation method according to an embodiment of this application.

F FIG. 10 is a diagram of another embodiment of a modulation method and a demodulation method according to an embodiment of this application. Refer to FIG. 10. The method includes the following steps.

1001: A first communication apparatus determines a first coding rate, a phase noise scaling factor, a first modulation order corresponding to a target probabilistic shaping constellation diagram, and a Maxwell-Boltzmann distribution parameter.

The first coding rate is a coding rate used when the first communication apparatus uses probabilistic constellation shaping modulation. For example, as shown in FIG. 5, the LDPC encoder performs encoding based on the first coding rate.

The first modulation order corresponding to the target probabilistic shaping constellation diagram is used to determine a quantity of bits required for representing constellation points in the target probabilistic shaping constellation diagram and signal amplitudes of the constellation points. For example, the target probabilistic shaping constellation diagram is 64-QAM, in other words, the first modulation order is 6. Therefore, it can be learned that in the target probabilistic shaping constellation diagram, 6 bits are required for representing each constellation point, and the signal amplitudes of the constellation points include 1, 3, 5, or 7.

The phase noise scaling factor and the Maxwell-Boltzmann distribution parameter are used to determine probability distributions of the constellation points in the target probabilistic shaping constellation diagram. For example, the first communication apparatus may obtain, through calculation, a probability distribution of each constellation point in the target probabilistic shaping constellation diagram according to the foregoing formula (15) and based on the phase noise scaling factor and the Maxwell-Boltzmann distribution parameter.

The following describes some possible determining manners of the first communication apparatus in step 1001.

The following describes a determining manner 1 with reference to step a11 to step a13.

Step a11: The first communication apparatus obtains a channel state parameter.

The channel state parameter includes at least one of the following: a CQI, a BLER, and a throughput that are measured by the second communication apparatus.

For example, the first communication apparatus is a network device, and the second communication apparatus is a terminal device. The first communication apparatus receives the channel state parameter from the second communication apparatus.

Step a12: The first communication apparatus determines supported maximum spectral efficiency based on the channel state parameter.

Step a13: The first communication apparatus determines, based on the maximum spectral efficiency SE, the first coding rate, the phase noise scaling factor, the first modulation order corresponding to the target probabilistic shaping constellation diagram, and the Maxwell-Boltzmann distribution parameter.

Specifically, spectral efficiency under uniform modulation may be expressed as:

$$SE_{uniform} = M_{uniform} Rc_{uniform} = f(M_{uniform}, Rc_{uniform}), \quad (16)$$

where $M_{uniform}$ is a second modulation order for the uniform modulation, and $Rc_{uniform}$ is a second coding rate used for the uniform modulation. It can be learned from the foregoing expression of $SE_{uniform}$ that, in the uniform modulation, $SE_{uniform}$ is changed by adjusting $M_{uniform}$ and $Rc_{uniform}$.

Correspondingly, spectral efficiency based on the probabilistic constellation shaping modulation may be expressed as:

$$SE_{PCS\_PN} = H_{PCS\_PN} R_{c_{PCS\_PN}} = f'(v, \alpha, M_{PCS\_PN}, R_{c_{PCS\_PN}}), \quad (17)$$

where $SE_{PSC\_PN}$ is the spectral efficiency supported by the probabilistic constellation shaping modulation, $H_{PSC\_PN}$ is a source entropy of the target probabilistic shaping constellation diagram, α is the phase noise scaling factor, v is the Maxwell-Boltzmann distribution parameter, $M_{PSC\_PN}$ is the first modulation order corresponding to the target probabilistic shaping constellation diagram, and $Rc_{PSC\_PN}$ is the first coding rate used for the probabilistic constellation shaping modulation.

It can be learned from the foregoing formula (17) that the first communication apparatus may adjust $SE_{PSC\_PN}$ by adjusting v, α, $M_{PCS\_PN}$ $M_{PSC\_PN}$, and $R_{cPCS\_PN}$ $Rc_{PSC\_PN}$. In step a12, the first communication apparatus may determine the maximum spectral efficiency. In this case, the first communication apparatus may obtain, through adjustment based on the maximum spectral efficiency, the first coding rate $R_{cPCS\_PN}$ $R_{cPSC\_PN}$, the phase noise scaling factor α, the first modulation order $M_{PCS\_PN}$ $M_{PSC\_PN}$ corresponding to the target probabilistic shaping constellation diagram, and the Maxwell-Boltzmann distribution parameter V.

It can be learned that the first communication apparatus determines the supported maximum spectral efficiency based on the channel state parameter, to adjust the Maxwell-Boltzmann distribution parameter v and the phase noise scaling factor α when the first coding rate $R_{cPCS\_PN}$ $R_{cPSC\_PN}$ and the first modulation order $M_{PCS\_PN}$ $M_{PSC\_PN}$ are changed. This more flexibly adjusts spectral efficiency.

It can be learned from Table 2 that an MCS corresponds to a coding rate and a modulation order, to implement different spectral efficiency adjustment. When system performance is good, the first communication apparatus may use an MCS corresponding to high spectral efficiency. When system performance is poor, the first communication apparatus may use an MCS corresponding to low spectral efficiency. Because a QAM modulation order defined in a communication protocol is an even integer order of 2, 4, 6, or 8, and a coding rate also has some specific configurations, different spectral efficiency formed by different combinations is limited. In other words, a granularity of spectral efficiency corresponding to the MCS in Table 2 is limited. For example, when spectral efficiency supported by a channel condition is between spectral efficiency corresponding to an MCS 22 and spectral efficiency corresponding to an MCS 23, the first communication apparatus can select only a configuration of the MCS 22 to ensure a block error rate requirement. Specifically, in this application, the Maxwell-Boltzmann distribution parameter and the phase noise scaling factor may be used as parameters in a third dimension and a fourth dimension of the MCS in the foregoing Table 4, to achieve spectral efficiency at a finer granularity.

For example, when the maximum spectral efficiency that can be supported is 0.25, maximum spectral efficiency that can be achieved based on a configuration in Table 2 is 0.2344. However, if the parameters in the two dimensions, namely, the Maxwell-Boltzmann distribution parameter and the phase noise scaling factor, are added on the basis of Table 2, achieved spectral efficiency is greater than 0.2344, that is, a range of spectral efficiency that can be achieved is wider.

The following describes a determining manner 2 with reference to step a21 to step a23.

Step a21: The first communication apparatus obtains a channel state parameter.

Step a21 is similar to step a11. For details, refer to the foregoing related descriptions.

Step a22: The first communication apparatus determines supported maximum spectral efficiency SE based on the channel state parameter.

Step a23: The first communication apparatus determines, based on the maximum spectral efficiency SE, the phase noise scaling factor and the Maxwell-Boltzmann distribution parameter corresponding to the target probabilistic shaping constellation diagram.

The first coding rate used by the first communication apparatus and the first modulation order corresponding to the target probabilistic shaping constellation diagram remain unchanged. To be specific, when the first coding rate and the first modulation order remain unchanged, different spectral efficiency is implemented by changing the phase noise scaling factor and the Maxwell-Boltzmann distribution parameter corresponding to the target probabilistic shaping constellation diagram. The first communication apparatus changes $H_{PCS\_PN}$ in the foregoing formula (17) by adjusting values of the phase noise scaling factor and the Maxwell-Boltzmann distribution parameter corresponding to the target probabilistic shaping constellation diagram, to change $SE_{PCS\_PN}$. In this case, if the first modulation order $M_{PCS\_PN}$ remains unchanged, a modulation order of the probabilistic constellation shaping modulation is fixed, that is, only one type of probabilistic shaping constellation diagram, for example, 64-QAM, is required. If the first coding rate $$R_{c_{PCS\_PN}}$$

remains unchanged, the LDPC encoder has a fixed coding rate, and does not need to adapt to a plurality of coding rates. This reduces complexity caused by coding rate matching.

It can be learned that the first communication apparatus determines the supported maximum spectral efficiency based on the channel state parameter, to adjust the Maxwell-Boltzmann distribution parameter and the phase noise scaling factor when the first coding rate $$R_{c_{PCS\_PN}}$$

and the first modulation order $M_{PCS\_PN}$ remain unchanged. This helps flexibly adjust spectral efficiency, and achieve spectral efficiency at a finer granularity.

The following describes a determining manner 3 with reference to step a31 to step a33.

Step a31: The first communication apparatus obtains a channel state parameter.

Step a31 is similar to step a12. For details, refer to the foregoing related descriptions.

Step a32: The first communication apparatus determines, based on the channel state parameter and a first correspondence, the first coding rate, the phase noise scaling factor, the first modulation order corresponding to the target probabilistic shaping constellation diagram, and the Maxwell-Boltzmann distribution parameter.

The first correspondence is a correspondence between the channel state parameter and modulation and coding parameters. The modulation and coding parameters include the coding rate, the phase noise scaling factor, the modulation order corresponding to the probabilistic shaping constellation diagram, and the Maxwell-Boltzmann distribution parameter.

For example, the first correspondence may be represented in the following Table 9. The following Table 9 uses an example in which the channel state parameter is a CQI is used for description.

TABLE 9

| Channel state parameter | Modulation and coding parameter |
|---|---|
| CQI 1 | Modulation and coding parameter 1 |
| CQI 2 | Modulation and coding parameter 2 |
| CQI 3 | Modulation and coding parameter 3 |
| CQI 4 | Modulation and coding parameter 4 |

The first communication apparatus determines, with reference to the foregoing Table 9, the modulation and coding parameters corresponding to the channel state parameter. The modulation and coding parameters corresponding to the channel state parameter include the first coding rate, the phase noise scaling factor, the first modulation order corresponding to the target probabilistic shaping constellation diagram, and the Maxwell-Boltzmann distribution parameter.

The following describes a determining manner 4 with reference to step a41 to step a43.

Step a41: The first communication apparatus sets a second modulation order to the first modulation order corresponding to the target probabilistic shaping constellation diagram.

The second modulation order is a modulation order used when the first communication apparatus uses uniform modulation.

Specifically, a net transmission rate under the uniform modulation may be expressed as:

$$NTR_{uniform} = H_{uniform}R_{c_{uniform}} = M_{uniform}R_{c_{uniform}} = SE_{uniform}, \tag{18}$$

where $M_{uniform}$ is the second modulation order for the uniform modulation, $R_{c_{uniform}}$ is a second coding rate used for the uniform modulation, $SE_{uniform}$ is spectral efficiency for the uniform modulation, and $H_{uniform}$ is a source entropy for the uniform modulation.

With reference to the foregoing formula (14), it can be learned that a net transmission rate of the probabilistic constellation shaping modulation may be expressed as:

$$NTR_{PCS\_PN} = H_{PCS\_PN} - (1 - R_{c_{PCS\_PN}})M_{PCS\_PN}, \tag{19}$$

where $H_{PCS\_PN}$ is a source entropy of the target probabilistic shaping constellation diagram, $M_{PCS\_PN}$ is the first modulation order corresponding to the target probabilistic shaping constellation diagram, and $$R_{c_{PCS\_PN}}$$

is the first coding rate used for the probabilistic constellation shaping modulation.

Step a42: The first communication apparatus sets a first net transmission rate to a net transmission rate corresponding to a case in which the first communication apparatus uses the probabilistic constellation shaping modulation.

When the probabilistic constellation shaping modulation is used, to perform fair comparison with the uniform modulation, a net transmission rate needs to be used for measurement. The first communication apparatus constructs a connection between the probabilistic constellation shaping modulation and the uniform modulation, that is, the two modulation schemes correspond to a same net transmission rate.

Step a43: The first communication apparatus obtains, through calculation based on the first net transmission rate and the second modulation order, the first coding rate, the phase noise scaling factor, and the Maxwell-Boltzmann distribution parameter corresponding to the target probabilistic shaping constellation diagram.

Specifically, the following formula (20) and formula (21) may be obtained with reference to step a41 and step a42:

$$H_{PCS\_PN}-\left(1-R_{c_{PCS\_PN}}\right)M_{PCS\_PN}=M_{uniform}R_{c_{uniform}},\text{ and} \tag{20}$$

$$M_{PCS\_PN}=M_{uniform} \tag{21}$$

The first communication apparatus may obtain the first coding rate $$R_{c_{PCS\_PN}}$$

and the source entropy $H_{PCS\_PN}$ of the target probabilistic shaping constellation diagram through calculation according to the foregoing formula (20) and formula (21), and then obtain the Maxwell-Boltzmann distribution parameter v and the phase noise scaling factor α through calculation based on $H_{PCS\_PN}$. Alternatively, the first communication apparatus obtains the first coding rate $$R_{c_{PCS\_PN}},$$

the Maxwell-Boltzmann distribution parameter v, and the phase noise scaling factor α through calculation according to the foregoing formula (20) and formula (21).

A process of the foregoing determining manner 4 may also be referred to as an equal-order coding rate increase scheme. When the probabilistic constellation shaping modulation and the uniform modulation have the same net transmission rate, the first communication apparatus may implement a lower signal-to-noise ratio by adjusting the first coding rate, or achieve higher spectral efficiency under a same signal-to-noise ratio requirement. This increases a shaping gain brought by the probabilistic constellation shaping modulation, and improves system performance.

The following describes a determining manner 5 with reference to step a51 to step a53.

Step a51: The first communication apparatus sets a second coding rate to the first coding rate used when the first communication apparatus uses the probabilistic constellation shaping modulation.

The second coding rate is a coding rate used when the first communication apparatus uses uniform modulation.

Step a52: The first communication apparatus sets the first modulation order corresponding to the target probabilistic shaping constellation diagram to be equal to a second modulation order plus a first preset value.

The second modulation order is a modulation order used when the first communication apparatus uses the uniform modulation. The first preset value may be 2, 4, or the like. For example, the second modulation order $M_{PCS\_PN}=M_{uniform}+2$.

Step a53: The first communication apparatus sets a first net transmission rate to a net transmission rate corresponding to a case in which the first communication apparatus uses the probabilistic constellation shaping modulation.

When the probabilistic constellation shaping modulation is used, to perform fair comparison with the uniform modulation, a net transmission rate needs to be used for measurement. The first communication apparatus constructs a connection between the probabilistic constellation shaping modulation and the uniform modulation, that is, the two modulation schemes correspond to a same net transmission rate.

Step a54: The first communication apparatus determines, based on the first net transmission rate and the first modulation order, the phase noise scaling factor and the Maxwell-Boltzmann distribution parameter corresponding to the target probabilistic shaping constellation diagram.

The following formula (22) to formula (24) may be obtained with reference to step a51 to step a53:

$$H_{PCS\_PN}-\left(1-R_{c_{PCS\_PN}}\right)M_{PCS\_PN}=M_{uniform}R_{c_{uniform}}; \tag{22}$$

$$R_{c_{uniform}}=R_{c_{PCS\_PN}};\text{ and} \tag{23}$$

$$M_{PCS\_PN}=M_{uniform} \tag{24}$$

The first communication apparatus may obtain, through calculation, the first coding rate $$R_{c_{PCS\_PN}},$$

the Maxwell-Boltzmann distribution parameter v, and the phase noise scaling factor α according to the foregoing formula (22) to formula (24). Alternatively, the first communication apparatus may obtain the first coding rate $$R_{c_{PCS\_PN}}$$

and a source entropy $H_{PCS\_PN}$ of the target probabilistic shaping constellation diagram through calculation according to the foregoing formula (20) and formula (21), and then obtain the Maxwell-Boltzmann distribution parameter v and the phase noise scaling factor α through calculation based on $H_{PCS\_PN}$.

The foregoing determining manner 5 may also be referred to as an order-increase equal-entropy scheme. When the probabilistic constellation shaping modulation and the uniform modulation have the same net transmission rate, a lower signal-to-noise ratio threshold may be implemented by increasing the first modulation order corresponding to the target probabilistic shaping constellation diagram, or higher spectral efficiency is achieved under a same signal-to-noise ratio requirement. This increases a shaping gain brought by the probabilistic constellation shaping modulation, and improves system performance.

1002: The first communication apparatus determines, based on the first modulation order corresponding to the target probabilistic shaping constellation diagram and the Maxwell-Boltzmann distribution parameter, the probability distributions and the signal amplitudes that correspond to the constellation points in the target probabilistic shaping constellation diagram.

The first communication apparatus determines, based on the first modulation order, the quantity of bits required for representing the constellation points in the target probabilistic shaping constellation diagram and the signal amplitudes of the constellation points. The first communication apparatus determines the probability distributions of the constellation points in the target probabilistic shaping constellation diagram based on the Maxwell-Boltzmann distribution parameter and the phase noise scaling factor.

It should be noted that the first coding rate in step 1001 is used by the first communication apparatus to generate a first symbol stream. Specifically, step 803 in the embodiment shown in FIG. 8A and FIG. 8B specifically includes: The first communication apparatus generates the first symbol stream based on the first coding rate, a symbol type quantity, a probability distribution corresponding to a first symbol of each symbol type, a bit quantity corresponding to each first symbol, and a first original bit stream. Specifically, the first communication apparatus determines, based on the first coding rate, the symbol type quantity, the probability distribution corresponding to the first symbol of each symbol type, the bit quantity corresponding to each first symbol, and the first original bit stream, a quantity of first symbols included in the first symbol stream, and a quantity of symbols of each symbol type.

For example, as shown in FIG. 5, the first original bit stream is a bit stream Sb1, and a second original bit stream is a bit stream U4. A sum of a quantity of bits included in the bit stream Sb1 and a quantity of bits included in the bit stream U4 is K, and a sum of the quantity of bits included in the bit stream Sb1, the quantity of bits included in the bit stream U4, and a quantity of bits included in a first check bit stream is W. K=41412, W=48576, $M_{PCS\_PN}$=64, and a=$\log_2 2(M_{PCS})/2-1$. As shown in FIG. 5, the quantity of bits of the bit stream Sb1 is Sb1, and the quantity of bits of the bit stream U4 is U4. The quantity V1 of first symbols included in the first symbol stream=W−K+U4, the quantity Sb1 of bits of the bit stream Sb1=a*V1, and the quantity U4 of bits of the bit stream U4=K−Sb1. It can be learned that the first communication apparatus may obtain V1 through calculation.

1003: The first communication apparatus sends first indication information to the second communication apparatus. Correspondingly, the second communication apparatus receives the first indication information from the first communication apparatus.

In a possible implementation, the first indication information indicates a first MCS, the phase noise scaling factor, and the Maxwell-Boltzmann distribution parameter corresponding to the target probabilistic shaping constellation diagram, where the first MCS indicates the first coding rate and the first modulation order.

In this implementation, the first communication apparatus indicates the first MCS in an existing manner, and the first MCS indicates the first coding rate and the first modulation order. Specifically, a representation of the first MCS may be shown in the foregoing Table 2. In addition to indicating the first MCS, the first communication apparatus further indicates the phase noise scaling factor and the Maxwell-Boltzmann distribution parameter corresponding to the target probabilistic shaping constellation diagram. The first communication apparatus indicates the first coding rate, the phase noise scaling factor, the first modulation order, and the Maxwell-Boltzmann distribution parameter, to enable the second communication apparatus to perform demodulation, decoding, and the like based on these parameters.

In another possible implementation, the first indication information indicates the first coding rate, the phase noise scaling factor, the first modulation order, and the Maxwell-Boltzmann distribution parameter.

In this implementation, the first communication apparatus directly indicates, to the second communication apparatus, some parameters used for the probabilistic constellation shaping modulation, to enable the second communication apparatus to perform demodulation, decoding, and the like based on these parameters.

1004: The second communication apparatus determines, based on the phase noise scaling factor, the first modulation order corresponding to the target probabilistic shaping constellation diagram, and the Maxwell-Boltzmann distribution parameter, the probability distributions and the signal amplitudes that correspond to the constellation points in the target probabilistic shaping constellation diagram.

Step 1004 is similar to step 1002. For details, refer to the related descriptions of step 1002.

It should be noted that the first coding rate in step 817 is used by the second communication apparatus to determine a third original bit stream. Specifically, step 817 in the embodiment shown in FIG. 8A and FIG. 8B specifically includes:

The second communication apparatus parses a second symbol stream based on the first coding rate, the symbol type quantity, a bit quantity corresponding to each second symbol, and a probability distribution corresponding to each symbol type, to obtain the third original bit stream.

It can be learned from the foregoing related example that the second communication apparatus may obtain, through inverse deduction based on the first coding rate and a quantity of second symbols included in the second symbol stream, a quantity of bits included in the third original bit stream.

In this embodiment of this application, the first communication apparatus determines the first coding rate, the phase noise scaling factor, the first modulation order corresponding to the target probabilistic shaping constellation diagram, and the Maxwell-Boltzmann distribution parameter. Then, the first communication apparatus determines, based on the first coding rate, the phase noise scaling factor, the first modulation order corresponding to the target probabilistic shaping constellation diagram, and the Maxwell-Boltzmann distribution parameter, the probability distributions and the signal amplitudes that correspond to the constellation points in the target probabilistic shaping constellation diagram. The first communication apparatus sends the first indication information to the second communication apparatus, to indicate the first coding rate, the phase noise scaling factor, the first modulation order corresponding to the target probabilistic shaping constellation diagram, and the Maxwell-Boltzmann distribution parameter, so as to indicate the second communication apparatus to perform demodulation, decoding, and the like based on these parameters.

It should be noted that the embodiment shown in FIG. 10 is a possible implementation. In actual application, alternatively, the second communication apparatus may determine, based on the channel state parameter and the first correspondence, the first coding rate, the phase noise scaling factor, the first modulation order corresponding to the target probabilistic shaping constellation diagram, and the Maxwell-Boltzmann distribution parameter. That is, the first communication apparatus and the second communication apparatus determine the modulation and coding parameters based on the predefined first correspondence, and the first communication apparatus does not need to indicate these parameters to the second communication apparatus.

Figure 11:
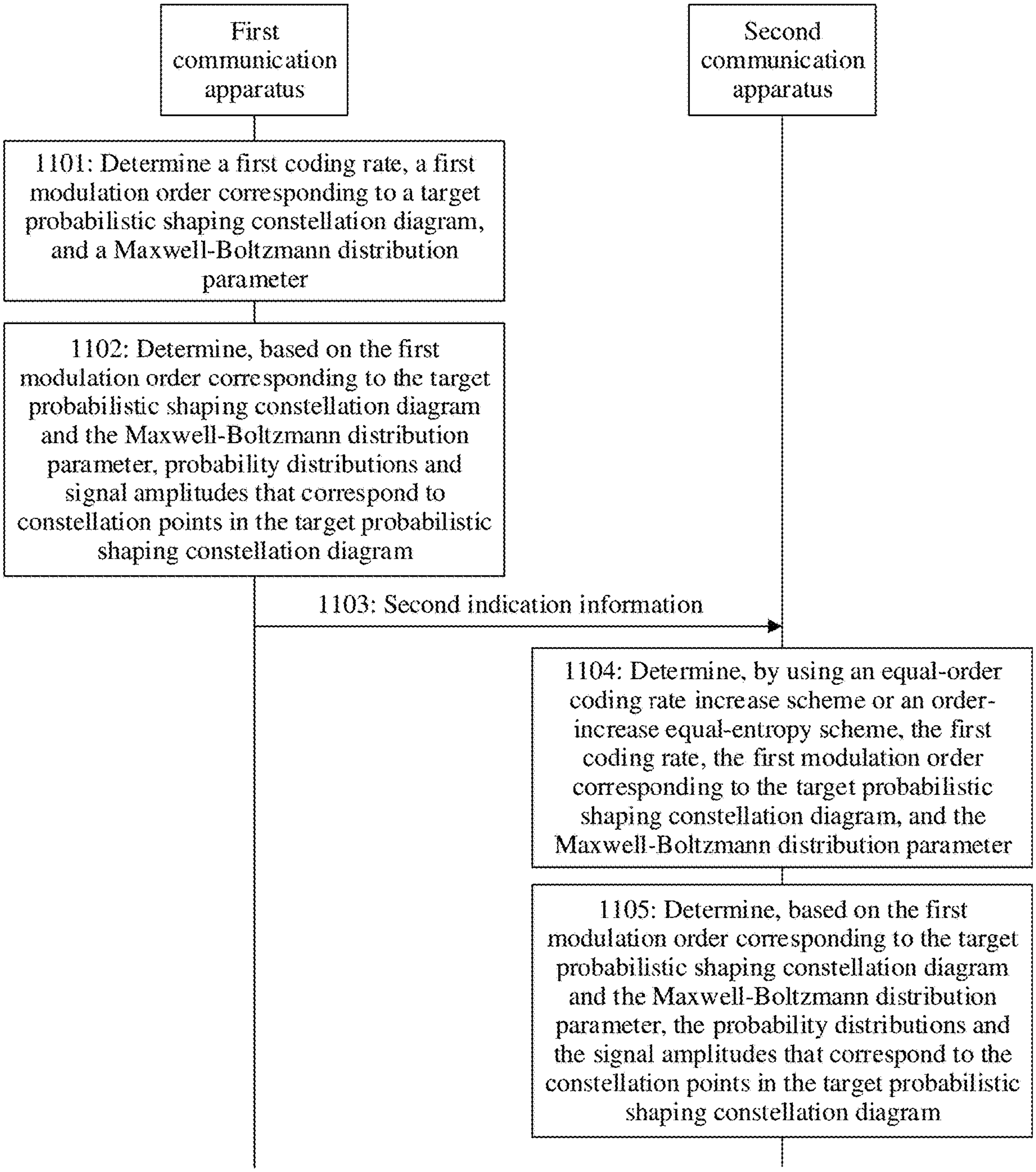
FIG. 11 is a diagram of another embodiment of a modulation method and a demodulation method according to an embodiment of this application.

FIG. 11 is a diagram of another embodiment of a modulation method and a demodulation method according to an embodiment of this application. Refer to FIG. 11. The method includes the following steps.

1101: A first communication apparatus determines a first coding rate, a phase noise scaling factor, a first modulation order corresponding to a target probabilistic shaping constellation diagram, and a Maxwell-Boltzmann distribution parameter.

In step 1101, the first communication apparatus determines the first coding rate, the phase noise scaling factor, the first modulation order corresponding to the target probabilistic shaping constellation diagram, and the Maxwell-Boltzmann distribution parameter in the determining manner 4 or the determining manner 5 shown in step 1001 in the embodiment shown in FIG. 10. In other words, the first communication apparatus determines, by using an equal-order coding rate increase scheme or an order-increase equal-entropy scheme, the first coding rate, the phase noise scaling factor, the first modulation order corresponding to the target probabilistic shaping constellation diagram, and the Maxwell-Boltzmann distribution parameter.

1102: The first communication apparatus determines, based on the phase noise scaling factor, the first modulation order corresponding to the target probabilistic shaping constellation diagram, and the Maxwell-Boltzmann distribution parameter, probability distributions and signal amplitudes that correspond to constellation points in the target probabilistic shaping constellation diagram.

Step 1102 is similar to step 1002 in the embodiment shown in FIG. 10. For details, refer to the related descriptions of step 1002 in the embodiment shown in FIG. 10.

It should be noted that the first coding rate in step 1001 is used by the first communication apparatus to generate a first symbol stream. Specifically, step 803 in the embodiment shown in FIG. 8A and FIG. 8B specifically includes: The first communication apparatus generates the first symbol stream based on the first coding rate, a symbol type quantity, a probability distribution corresponding to a first symbol of each symbol type, a bit quantity corresponding to each first symbol, and a first original bit stream. Specifically, the first communication apparatus determines, based on the first coding rate, the symbol type quantity, the probability distribution corresponding to the first symbol of each symbol type, the bit quantity corresponding to each first symbol, and the first original bit stream, a quantity of first symbols included in the first symbol stream, and a quantity of symbols of each symbol type. For a specific example, refer to the foregoing related descriptions.

1103: The first communication apparatus sends second indication information to a second communication apparatus.

In a possible implementation, the second indication information indicates a second MCS and the order-increase equal-entropy scheme, or indicates a second MCS and the equal-order coding rate increase scheme. The second MCS indicates a second modulation order corresponding to a uniform modulation scheme and a second coding rate corresponding to the uniform modulation scheme.

If the first communication apparatus determines, in step 1101 by using the equal-order coding rate increase scheme, the first coding rate, the first modulation order corresponding to the target probabilistic shaping constellation diagram, and the Maxwell-Boltzmann distribution parameter, the second indication information indicates the second MCS and the equal-order coding rate increase scheme.

If the first communication apparatus determines, in step 1101 by using the order-increase equal-entropy scheme, the first coding rate, the first modulation order corresponding to the target probabilistic shaping constellation diagram, and the Maxwell-Boltzmann distribution parameter, the second indication information indicates the second MCS and the order-increase equal-entropy scheme.

1104: The second communication apparatus determines, by using the equal-order coding rate increase scheme or the order-increase equal-entropy scheme, the first coding rate, the phase noise scaling factor, the first modulation order corresponding to the target probabilistic shaping constellation diagram, and the Maxwell-Boltzmann distribution parameter.

In a possible implementation, if the second indication information indicates the second MCS and the equal-order coding rate increase scheme, the second communication apparatus determines, by using the equal-order coding rate increase scheme, the first coding rate, the phase noise scaling factor, the first modulation order corresponding to the target probabilistic shaping constellation diagram, and the Maxwell-Boltzmann distribution parameter.

A process in which the second communication apparatus determines, by using the equal-order coding rate increase scheme, the first coding rate, the phase noise scaling factor, the first modulation order corresponding to the target probabilistic shaping constellation diagram, and the Maxwell-Boltzmann distribution parameter is similar to a process of step a41 to step a43 in the determining manner 4 in step 1001 in the embodiment shown in FIG. 10. For details, refer to the foregoing related descriptions.

In another possible implementation, if the second indication information indicates the second MCS and the order-increase equal-entropy scheme, the second communication apparatus determines, by using the order-increase equal-entropy scheme, the first coding rate, the phase noise scaling factor, the first modulation order corresponding to the target probabilistic shaping constellation diagram, and the Maxwell-Boltzmann distribution parameter.

A process in which the second communication apparatus determines, by using the equal-order coding rate increase scheme, the first coding rate, the phase noise scaling factor, the first modulation order corresponding to the target probabilistic shaping constellation diagram, and the Maxwell-Boltzmann distribution parameter is similar to a process of step a51 to step a53 in the determining manner 5 in step 1001 in the embodiment shown in FIG. 10. For details, refer to the foregoing related descriptions.

1105: The second communication apparatus determines, based on the phase noise scaling factor, the first modulation order corresponding to the target probabilistic shaping constellation diagram, and the Maxwell-Boltzmann distribution parameter, the probability distributions and the signal amplitudes that correspond to the constellation points in the target probabilistic shaping constellation diagram.

Step 1105 is similar to step 1002. For details, refer to the related descriptions of step 1002.

It should be noted that the first coding rate in step 817 is used by the second communication apparatus to determine a third original bit stream. Specifically, step 817 in the embodiment shown in FIG. 8A and FIG. 8B specifically includes:

The second communication apparatus parses a second symbol stream based on the first coding rate, the symbol type quantity, a bit quantity corresponding to each second symbol, and a probability distribution corresponding to each symbol type, to obtain the third original bit stream.

It can be learned from the foregoing related example that the second communication apparatus may obtain, through inverse deduction based on the first coding rate and a quantity of second symbols included in the second symbol stream, a quantity of bits included in the third original bit stream.

In this embodiment of this application, the first communication apparatus determines the first coding rate, the phase noise scaling factor, the first modulation order corresponding to the target probabilistic shaping constellation diagram, and the Maxwell-Boltzmann distribution parameter. Then, the first communication apparatus determines, based on the phase noise scaling factor, the first modulation order corresponding to the target probabilistic shaping constellation diagram, and the Maxwell-Boltzmann distribution parameter, the probability distributions and the signal amplitudes that correspond to the constellation points in the target probabilistic shaping constellation diagram. The first communication apparatus sends the second indication information to the second communication apparatus, where the second indication information indicates the second MCS and the order-increase equal-entropy scheme, or indicates the second MCS and the equal-order coding rate increase scheme, so that the second communication apparatus determines, based on the second indication information, the probability distributions and the signal amplitudes that correspond to the constellation points in the target probabilistic shaping constellation diagram, and performs demodulation, decoding, and the like based on these parameters.

In this application, optionally, the first communication apparatus is a terminal device, and the second communication apparatus is a network device. The second communication apparatus may determine the first coding rate, the phase noise scaling factor, the first modulation order corresponding to the target probabilistic shaping constellation diagram, and the Maxwell-Boltzmann distribution parameter. For a specific determining manner for the second communication apparatus, refer to related descriptions of step 1001 in the embodiment shown in FIG. 11. Then, the second communication apparatus sends third indication information to the first communication apparatus. The third indication information indicates a first MCS, the phase noise scaling factor, and the Maxwell-Boltzmann distribution parameter corresponding to the target probabilistic shaping constellation diagram, or the third indication information indicates the first coding rate, the phase noise scaling factor, the first modulation order corresponding to the target probabilistic shaping constellation diagram, and the Maxwell-Boltzmann distribution parameter.

Optionally, if the second communication apparatus determines, by using the equal-order coding rate increase scheme, the first coding rate, the phase noise scaling factor, the first modulation order corresponding to the target probabilistic shaping constellation diagram, and the Maxwell-Boltzmann distribution parameter, the second communication apparatus may send fourth indication information to the first communication apparatus, where the fourth indication information indicates the second MCS and the equal-order coding rate increase scheme. The second MCS indicates the second modulation order corresponding to the uniform modulation scheme and the second coding rate corresponding to the uniform modulation scheme. If the second communication apparatus determines, by using the order-increase equal-entropy scheme, the first coding rate, the phase noise scaling factor, the first modulation order corresponding to the target probabilistic shaping constellation diagram, and the Maxwell-Boltzmann distribution parameter, the second communication apparatus may send fourth indication information to the first communication apparatus, where the fourth indication information indicates the second MCS and the order-increase equal-entropy scheme. The second MCS indicates the second modulation order corresponding to the uniform modulation scheme and the second coding rate corresponding to the uniform modulation scheme.

It should be noted that, in the foregoing embodiment, the technical solutions of this application are mainly performed by using the probabilistic constellation shaping modulation and phase-noise-based probabilistic shaping modulation as examples. If the Maxwell-Boltzmann distribution parameter is not equal to 0, and the phase noise scaling factor is equal to 0, the modulation includes the probabilistic constellation shaping modulation. If neither the Maxwell-Boltzmann distribution parameter nor the phase noise scaling factor is equal to 0, the modulation includes phase-noise-based probabilistic constellation shaping modulation. If the first communication apparatus performs modulation by using the uniform modulation, the first communication apparatus may set $M_{PCS\_PN}$ to be equal to $M_{uniform}$, set the phase noise scaling factor to be equal to 0, and enable a value of the Maxwell-Boltzmann distribution parameter to satisfy $H_{PCS\_PN}=M_{uniform}$ where $H_{PCS\_PN}$ is a source entropy of the target probabilistic shaping constellation diagram, and $M_{uniform}$ is the second modulation order corresponding to the uniform modulation.

In other words, in the technical solutions of this application, the first communication apparatus adjusts the Maxwell-Boltzmann distribution parameter and the phase noise scaling factor, to implement compatibility between the uniform modulation and non-uniform modulation. Specifically, possible modulation schemes such as the uniform modulation, the probabilistic constellation shaping modulation, and the phase-noise-based probabilistic constellation shaping modulation may be compatible. This expands an application scenario of this application.

Figure 12:
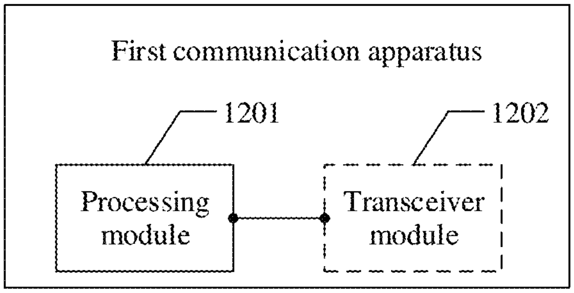
FIG. 12 is a diagram of a structure of a first communication apparatus according to an embodiment of this application.

The following describes a first communication apparatus provided in embodiments of this application. FIG. 12 is a diagram of a structure of a first communication apparatus according to an embodiment of this application. The first communication apparatus may be configured to perform the steps performed by the first communication apparatus in embodiments shown in FIG. 2, FIG. 8A and FIG. 8B, FIG. 10, and FIG. 11. For details, refer to the related descriptions in the foregoing method embodiments.

The first communication apparatus includes a processing module 1201. The first communication apparatus includes a transceiver module 1202.

The processing module 1201 is configured to: determine probability distributions of constellation points in a target probabilistic shaping constellation diagram based on a Maxwell-Boltzmann distribution parameter and a phase noise parameter; and modulate a first original bit stream and a second original bit stream based on the probability distributions of the constellation points in the target probabilistic shaping constellation diagram, to obtain a first QAM symbol stream.

In a possible implementation, the phase noise parameter includes a quantity of constellation points in each circle of the target probabilistic shaping constellation diagram and a phase noise scaling factor;

the phase noise parameter includes the phase noise scaling factor and a first angle difference corresponding to each circle of the target probabilistic shaping constellation diagram, where the first angle difference corresponding to each circle is a smallest value of angle differences between angles respectively corresponding to every two adjacent constellation points in a plurality of constellation points in each circle; or the phase noise parameter includes a quantity of constellation points in each circle of the target probabilistic shaping constellation diagram, a first angle difference corresponding to each circle of the target probabilistic shaping constellation diagram, and the phase noise scaling factor.

In another possible implementation, the processing module 1201 is specifically configured to:

determine, based on the probability distributions and signal amplitudes of the constellation points in the target probabilistic shaping constellation diagram, a symbol type quantity, a probability distribution corresponding to a first symbol of each symbol type, and a bit quantity corresponding to each first symbol, where the symbol type quantity and the probability distribution corresponding to the first symbol of each symbol type indicate probability distributions and signal amplitudes of quadrature signals of the constellation points in the target probabilistic shaping constellation diagram, and probability distributions and signal amplitudes of inphase signals of the constellation points; the bit quantity corresponding to each first symbol is a bit quantity required by each first symbol that is represented by using a bit; and first symbols of different symbol types correspond to different probability distributions and/or different signal amplitudes; and generate a first symbol stream based on the symbol type quantity, the probability distribution corresponding to the first symbol of each symbol type, the bit quantity corresponding to each first symbol, and the first original bit stream; and generate, for the first communication apparatus, the first QAM symbol stream based on the first symbol stream and the second original bit stream.

In another possible implementation, the first symbol in the first symbol stream is a complex-valued symbol in which a value of a real part and a value of an imaginary part are both greater than or equal to 0.

In another possible implementation, the processing module 1201 is further configured to:

interleave and separate, according to a first interleaving and separation rule, a plurality of first symbols included in the first symbol stream, to obtain an interleaved first symbol stream; and the processing module 1201 is specifically configured to:

generate the first QAM symbol stream based on the interleaved first symbol stream and the second bit stream.

In another possible implementation, the processing module 1201 is specifically configured to:

map the first symbol stream to a first bit stream according to a first mapping rule, where the first mapping rule is a mapping relationship between a first symbol and a bit, and a quantity of bits to which each first symbol is mapped is the bit quantity corresponding to each first symbol;

perform encoding based on the first bit stream and the second original bit stream to obtain a first check bit stream;

determine a second bit stream based on the first check bit stream and the second original bit stream; and generate the first QAM symbol stream based on the first symbol stream and the second bit stream.

In another possible implementation, each first symbol in the first symbol stream corresponds to one constellation point in the target probabilistic shaping constellation diagram; and each first symbol in the first symbol stream indicates a signal amplitude of the constellation point corresponding to the first symbol, and the second bit stream indicates a sign bit of a quadrature signal of the constellation point corresponding to each first symbol in the first symbol stream and a sign bit of an inphase signal of the constellation point.

In another possible implementation, each first symbol in the first symbol stream indicates the signal amplitude of the constellation point corresponding to the first symbol, a $(2i-1)^{th}$ bit in the second bit stream indicates a sign bit of a quadrature signal of a constellation point corresponding to an $i^{th}$ first symbol in the first symbol stream, a $2i^{th}$ bit in the second bit stream indicates a sign bit of an inphase signal of the constellation point corresponding to the $i^{th}$ first symbol in the first symbol stream, and i is an integer greater than or equal to 1.

In another possible implementation, each first symbol in the first symbol stream corresponds to a quadrature signal or an inphase signal of one constellation point in the target probabilistic shaping constellation diagram; and each first symbol in the first symbol stream indicates a signal amplitude of the quadrature signal or the inphase signal corresponding to the first symbol, and the second bit stream indicates a sign bit of the quadrature signal or the inphase signal corresponding to each first symbol in the first symbol stream.

In another possible implementation, an odd-numbered first symbol in the first symbol stream corresponds to a quadrature signal of a constellation point in the target probabilistic shaping constellation diagram, and an even-numbered first symbol in the first symbol stream corresponds to an inphase signal of a constellation point in the target probabilistic shaping constellation diagram; and the odd-numbered first symbol in the first symbol stream indicates a signal amplitude of the quadrature signal corresponding to the first symbol, and the even-numbered first symbol in the first symbol stream indicates a signal amplitude of the inphase signal corresponding to the first symbol; and an odd-numbered bit in the second bit stream indicates a sign bit of the quadrature signal corresponding to the odd-numbered first symbol, and an even-numbered bit in the second bit stream indicates a sign bit of the inphase signal corresponding to the even-numbered first symbol.

In another possible implementation, the first bit stream and the second original bit stream are located in a first code block, a length of the first code block is greater than a code block length supported by the first communication apparatus, the first bit stream includes a plurality of first bits, and the second original bit stream includes a plurality of second bits; and the processing module 1201 is specifically configured to:

determine first TB CRC bits based on the first bit stream and the second original bit stream;

determine the first code block as M code subblocks;

separately encode the M code subblocks to obtain CB CRC bits corresponding to the M code subblocks; and determine the first check bit stream based on the CB CRC bits and the first TB CRC bits that correspond to the M code subblocks, where the first check bit stream includes check bits corresponding to the M code subblocks, and a check bit corresponding to an $M^{th}$ code subblock in the M code subblocks includes a CB CRC bit and a first TB CRC bit that correspond to the $M^{th}$ code subblock; each of the M code subblocks includes a part of the plurality of first bits and a part of the plurality of second bits, and different code subblocks include different first bits and different second bits; M is equal to a rounded-up ratio of the length of the first code block to the code block length supported by the first communication apparatus; and a ratio of a first bit included in each of the M code subblocks to a first value is equal to a first ratio, the first value is equal to a sum of a quantity of second bits included in each code subblock and a quantity of check bits included in each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

In another possible implementation, the processing module 1201 is further configured to:

obtain a channel state parameter;

determine supported maximum spectral efficiency based on the channel state parameter; and determine, based on the maximum frequency, a first coding rate, the phase noise scaling factor, a first modulation order corresponding to the target probabilistic shaping constellation diagram, and the Maxwell-Boltzmann distribution parameter; and the processing module 1201 is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, when a first coding rate used by the first communication apparatus and a first modulation order corresponding to the target probabilistic shaping constellation diagram remain unchanged, the processing module 1201 is further configured to:

obtain a channel state parameter;

determine supported maximum spectral efficiency based on the channel state parameter; and determine, based on the maximum spectral efficiency, the phase noise scaling factor and the Maxwell-Boltzmann distribution parameter corresponding to the target probabilistic shaping constellation diagram; and the processing module 1201 is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, a first net transmission rate corresponding to a case in which the first communication apparatus performs modulation by using a uniform modulation scheme is equal to a product of a second modulation order corresponding to the uniform modulation scheme and a second coding rate corresponding to the uniform modulation scheme, and the processing module 1201 is further configured to:

set the second modulation order to a first modulation order corresponding to the target probabilistic shaping constellation diagram;

set the first net transmission rate to a net transmission rate corresponding to a case in which the first communication apparatus uses probabilistic constellation shaping modulation; and obtain, through calculation based on the first net transmission rate and the first modulation order, a first coding rate, the phase noise scaling factor, and the Maxwell-Boltzmann distribution parameter corresponding to the target probabilistic shaping constellation diagram; and the processing module 1201 is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, a first net transmission rate corresponding to a case in which the first communication apparatus performs modulation by using a uniform modulation scheme is equal to a product of a second modulation order corresponding to the uniform modulation scheme and a second coding rate corresponding to the uniform modulation scheme, and the processing module 1201 is further configured to:

set the second coding rate to a first coding rate used when the first communication apparatus uses probabilistic constellation shaping modulation;

set a first modulation order corresponding to the target probabilistic shaping constellation diagram to the second modulation order plus a first preset value;

set the first net transmission rate to a net transmission rate corresponding to a case in which the first communication apparatus uses the probabilistic constellation shaping modulation; and determine, based on the first net transmission rate and the first modulation order, the Maxwell-Boltzmann distribution parameter corresponding to the target probabilistic shaping constellation diagram; and the processing module 1201 is specifically configured to:

determine the probability distributions of the constellation points in the target probabilistic shaping constellation diagram based on the Maxwell-Boltzmann distribution parameter, the phase noise parameter, and the first modulation order, where the phase noise parameter includes the phase noise scaling factor; and generate the first symbol stream based on the first coding rate, the symbol type quantity, the probability distribution corresponding to the first symbol of each symbol type, the bit quantity corresponding to each first symbol, and the first original bit stream.

In another possible implementation, the transceiver module 1202 is further configured to:

send first indication information to a second communication apparatus, where the first indication information indicates the first coding rate, the phase noise scaling factor, the first modulation order corresponding to the target probabilistic shaping constellation diagram, and the Maxwell-Boltzmann distribution parameter; or the first indication information indicates a first modulation and coding scheme (MCS), the phase noise scaling factor, and the Maxwell-Boltzmann distribution parameter, where the first MCS indicates the first coding rate and the first modulation order.

In another possible implementation, the transceiver module 1202 is further configured to:

send first indication information to a second communication apparatus, where the first indication information indicates the first coding rate, the phase noise scaling factor, the first modulation order corresponding to the target probabilistic shaping constellation diagram, and the Maxwell-Boltzmann distribution parameter; or the first indication information indicates a first modulation and coding scheme (MCS), the phase noise scaling factor, and the Maxwell-Boltzmann distribution parameter, where the first MCS indicates the first coding rate and the first modulation order.

In another possible implementation, if the Maxwell-Boltzmann distribution parameter is not equal to 0 and the phase noise scaling factor is equal to 0, the modulation includes the probabilistic constellation shaping modulation; or if neither the Maxwell-Boltzmann distribution parameter nor the phase noise scaling factor is equal to 0, the modulation includes phase-noise-based probabilistic constellation shaping modulation.

In another possible implementation, the processing module 1201 is further configured to:

obtain the channel state parameter, where if a value of the channel state parameter is greater than or equal to a first threshold, the modulation includes the probabilistic constellation shaping modulation or the phase-noise-based probabilistic constellation shaping modulation.

Figure 13:
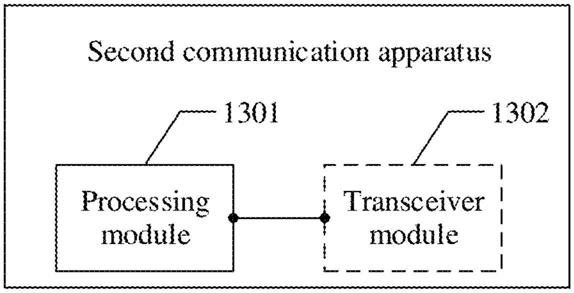
FIG. 13 is a diagram of a structure of a second communication apparatus according to an embodiment of this application.

The following describes a second communication apparatus provided in embodiments of this application. FIG. 13 is a diagram of a structure of a second communication apparatus according to an embodiment of this application. The second communication apparatus may be configured to perform the steps performed by the second communication apparatus in embodiments shown in FIG. 2, FIG. 8A and FIG. 8B, FIG. 10, and FIG. 11. For details, refer to the related descriptions in the foregoing method embodiments.

The second communication apparatus includes a processing module 1301. Optionally, the second communication apparatus further includes a transceiver module 1302.

The processing module 1301 configured to: obtain a second QAM symbol stream; determine probability distributions of constellation points in a target probabilistic shaping constellation diagram based on a Maxwell-Boltzmann distribution parameter and a phase noise parameter; and demodulate the second QAM symbol stream based on the probability distributions of the constellation points in the target probabilistic shaping constellation diagram, to obtain a third original bit stream and a fourth original bit stream.

In a possible implementation, the phase noise parameter includes a quantity of constellation points in each circle of the target probabilistic shaping constellation diagram and a phase noise scaling factor;

the phase noise parameter includes the phase noise scaling factor and a first angle difference corresponding to each circle of the target probabilistic shaping constellation diagram, where the first angle difference corresponding to each circle is a smallest value of angle differences between angles respectively corresponding to every two adjacent constellation points in a plurality of constellation points in each circle; or the phase noise parameter includes a quantity of constellation points in each circle of the target probabilistic shaping constellation diagram, a first angle difference corresponding to each circle of the target probabilistic shaping constellation diagram, and the phase noise scaling factor.

In another possible implementation, the processing module 1301 is specifically configured to:

demodulate the second QAM symbol stream to obtain a third bit stream;

parse the third bit stream to obtain a system bit stream and a second check bit stream;

perform decoding based on the system bit stream and the second check bit stream to obtain a fourth bit stream and the fourth original bit stream;

determine, based on the probability distributions and signal amplitudes of the constellation points in the target probabilistic shaping constellation diagram, a symbol type quantity, a probability distribution corresponding to a second symbol of each symbol type, and a bit quantity corresponding to each second symbol, where the symbol type quantity and the probability distribution corresponding to the second symbol of each symbol type indicate probability distributions and signal amplitudes of quadrature signals of the constellation points in the target probabilistic shaping constellation diagram, and probability distributions and signal amplitudes of the constellation points; the bit quantity corresponding to each second symbol is a quantity of bits required for representing the second symbol by using the bit; and second symbols of different symbol types correspond to different probability distributions and/or different signal amplitudes;

map the fourth bit stream to a second symbol stream according to a second mapping rule, where the second mapping rule is a mapping relationship between a bit and a second symbol, and the bit quantity corresponding to each second symbol in the second symbol stream is the bit quantity corresponding to each second symbol; the symbol type quantity of second symbols included in the second symbol stream and the probability distribution corresponding to the second symbol of each symbol type indicate the probability distributions and the signal amplitudes of the quadrature signals of the constellation points in the target probabilistic shaping constellation diagram, and the probability distributions and the signal amplitudes of the constellation points; and second symbols of different symbol types correspond to different probability distributions and/or different signal amplitudes; and parse the second symbol stream based on the symbol type quantity, the bit quantity corresponding to each second symbol, and the probability distribution corresponding to each symbol type, to obtain the third original bit stream.

In another possible implementation, the processing module 1301 is further configured to:

de-interleave and separate, according to a first de-interleaving and separation rule, a plurality of second symbols included in the second symbol stream, to obtain a de-interleaved second symbol stream; and the processing module 1301 is specifically configured to:

parse the de-interleaved second symbol stream based on the symbol type quantity, the bit quantity corresponding to each symbol, and the probability distribution corresponding to each symbol type, to obtain a sixth bit stream.

In another possible implementation, the second symbol in the second symbol stream is a complex-valued symbol in which a value of a real part and a value of an imaginary part are both greater than or equal to 0.

In another possible implementation, the system bit stream includes a plurality of third bits and a plurality of fourth bits, the system bit stream is located in a second code block, and a length of the second code block is greater than a code block length supported by the second communication apparatus;

the processing module 1301 is further configured to:

determine the second code block as M code subblocks, where each of the M code subblocks includes a part of the third bits and a part of the fourth bits, and different code subblocks include different third bits and different fourth bits; and determine the second check bit stream as M portions of check bits, where the M portions of check bits one-to-one correspond to the M code subblocks, and a check bit corresponding to an $M^{th}$ code subblock in the M code subblocks includes a first TB CRC bit; M is equal to a rounded-up ratio of the length of the second code block to the code block length supported by the second communication apparatus; and a ratio of a quantity of third bits in each of the M code subblocks to a second value is equal to a first ratio, the second value is equal to a sum of a quantity of fourth bits included in each code subblock and a quantity of check bits corresponding to each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram; and the processing module 1301 is specifically configured to:

decode each code subblock and a check bit corresponding to each code subblock, to obtain a fifth bit corresponding to each code subblock and a sixth bit corresponding to each code subblock; and determine the fifth bits corresponding to all the code subblocks as the fourth bit stream, and determine the sixth bits corresponding to all the code subblocks as the fourth original bit stream.

In another possible implementation, the second communication apparatus further includes the transceiver module 1302, and the transceiver module 1302 is configured to receive first indication information from a first communication apparatus, where the first indication information indicates a first coding rate, the phase noise scaling factor, a first modulation order corresponding to the target probabilistic shaping constellation diagram, and the Maxwell-Boltzmann distribution parameter; or the first indication information indicates a first MCS, the phase noise scaling factor, and the Maxwell-Boltzmann distribution parameter, where the first MCS indicates a first coding rate and a first modulation order; and the processing module 1301 is specifically configured to:

determine the probability distributions of the constellation points in the target probabilistic shaping constellation diagram based on the first modulation order, the phase noise parameter, and the Maxwell-Boltzmann distribution parameter, where the phase noise parameter includes the phase noise scaling factor; and parse the second symbol stream based on the first coding rate, the symbol type quantity, the bit quantity corresponding to each second symbol, and the probability distribution corresponding to each symbol type, to obtain the third original bit stream.

In another possible implementation, the second communication apparatus further includes the transceiver module 1302, and the transceiver module 1302 is configured to receive second indication information from a first communication apparatus, where the second indication information indicates a second MCS and an order-increase equal-entropy scheme, or indicates a second MCS and an equal-order coding rate increase scheme, and the second MCS indicates a second modulation order corresponding to a uniform modulation scheme and a second coding rate corresponding to the uniform modulation scheme.

In another possible implementation, if the second indication information indicates the equal-order coding rate increase scheme, the processing module 1301 is further configured to:

determine, by using the equal-order coding rate increase scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter; and the processing module 1301 is specifically configured to:

determine the probability distributions of the constellation points in the target probabilistic shaping constellation diagram based on the first modulation order, the phase noise parameter, and the Maxwell-Boltzmann distribution parameter, where the phase noise parameter includes the phase noise scaling factor; and parse the second symbol stream based on the first coding rate, the symbol type quantity, the bit quantity corresponding to each second symbol, and the probability distribution corresponding to each symbol type, to obtain the third original bit stream.

In another possible implementation, a first net transmission rate corresponding to a case in which the first communication apparatus performs modulation by using the uniform modulation scheme is equal to a product of the second modulation order corresponding to the uniform modulation scheme and the second coding rate corresponding to the uniform modulation scheme; and the processing module 1301 is specifically configured to:

set the second modulation order to the first modulation order corresponding to the target probabilistic shaping constellation diagram;

set the first net transmission rate to a net transmission rate corresponding to a case in which the first communication apparatus uses the probabilistic constellation shaping modulation; and obtain, through calculation based on the first net transmission rate and the first modulation order, the phase noise scaling factor, the first coding rate, and the Maxwell-Boltzmann distribution parameter corresponding to the target probabilistic shaping constellation diagram.

In another possible implementation, if the second indication information indicates the order-increase equal-entropy scheme, the processing module 1301 is further configured to:

determine, by using the order-increase equal-entropy scheme, the phase noise scaling factor, a first coding rate used when the second communication apparatus uses probabilistic constellation shaping modulation, a first modulation order corresponding to the target probabilistic shaping constellation diagram, and the Maxwell-Boltzmann distribution parameter; and the processing module 1301 is specifically configured to:

determine the probability distributions of the constellation points in the target probabilistic shaping constellation diagram based on the first modulation order, the phase noise parameter, and the Maxwell-Boltzmann distribution parameter, where the phase noise parameter includes the phase noise scaling factor; and parse the second symbol stream based on the first coding rate, the symbol type quantity, the bit quantity corresponding to each second symbol, and the probability distribution corresponding to each symbol type, to obtain the third original bit stream.

In another possible implementation, a first net transmission rate corresponding to a case in which the first communication apparatus performs modulation by using the uniform modulation scheme is equal to a product of the second modulation order corresponding to the uniform modulation scheme and the second coding rate corresponding to the uniform modulation scheme; and the processing module 1301 is specifically configured to:

set the second coding rate to the first coding rate used when the first communication apparatus uses the probabilistic constellation shaping modulation;

set the first modulation order corresponding to the target probabilistic shaping constellation diagram to the second modulation order plus a first preset value;

set the first net transmission rate to a net transmission rate corresponding to a case in which the second communication apparatus uses the probabilistic constellation shaping modulation; and determine, based on the first net transmission rate and the first modulation order, the phase noise scaling factor and the Maxwell-Boltzmann distribution parameter corresponding to the target probabilistic shaping constellation diagram.

Figure 14:
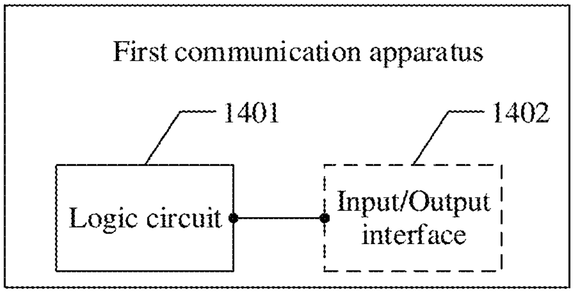
FIG. 14 is a diagram of another structure of a first communication apparatus according to an embodiment of this application.

FIG. 14 is a diagram of another structure of a first communication apparatus according to an embodiment of this application. Refer to FIG. 14. The first communication apparatus includes a logic circuit 1401. Optionally, the first communication apparatus further includes an input/output interface 1402.

The first communication apparatus shown in FIG. 14 may be configured to perform the steps performed by the first communication apparatus in the embodiments shown in FIG. 2, FIG. 8A and FIG. 8B, FIG. 10, and FIG. 11.

Optionally, the logic circuit 1401 may have a function of the processing module 1201 in the embodiment shown in FIG. 12. The input/output interface 1402 may have a function of the transceiver module 1202 in the embodiment shown in FIG. 12.

The first communication apparatus shown in FIG. 14 may perform the technical solutions shown in the foregoing method embodiments. An implementation principle and a beneficial effect of the first communication apparatus are similar to those of the foregoing method embodiments, and details are not described herein again.

Figure 15:
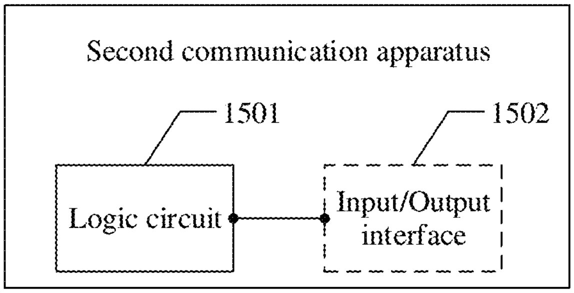
FIG. 15 is a diagram of another structure of a second communication apparatus according to an embodiment of this application.

FIG. 15 is a diagram of another structure of a second communication apparatus according to an embodiment of this application. Refer to FIG. 15. The second communication apparatus includes a logic circuit 1501. Optionally, the second communication apparatus further includes an input/output interface 1502.

The second communication apparatus shown in FIG. 15 may be configured to perform the steps performed by the second communication apparatus in the embodiments shown in FIG. 2, FIG. 8A and FIG. 8B, FIG. 10, and FIG. 11.

Optionally, the logic circuit 1501 may have a function of the processing module 1301 in the embodiment shown in FIG. 13. The input/output interface 1502 may have a function of the transceiver module 1302 in the embodiment shown in FIG. 13.

The second communication apparatus shown in FIG. 15 may perform the technical solutions shown in the foregoing method embodiments. An implementation principle and a beneficial effect of the second communication apparatus are similar to those of the foregoing method embodiments, and details are not described herein again.

Figure 16:
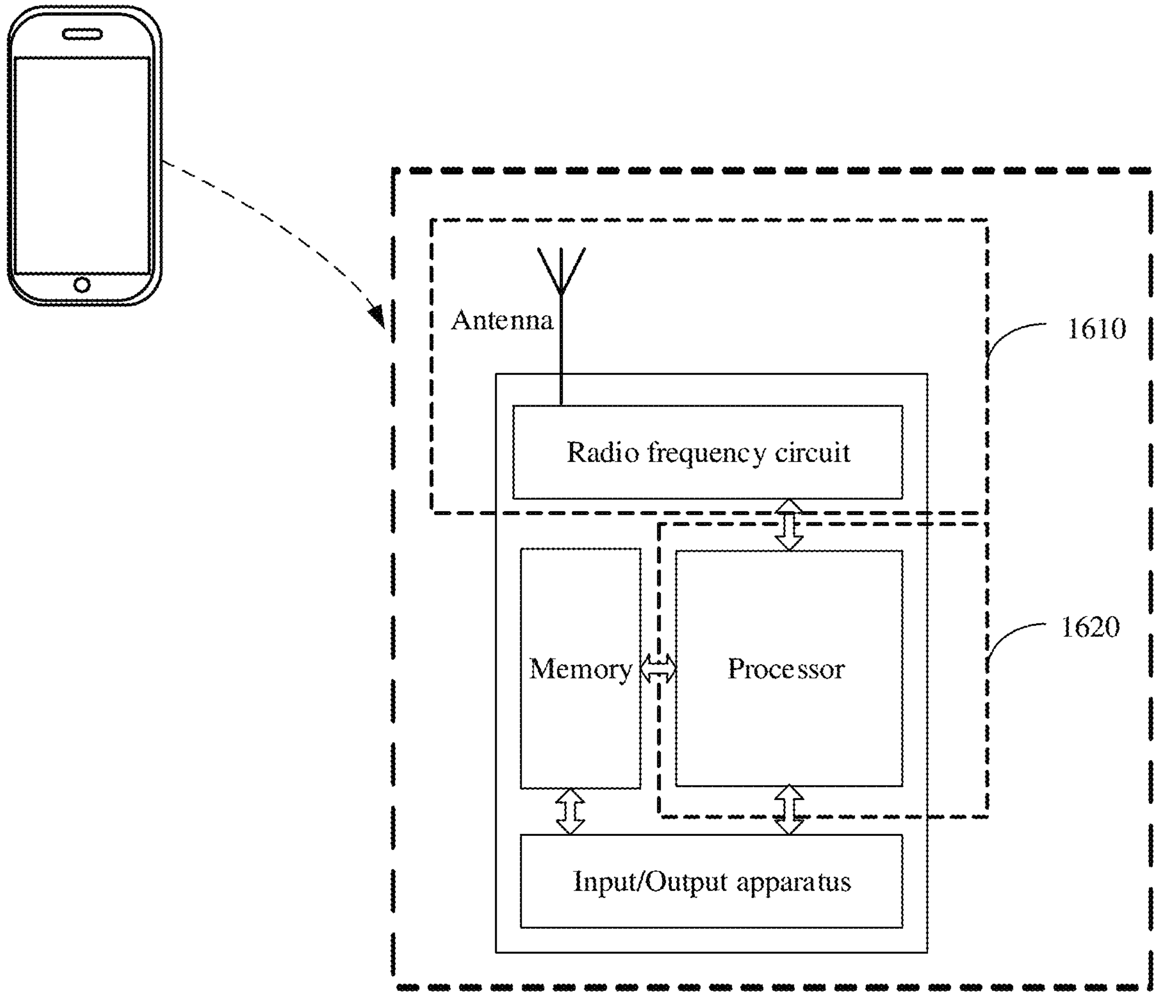
FIG. 16 is a diagram of a structure of a terminal device according to an embodiment of this application.

The following is a diagram of a possible structure in which a first communication apparatus or a second communication apparatus is a terminal device with reference to FIG. 16.

FIG. 16 is a diagram of a simplified structure of the terminal device. For ease of understanding and illustration, an example in which the terminal device is a mobile phone is used in FIG. 16. As shown in FIG. 16, the terminal device includes a processor, a memory, a radio frequency circuit, an antenna, and an input/output apparatus.

The processor is mainly configured to: process a communication protocol and communication data, control the terminal device, execute a software program, process data of the software program, and the like.

The memory is mainly configured to store the software program and data. The radio frequency circuit is mainly configured to: perform conversion between a baseband signal and a radio frequency signal, and process the radio frequency signal. The antenna is mainly configured to receive/send a radio frequency signal in a form of an electromagnetic wave.

The input/output apparatus, for example, a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

For ease of description, only one memory and one processor are shown in FIG. 16. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have a transceiver function may be considered as a transceiver unit of the terminal device, and the processor that has a processing function may be considered as a processing unit of the terminal device. As shown in FIG. 16, the terminal device includes a transceiver unit 1610 and a processing unit 1620. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1610 and that is configured to implement a receiving function may be considered as a receiving unit, and a component that is in the transceiver unit 1610 and that is configured to implement a sending function may be considered as a sending unit. In other words, the transceiver unit 1610 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1610 is configured to perform a sending operation and a receiving operation of the first communication apparatus or the second communication apparatus in the foregoing method embodiments, and the processing unit 1620 is configured to perform an operation other than the sending operation and the receiving operation of the first communication apparatus or the second communication apparatus in the foregoing method embodiments.

When the terminal device is a chip, the chip includes a transceiver unit and a processing unit. The transceiver unit may be an input/output circuit or a communication interface. The processing unit is a processor, a microprocessor, or an integrated circuit integrated on the chip.

Figure 17:
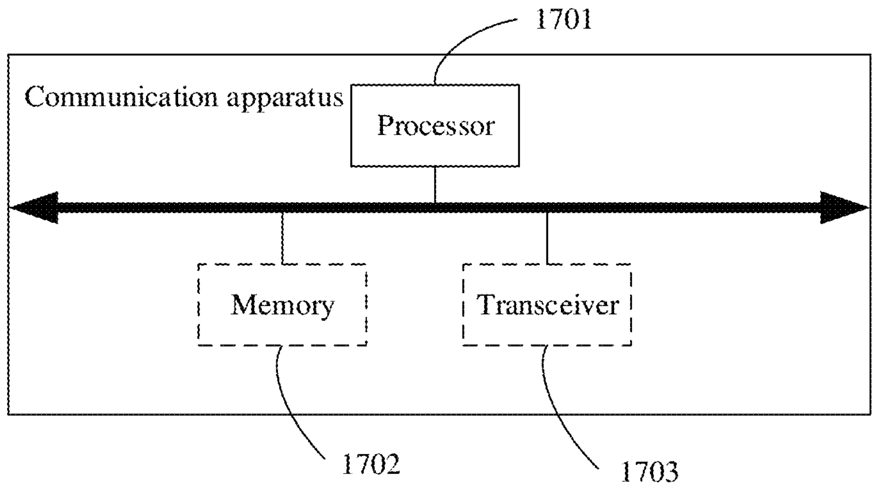
FIG. 17 is a diagram of a structure of a communication apparatus according to an embodiment of this application.

This application further provides a communication apparatus. FIG. 17 is a diagram of another structure of a communication apparatus according to an embodiment of this application. The communication apparatus may be configured to perform the steps performed by the first communication apparatus in the embodiments shown in FIG. 2, FIG. 8A and FIG. 8B, FIG. 10, and FIG. 11, or configured to perform steps performed by the second communication apparatus in the embodiments shown in FIG. 2, FIG. 8A and FIG. 8B, FIG. 10, and FIG. 11. For details, refer to the related descriptions in the foregoing method embodiments.

The communication apparatus includes a processor 1701. Optionally, the communication apparatus further includes a memory 1702 and a transceiver 1703.

In a possible implementation, the processor 1701, the memory 1702, and the transceiver 1703 are all connected through a bus, and the memory stores computer instructions.

The processing module 1201 or the processing module 1301 in the foregoing embodiment may be specifically the processor 1701 in this embodiment. Therefore, specific implementation of the processor 1701 is not described again. The transceiver module 1202 or the transceiver module 1301 in the foregoing embodiment may be specifically the transceiver 1703 in this embodiment. Therefore, specific implementation of the transceiver 1703 is not described again.

An embodiment of this application further provides a communication system. The communication system includes the first communication apparatus shown in FIG. 12 and the second communication apparatus shown in FIG. 13.

The first communication apparatus shown in FIG. 12 may be configured to perform all or some of the steps performed by the first communication apparatus in the embodiments shown in FIG. 2, FIG. 8A and FIG. 8B, FIG. 10, and FIG. 11. The second communication apparatus shown in FIG. 13 may be configured to perform all or some of the steps performed by the second communication apparatus in the embodiments shown in FIG. 2, FIG. 8A and FIG. 8B, FIG. 10, and FIG. 11.

An embodiment of this application further provides a computer program product including instructions. When the computer program product runs on a computer, the computer is enabled to perform the methods in the embodiments shown in FIG. 2, FIG. 8A and FIG. 8B, FIG. 10, and FIG. 11.

An embodiment of this application further provides a computer-readable storage medium, including computer instructions. When the computer instructions are run on a computer, the computer is enabled to perform the methods in the embodiments shown in FIG. 2, FIG. 8A and FIG. 8B, FIG. 10, and FIG. 11.

An embodiment of this application further provides a chip apparatus, including a processor, configured to: connect to a memory, and invoke a program stored in the memory, to enable the processor to perform the methods in the embodiments shown in FIG. 2, FIG. 8A and FIG. 8B, FIG. 10, and FIG. 11.

The processor mentioned anywhere above may be a general-purpose central processing unit, a microprocessor, an application-specific integrated circuit (ASIC), or one or more integrated circuits configured to control program execution of the methods provided in the embodiments shown in FIG. 2, FIG. 8A and FIG. 8B, FIG. 10, and FIG. 11. The memory mentioned anywhere above may be a read-only memory (ROM), another type of static storage device that can store static information and instructions, a random access memory (RAM), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

In this application, unless otherwise specified, for same or similar parts in embodiments, refer to each other. In embodiments of this application and the implementations/implementation methods in embodiments, unless otherwise specified or a logical collision occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship of the technical features. The following implementations of this application are not intended to limit the protection scope of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method comprising:

determining, by a first communication apparatus, probability distributions of constellation points in a target probabilistic shaping constellation diagram based on a Maxwell-Boltzmann distribution parameter and a phase noise parameter; and modulating, by the first communication apparatus, a first original bit stream and a second original bit stream based on the probability distributions of the constellation points in the target probabilistic shaping constellation diagram, to obtain a first quadrature amplitude modulation (QAM) symbol stream.

2. The method according to claim 1, wherein:

the phase noise parameter comprises a quantity of constellation points in each circle of the target probabilistic shaping constellation diagram and a phase noise scaling factor;

the phase noise parameter comprises the phase noise scaling factor and a first angle difference corresponding to each circle of the target probabilistic shaping constellation diagram, wherein the first angle difference corresponding to each circle is a smallest value of angle differences between angles respectively corresponding to every two adjacent constellation points in a plurality of constellation points in each circle; or the phase noise parameter comprises a quantity of constellation points in each circle of the target probabilistic shaping constellation diagram, a first angle difference corresponding to each circle of the target probabilistic shaping constellation diagram, and the phase noise scaling factor.

3. The method according to claim 2, wherein modulating, by the first communication apparatus, the first original bit stream and the second original bit stream based on the probability distributions of the constellation points in the target probabilistic shaping constellation diagram, to obtain the first QAM symbol stream comprises:

determining, by the first communication apparatus based on the probability distributions and signal amplitudes of the constellation points in the target probabilistic shaping constellation diagram, a symbol type quantity, a probability distribution corresponding to a first symbol of each symbol type, and a bit quantity corresponding to the first symbol of each symbol type, wherein the symbol type quantity and the probability distribution corresponding to the first symbol of each symbol type indicate probability distributions and signal amplitudes of quadrature signals of the constellation points in the target probabilistic shaping constellation diagram, and probability distributions and signal amplitudes of inphase signals of the constellation points, the bit quantity corresponding to the first symbol of each symbol type is a bit quantity required by the first symbol of each symbol type that is represented by a bit, and first symbols of different symbol types correspond to different probability distributions or different signal amplitudes;

generating, by the first communication apparatus, a first symbol stream based on the symbol type quantity, the probability distribution corresponding to the first symbol of each symbol type, the bit quantity corresponding to each first symbol, and the first original bit stream; and generating, by the first communication apparatus, the first QAM symbol stream based on the first symbol stream and the second original bit stream.

4. The method according to claim 3, wherein each first symbol in the first symbol stream is a complex-valued symbol in which a value of a real part and a value of an imaginary part are both greater than or equal to 0.

5. The method according to claim 3, wherein the method further comprises:

interleaving and separating, by the first communication apparatus according to a first interleaving and separation rule, a plurality of first symbols comprised in the first symbol stream, to obtain an interleaved first symbol stream; and wherein generating, by the first communication apparatus, the first QAM symbol stream based on the first symbol stream and the second original bit stream comprises:

generating, by the first communication apparatus, the first QAM symbol stream based on the interleaved first symbol stream and the second original bit stream.

6. The method according to claim 3, wherein generating, by the first communication apparatus, the first QAM symbol stream based on the first symbol stream and the second original bit stream comprises:

mapping, by the first communication apparatus, the first symbol stream to a first bit stream according to a first mapping rule, wherein the first mapping rule is a mapping relationship between a first symbol and a bit, and a quantity of bits to which each first symbol in the first symbol stream is mapped is the bit quantity corresponding to a corresponding one of each first symbol in the first symbol stream;

performing, by the first communication apparatus, encoding based on the first bit stream and the second original bit stream to obtain a first check bit stream;

determining, by the first communication apparatus, a second bit stream based on the first check bit stream and the second original bit stream; and generating, by the first communication apparatus, the first QAM symbol stream based on the first symbol stream and the second bit stream.

7. The method according to claim 6, wherein:

each first symbol in the first symbol stream corresponds to one constellation point in the target probabilistic shaping constellation diagram; and each first symbol in the first symbol stream indicates a signal amplitude of the constellation point corresponding to the corresponding one of each first symbol in the first symbol stream, and the second bit stream indicates a sign bit of a quadrature signal of the constellation point corresponding to the corresponding one of each first symbol in the first symbol stream and a sign bit of an inphase signal of the constellation point.

8. The method according to claim 7, wherein each first symbol in the first symbol stream indicates the signal amplitude of the constellation point corresponding to the corresponding one of each first symbol in the first symbol stream, a $(2i-1)^{th}$ bit in the second bit stream indicates a sign bit of a quadrature signal of a constellation point corresponding to an $i^{th}$ first symbol in the first symbol stream, a $2i^{th}$ bit in the second bit stream indicates a sign bit of an inphase signal of the constellation point corresponding to the $i^{th}$ first symbol in the first symbol stream, and i is an integer greater than or equal to 1.

9. The method according to claim 6, wherein:

each first symbol in the first symbol stream corresponds to a quadrature signal or an inphase signal of one constellation point in the target probabilistic shaping constellation diagram; and each first symbol in the first symbol stream indicates a signal amplitude of the quadrature signal or the inphase signal corresponding to the first symbol, and the second bit stream indicates a sign bit of the quadrature signal or the inphase signal corresponding to each first symbol in the first symbol stream.

10. The method according to claim 9, wherein:

an odd-numbered first symbol in the first symbol stream corresponds to a quadrature signal of a constellation point in the target probabilistic shaping constellation diagram, and an even-numbered first symbol in the first symbol stream corresponds to an inphase signal of a constellation point in the target probabilistic shaping constellation diagram;

the odd-numbered first symbol in the first symbol stream indicates a signal amplitude of the quadrature signal corresponding to the first symbol, and the even-numbered first symbol in the first symbol stream indicates a signal amplitude of the inphase signal corresponding to the first symbol; and an odd-numbered bit in the second bit stream indicates a sign bit of the quadrature signal corresponding to the odd-numbered first symbol, and an even-numbered bit in the second bit stream indicates a sign bit of the inphase signal corresponding to the even-numbered first symbol.

11. The method according to claim 6, wherein:

the first bit stream and the second original bit stream are located in a first code block, a length of the first code block is greater than a code block length supported by the first communication apparatus, the first bit stream comprises a plurality of first bits, and the second original bit stream comprises a plurality of second bits; and performing, by the first communication apparatus, encoding based on the first bit stream and the second original bit stream to obtain the first check bit stream comprises:

determining, by the first communication apparatus, first transport block cyclic redundancy check (TB CRC) bits based on the first bit stream and the second original bit stream;

determining, by the first communication apparatus, the first code block as M code subblocks;

separately encoding, by the first communication apparatus, the M code subblocks to obtain code block cyclic redundancy check (CB CRC) bits corresponding to the M code subblocks; and determining, by the first communication apparatus, the first check bit stream based on the CB CRC bits and the first TB CRC bits that correspond to the M code subblocks, wherein the first check bit stream comprises check bits corresponding to the M code subblocks, and a check bit corresponding to an $M^{th}$ code subblock in the M code subblocks comprises a CB CRC bit and a first TB CRC bit that correspond to the $M^{th}$ code subblock;

each of the M code subblocks comprises a part of the plurality of first bits and a part of the plurality of second bits, and different code subblocks comprise different first bits of the plurality of first bits and different second bits of the plurality of second bits;

M is equal to a rounded-up ratio of the length of the first code block to the code block length supported by the first communication apparatus; and a ratio of a first bit comprised in each of the M code subblocks to a first value is equal to a first ratio, the first value is equal to a sum of a quantity of second bits comprised in each code subblock and a quantity of check bits comprised in each code subblock, and the first ratio is a ratio of a quantity of bits required for representing a signal amplitude corresponding to each constellation point in the target probabilistic shaping constellation diagram to a quantity of bits required for representing a sign bit of a signal corresponding to each constellation point in the target probabilistic shaping constellation diagram.

12. The method according to claim 3, wherein the method further comprises:

obtaining, by the first communication apparatus, a channel state parameter;

determining, by the first communication apparatus, supported maximum spectral efficiency (SE) based on the channel state parameter; and determining, by the first communication apparatus based on the maximum SE, a first coding rate, the phase noise scaling factor, a first modulation order corresponding to the target probabilistic shaping constellation diagram, and the Maxwell-Boltzmann distribution parameter;

wherein determining, by the first communication apparatus, the probability distributions of constellation points in the target probabilistic shaping constellation diagram based on the Maxwell-Boltzmann distribution parameter and the phase noise parameter comprises:

determining, by the first communication apparatus, the probability distributions of the constellation points in the target probabilistic shaping constellation diagram based on the Maxwell-Boltzmann distribution parameter, the phase noise parameter, and the first modulation order, wherein the phase noise parameter comprises the phase noise scaling factor; and wherein generating, by the first communication apparatus, the first symbol stream based on the symbol type quantity, the probability distribution corresponding to the first symbol of each symbol type, the bit quantity corresponding to each first symbol, and the first original bit stream comprises:

generating, by the first communication apparatus, the first symbol stream based on the first coding rate, the symbol type quantity, the probability distribution corresponding to the first symbol of each symbol type, the bit quantity corresponding to each first symbol, and the first original bit stream.

13. The method according to claim 3, wherein when a first coding rate of the first communication apparatus and a first modulation order corresponding to the target probabilistic shaping constellation diagram remain unchanged, the method further comprises:

obtaining, by the first communication apparatus, a channel state parameter;

determining, by the first communication apparatus, supported maximum spectral efficiency (SE) based on the channel state parameter; and determining, by the first communication apparatus based on the maximum spectral efficiency SE, the phase noise scaling factor and the Maxwell-Boltzmann distribution parameter corresponding to the target probabilistic shaping constellation diagram;

wherein determining, by the first communication apparatus, the probability distributions of constellation points in the target probabilistic shaping constellation diagram based on the Maxwell-Boltzmann distribution parameter and the phase noise parameter comprises:

determining, by the first communication apparatus, the probability distributions of the constellation points in the target probabilistic shaping constellation diagram based on the Maxwell-Boltzmann distribution parameter, the phase noise parameter, and the first modulation order, wherein the phase noise parameter comprises the phase noise scaling factor; and wherein generating, by the first communication apparatus, the first symbol stream based on the symbol type quantity, the probability distribution corresponding to the first symbol of each symbol type, the bit quantity corresponding to each first symbol, and the first original bit stream comprises:

generating, by the first communication apparatus, the first symbol stream based on the first coding rate, the symbol type quantity, the probability distribution corresponding to the first symbol of each symbol type, the bit quantity corresponding to each first symbol, and the first original bit stream.

14. The method according to claim 3, wherein a first net transmission rate corresponding to a case in which the first communication apparatus performs modulation through a uniform modulation scheme is equal to a product of a second modulation order corresponding to the uniform modulation scheme and a second coding rate corresponding to the uniform modulation scheme, and the method further comprises:

setting, by the first communication apparatus, the second modulation order to a first modulation order corresponding to the target probabilistic shaping constellation diagram;

setting, by the first communication apparatus, the first net transmission rate to a net transmission rate corresponding to a case in which the first communication apparatus uses probabilistic constellation shaping modulation; and obtaining, by the first communication apparatus through calculation based on the first net transmission rate and the first modulation order, a first coding rate, the phase noise scaling factor, and the Maxwell-Boltzmann distribution parameter corresponding to the target probabilistic shaping constellation diagram;

wherein determining, by the first communication apparatus, probability distributions of constellation points in the target probabilistic shaping constellation diagram based on the Maxwell-Boltzmann distribution parameter and the phase noise parameter comprises:

determining, by the first communication apparatus, the probability distributions of the constellation points in the target probabilistic shaping constellation diagram based on the Maxwell-Boltzmann distribution parameter, the phase noise parameter, and the first modulation order, wherein the phase noise parameter comprises the phase noise scaling factor; and wherein generating, by the first communication apparatus, the first symbol stream based on the symbol type quantity, the probability distribution corresponding to the first symbol of each symbol type, the bit quantity corresponding to each first symbol, and the first original bit stream comprises:

generating, by the first communication apparatus, the first symbol stream based on the first coding rate, the symbol type quantity, the probability distribution corresponding to the first symbol of each symbol type, the bit quantity corresponding to each first symbol, and the first original bit stream.

15. The method according to claim 3, wherein a first net transmission rate corresponding to a case in which the first communication apparatus performs modulation through a uniform modulation scheme is equal to a product of a second modulation order corresponding to the uniform modulation scheme and a second coding rate corresponding to the uniform modulation scheme, and the method further comprises:

setting, by the first communication apparatus, the second coding rate to a first coding rate used when the first communication apparatus performs probabilistic constellation shaping modulation;

setting, by the first communication apparatus, a first modulation order corresponding to the target probabilistic shaping constellation diagram to the second modulation order plus a first preset value;

setting, by the first communication apparatus, the first net transmission rate to a net transmission rate corresponding to a case in which the first communication apparatus performs the probabilistic constellation shaping modulation; and determining, by the first communication apparatus based on the first net transmission rate and the first modulation order, the Maxwell-Boltzmann distribution parameter corresponding to the target probabilistic shaping constellation diagram;

wherein determining, by the first communication apparatus, the probability distributions of constellation points in the target probabilistic shaping constellation diagram based on the Maxwell-Boltzmann distribution parameter and the phase noise parameter comprises:

determining, by the first communication apparatus, the probability distributions of the constellation points in the target probabilistic shaping constellation diagram based on the Maxwell-Boltzmann distribution parameter, the phase noise parameter, and the first modulation order, wherein the phase noise parameter comprises the phase noise scaling factor; and wherein generating, by the first communication apparatus, the first symbol stream based on the symbol type quantity, the probability distribution corresponding to the first symbol of each symbol type, the bit quantity corresponding to each first symbol, and the first original bit stream comprises:

generating, by the first communication apparatus, the first symbol stream based on the first coding rate, the symbol type quantity, the probability distribution corresponding to the first symbol of each symbol type, the bit quantity corresponding to each first symbol, and the first original bit stream.

16. The method according to claim 12, wherein the method further comprises:

sending, by the first communication apparatus, first indication information to a second communication apparatus, wherein the first indication information indicates the first coding rate, the phase noise scaling factor, the first modulation order corresponding to the target probabilistic shaping constellation diagram, and the Maxwell-Boltzmann distribution parameter; or the first indication information indicates a modulation and coding scheme (MCS), the phase noise scaling factor, and the Maxwell-Boltzmann distribution parameter, wherein the MCS indicates the first coding rate and the first modulation order.

17. The method according to claim 14, wherein the method further comprises:

sending, by the first communication apparatus, second indication information to a second communication apparatus, wherein the second indication information indicates a second modulation and coding scheme (MCS) and an order-increase equal-entropy scheme, or indicates a second MCS and an equal-order coding rate increase scheme, wherein the second MCS indicates the second modulation order and the second coding rate.

18. The method according to claim 2, wherein:

when the Maxwell-Boltzmann distribution parameter is not equal to 0 and the phase noise scaling factor is equal to 0, the modulation comprises probabilistic constellation shaping modulation; or when neither the Maxwell-Boltzmann distribution parameter nor the phase noise scaling factor is equal to 0, the modulation comprises phase-noise-based probabilistic constellation shaping modulation.

19. The method according to claim 18, wherein the method further comprises:

obtaining, by the first communication apparatus, a channel state parameter, wherein when a value of the channel state parameter is greater than or equal to a first threshold, the modulation comprises the probabilistic constellation shaping modulation or the phase-noise-based probabilistic constellation shaping modulation.

20. A demodulation method, wherein the method comprises:

obtaining, by a second communication apparatus, a second quadrature amplitude modulation (QAM) symbol stream;

determining, by the second communication apparatus, probability distributions of constellation points in a target probabilistic shaping constellation diagram based on a Maxwell-Boltzmann distribution parameter and a phase noise parameter; and demodulating, by the second communication apparatus, the second QAM symbol stream based on the probability distributions of the constellation points in the target probabilistic shaping constellation diagram, to obtain a third original bit stream and a fourth original bit stream.

* * * * *